(12) United States Patent
Yamakawa et al.

(10) Patent No.: US 11,703,659 B2
(45) Date of Patent: Jul. 18, 2023

(54) LASER PROCESSING APPARATUS

(71) Applicant: Keyence Corporation, Osaka (JP)

(72) Inventors: Hideki Yamakawa, Osaka (JP); Kazuma Nehashi, Osaka (JP); Yu Takabatake, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 805 days.

(21) Appl. No.: 16/693,403

(22) Filed: Nov. 25, 2019

(65) Prior Publication Data
US 2020/0209522 A1    Jul. 2, 2020

(30) Foreign Application Priority Data

Dec. 28, 2018 (JP) .................................. 2018-246973

(51) Int. Cl.
*G02B 7/32* (2021.01)
*G01B 11/22* (2006.01)
(Continued)

(52) U.S. Cl.
CPC .............. *G02B 7/32* (2013.01); *B23K 26/064* (2015.10); *B23K 26/0643* (2013.01);
(Continued)

(58) Field of Classification Search
CPC ...... G02B 7/32; B23K 26/064; B23K 26/082; B23K 26/0643; B23K 26/707; G01B 11/22

See application file for complete search history.

(56) References Cited

U.S. PATENT DOCUMENTS 3,781,531 A * 12/1973 Baker ..................... G01N 21/89
250/559.49
4,636,043 A *  1/1987 Bellar ...................... G06K 1/126
219/121.75
(Continued)

FOREIGN PATENT DOCUMENTS

CN        203437817 U  *  2/2014
CN        203460553 U  *  3/2014
(Continued)

OTHER PUBLICATIONS

Schindhelm et al., Spatial analysis of the back reflected laser light during CO2-laser cutting of metal sheets, J. Laser Appl. 25, 012001 (2013); https://doi.org/10.2351/1.4765818 (Year: 2013).*
(Continued)

*Primary Examiner* — Peter Radkowski
(74) *Attorney, Agent, or Firm* — Kilyk & Bowersox, P.L.L.C.

(57) ABSTRACT

A laser processing apparatus includes a laser light output section, a first scanner and a second scanner, a distance measurement light emitting section, a reference member which is arranged at a position which is the other end of a correction optical path formed with the distance measurement light emitting section as one end of the correction optical path and is arranged such that an optical path length of the correction optical path is a predetermined reference distance, a distance measurement light receiving section which receives distance measurement light reflected by the workpiece or the reference member, a distance measuring section which measures a distance to the workpiece or the reference member, and a distance correcting section which compares a measurement result of the distance to the reference member with the reference distance stored in advance
(Continued)

to correct the measurement result obtained by the distance measuring section.

11 Claims, 29 Drawing Sheets

(51) Int. Cl.
*B23K 26/064* (2014.01)
*B23K 26/06* (2014.01)
*B23K 26/082* (2014.01)
*B23K 26/70* (2014.01)

(52) U.S. Cl.
CPC ............ *B23K 26/082* (2015.10); *G01B 11/22* (2013.01); *B23K 26/707* (2015.10)

(56) References Cited

U.S. PATENT DOCUMENTS

| | | | | |
|---|---|---|---|---|
| 4,652,722 A * | 3/1987 | Stone | G06K 1/126 | 219/121.76 |
| 4,709,156 A * | 11/1987 | Murphy | G01B 11/24 | 250/559.22 |
| 4,874,246 A * | 10/1989 | Den Boef | G01B 11/026 | 356/624 |
| 4,906,098 A * | 3/1990 | Thomas | G01B 11/24 | 250/559.22 |
| 5,212,710 A * | 5/1993 | Kaneda | H01S 5/4025 | 359/489.08 |
| 5,229,574 A * | 7/1993 | Stone | B23K 26/0643 | 219/121.76 |
| 5,294,774 A * | 3/1994 | Stone | B23K 26/064 | 219/121.75 |
| 5,668,631 A * | 9/1997 | Norita | G01B 11/2518 | 250/559.22 |
| 5,837,962 A * | 11/1998 | Overbeck | B23K 26/0665 | 219/121.75 |
| 5,870,220 A * | 2/1999 | Migdal | G02B 26/12 | 250/559.22 |
| 6,243,165 B1 * | 6/2001 | Norita | G06T 7/521 | 250/559.22 |
| 6,983,886 B2 * | 1/2006 | Natsukari | G06K 1/121 | 235/462.1 |
| 7,436,525 B2 * | 10/2008 | Mukai | G01B 11/2518 | 356/604 |
| 7,616,328 B2 * | 11/2009 | Stern | G01B 11/0608 | 356/614 |
| 7,952,603 B2 * | 5/2011 | Govorkov | G02B 26/105 | 347/256 |
| 8,084,713 B2 * | 12/2011 | Idaka | B23K 26/03 | 700/166 |
| 8,153,931 B2 * | 4/2012 | Yamakawa | G06K 1/121 | 219/121.81 |
| 8,235,296 B2 * | 8/2012 | Idaka | G06K 19/00 | 235/487 |
| 8,399,802 B2 * | 3/2013 | Idaka | B23K 26/082 | 700/166 |
| 8,399,803 B2 * | 3/2013 | Idaka | B23K 26/082 | 700/166 |
| 8,488,113 B2 * | 7/2013 | Thiel | G01J 3/02 | 356/73 |
| 8,610,902 B2 * | 12/2013 | Leung | G01B 11/24 | 356/603 |
| 8,729,426 B2 * | 5/2014 | Rumsby | B23K 26/066 | 216/13 |
| 9,143,674 B2 * | 9/2015 | Gladnick | G01B 11/24 | |
| 9,235,063 B2 * | 1/2016 | Paris | G02C 7/028 | |
| 9,608,397 B2 * | 3/2017 | Sato | H01S 3/094053 | |
| 9,697,456 B2 * | 7/2017 | Gregarek | B42D 25/41 | |
| 10,175,360 B2 * | 1/2019 | Zweigle | G01S 17/42 | |
| 10,304,356 B2 * | 5/2019 | Carls | G09F 3/10 | |
| 10,350,705 B2 * | 7/2019 | Landon | B23K 26/0622 | |
| 10,675,713 B2 * | 6/2020 | Yang | B23K 26/322 | |
| 10,798,949 B2 * | 10/2020 | Leach | A21D 13/47 | |
| 10,837,763 B2 * | 11/2020 | Smith | G02B 26/10 | |
| 11,148,224 B2 * | 10/2021 | Yamaguchi | B23K 26/082 | |
| 2004/0046024 A1 * | 3/2004 | Natsukari | G06K 7/14 | 235/454 |
| 2007/0285672 A1 * | 12/2007 | Mukai | G01B 11/2518 | 356/606 |
| 2008/0011854 A1 * | 1/2008 | Idaka | G06K 1/121 | 235/462.01 |
| 2008/0017619 A1 * | 1/2008 | Yamakawa | G06K 1/121 | 219/121.81 |
| 2008/0023455 A1 * | 1/2008 | Idaka | B23K 26/03 | 219/121.73 |
| 2008/0165357 A1 * | 7/2008 | Stern | G01B 11/0608 | 356/625 |
| 2010/0078857 A1 * | 4/2010 | Govorkov | G02B 26/105 | 264/400 |
| 2010/0079572 A1 * | 4/2010 | Govorkov | G02B 26/105 | 347/260 |
| 2010/0277717 A1 * | 11/2010 | Stern | G01B 11/0608 | 356/614 |
| 2011/0080576 A1 * | 4/2011 | Thiel | G01J 3/021 | 356/73 |
| 2011/0164104 A1 * | 7/2011 | Govorkov | G02B 26/0858 | 347/241 |
| 2011/0259631 A1 * | 10/2011 | Rumsby | B23K 26/066 | 219/121.7 |
| 2012/0061360 A1 * | 3/2012 | Idaka | B23K 26/03 | 219/121.83 |
| 2012/0062972 A1 * | 3/2012 | Idaka | B23K 26/03 | 359/205.1 |
| 2012/0307259 A1 * | 12/2012 | Leung | G01B 11/24 | 356/609 |
| 2013/0132044 A1 * | 5/2013 | Paris | G02C 7/028 | 703/2 |
| 2014/0340691 A1 * | 11/2014 | Smith | G02B 5/122 | 356/601 |
| 2014/0355974 A1 * | 12/2014 | Low | G03B 17/17 | 396/331 |
| 2014/0368726 A1 * | 12/2014 | Gladnick | G01B 11/24 | 348/349 |
| 2015/0346483 A1 * | 12/2015 | Ehrmann | B23K 26/0648 | 219/121.85 |
| 2016/0036194 A1 * | 2/2016 | Sato | B23K 26/082 | 359/345 |
| 2016/0110638 A1 * | 4/2016 | Gregarek | B42D 25/342 | 235/488 |
| 2016/0207249 A1 * | 7/2016 | Maurice | B23K 26/0006 | |
| 2016/0243646 A1 * | 8/2016 | Kleinert | B23K 26/0853 | |
| 2016/0291160 A1 * | 10/2016 | Zweigle | G01S 7/4813 | |
| 2017/0157707 A1 * | 6/2017 | Landon | B23K 26/0622 | |
| 2017/0181445 A1 * | 6/2017 | Leach | A21D 13/45 | |
| 2018/0031367 A1 * | 2/2018 | Smith | G01S 7/4972 | |
| 2018/0043472 A1 * | 2/2018 | Yang | B23K 26/322 | |
| 2018/0311763 A1 * | 11/2018 | Yamaguchi | B23K 26/03 | |
| 2018/0330640 A1 * | 11/2018 | Carls | G09F 3/02 | |
| 2019/0022794 A1 * | 1/2019 | Nishikawa | B23K 26/127 | |
| 2019/0092080 A1 * | 3/2019 | Sugdon | B42D 25/351 | |
| 2019/0137627 A1 * | 5/2019 | Zweigle | G01S 17/42 | |
| 2019/0171855 A1 * | 6/2019 | Suman | G06K 7/10722 | |
| 2019/0184491 A1 | 6/2019 | Idaka et al. | | |
| 2019/0190227 A1 | 6/2019 | Sato et al. | | |
| 2021/0025697 A1 * | 1/2021 | Smith | G02B 5/122 | |
| 2021/0276125 A1 * | 9/2021 | Lu | B23K 26/128 | |

FOREIGN PATENT DOCUMENTS

| | | | | |
|---|---|---|---|---|
| CN | 203460554 U | * | 3/2014 | |
| CN | 203599710 U | * | 5/2014 | |
| CN | 104165596 A | * | 11/2014 | |
| CN | 106514004 A | * | 3/2017 | |
| CN | 106985546 A | * | 7/2017 | |
| CN | 106994557 B | * | 10/2018 | ........... B23K 26/048 |
| DE | 112015006848 T5 | * | 5/2018 | ........... B23K 26/082 |
| DE | 112015006998 T5 | * | 7/2018 | ........... B23K 26/082 |
| GB | 2548643 A | * | 9/2017 | ............ B42B 2/00 |
| JP | 2004012430 A | * | 1/2004 | |

(56) References Cited

FOREIGN PATENT DOCUMENTS

| JP | 2004012431 | A | * | 1/2004 | |
|----|------------|----|---|--------|--|
| JP | 2006315031 | A | | 11/2006 | |
| JP | 2008215829 | A | | 9/2008 | |
| JP | 2014055810 | A | * | 3/2014 | ............. G01B 11/24 |
| JP | 2015521913 | A | * | 3/2014 | |
| JP | 2017100138 | A | * | 6/2017 | |
| JP | 6583099 | B2 | * | 10/2019 | ........... B23K 26/032 |
| KR | 101041942 | B1 | * | 6/2011 | |
| WO | WO-2017168833 | A1 | * | 10/2017 | ........... B23K 26/032 |
| WO | WO-2018204241 | A1 | * | 11/2018 | ......... B23K 26/0643 |

OTHER PUBLICATIONS

U.S. Appl. No. 16/693,405, filed Nov. 25, 2019 (163 pages).

* cited by examiner

LASER PROCESSING APPARATUS

CROSS-REFERENCE TO RELATED APPLICATIONS

The present application claims foreign priority based on Japanese Patent Application No. 2018-246973, filed Dec. 28, 2018, the contents of which is incorporated herein by reference.

BACKGROUND OF THE INVENTION

1. Field of the Invention

The technology disclosed herein relates to a laser processing apparatus such as a laser marking apparatus that performs processing by irradiating a workpiece with laser light.

2. Description of Related Art

Conventionally, a laser processing apparatus capable of measuring a distance to a workpiece has been known.

For example, JP-A-2006-315031 (Patent Literature 1) discloses a laser processing apparatus including an objective condensing lens which condenses laser light (pulse laser light) emitted from a laser light source, a distance measuring sensor which measures a distance between the objective condensing lens and a workpiece (a processing target), and an actuator which adjusts a focal position of the laser light based on a measurement result obtained by the distance measuring sensor.

JP-A-2008-215829 (Patent Literature 2) discloses a distance measuring sensor (displacement sensor) as described in JP-A-2006-315031 (Patent Literature 1), and a jig (jig for calibration) for calibrating the distance measuring sensor. The jig is a separate member from a laser processing apparatus, and is to be brought in from outside and installed by an operator.

Specifically, the jig disclosed in JP-A-2008-215829 (Patent Literature 2) is installed on a stage on which a workpiece (a processing target) is placed at the time of calibration of the distance measuring sensor.

The distance measuring sensor is calibrated by irradiating the jig thus installed with distance measurement light (laser light for measurement) from the displacement sensor and appropriately detecting reflected light.

SUMMARY OF THE INVENTION

However, when the configuration of JP-A-2008-215829 (Patent Literature 2) is adopted, it is necessary to prepare a separate jig in order to calibrate the distance measuring sensor. Therefore, it takes time and it is inconvenient. In addition, in order to use this jig, it is necessary to measure a distance from the laser processing apparatus to the jig in advance in other ways.

Moreover, since the jig disclosed in JP-A-2008-215829 (Patent Literature 2) is brought in from outside and installed on the stage, there is a possibility that the calibration accuracy may decrease due to ambient light around the stage and surface conditions of the jig.

The technology disclosed herein has been made in view of the above, and an object thereof is to improve calibration accuracy.

Specifically, a first aspect of the present invention relates to a laser processing apparatus including an excitation light generating section which generates excitation light, a laser light output section which generates laser light based on the excitation light generated by the excitation light generating section and emits the laser light, a laser light scanning section which includes a first scanner that scans the laser light emitted from the laser light output section in a first direction, and a second scanner that scans the laser light scanned by the first scanner in a second direction substantially orthogonal to the first direction, and irradiates a workpiece with the laser light scanned by the second scanner, and a housing in which at least the laser light output section and the laser light scanning section are provided.

According to the first aspect of the invention, the laser processing apparatus includes a distance measurement light emitting section which is provided in the housing and emits to the laser light scanning section a first distance measurement light for measuring a distance from the laser processing apparatus to a surface of the workpiece, or a second distance measurement light for correcting a measurement result thereof, a reference member which, in a state in which at least one of the first scanner and the second scanner is in a specific rotation posture, is arranged at a position which is the other end of a correction optical path formed via the laser light scanning section with the distance measurement light emitting section as one end of the correction optical path, and is arranged such that an optical path length of the correction optical path is a predetermined reference distance, a distance measurement light receiving section which is provided in the housing and receives any one of the first distance measurement light reflected by the workpiece and the second distance measurement light reflected by the reference member via the laser light scanning section, a distance measuring section which measures a distance from the laser processing apparatus to the surface of the workpiece by a triangulation method based on a light receiving position of the first distance measurement light in the distance measurement light receiving section, and measures a distance to the reference member by the triangulation method based on a light receiving position of the second distance measurement light in the distance measurement light receiving section, a reference distance storing section which stores the reference distance in advance, and a distance correcting section which, when the distance to the reference member has been measured by using the correction optical path, compares the measurement result with the reference distance stored in the reference distance storing section to correct the measurement result obtained by the distance measuring section.

The "distance measurement light emitting section" and the "distance measurement light receiving section" are equivalent to a distance measuring sensor in the invention.

According to this configuration, the distance measurement light emitting section emits the first distance measurement light when the distance from the laser processing apparatus to the surface of the workpiece is measured. The first distance measurement light emitted from the distance measurement light emitting section is irradiated onto the workpiece via the laser light scanning section. The first distance measurement light irradiated onto the workpiece returns, after being reflected by the workpiece, to the laser light scanning section and reaches the distance measurement light receiving section. The distance measuring section measures the distance to the surface of the workpiece based on the light receiving position of the first distance measurement light in the distance measurement light receiving section.

When the measurement result obtained by the distance measuring section is corrected, the distance measurement light emitting section emits the second distance measurement light. In this case, the correction optical path connecting the distance measurement light emitting section and the reference member is formed via the laser light scanning section by making at least one of the first scanner and the second scanner in a specific rotation posture. The correction optical path is an optical path that takes the distance measurement light emitting section as one end and the reference member as the other end, and the correction optical path passes through the laser light scanning section on the way between the distance measurement light emitting section and the reference member. Therefore, the second distance measurement light emitted from the distance measurement light emitting section is irradiated onto the reference member via the laser light scanning section. The second distance measurement light irradiated onto the reference member returns, after being reflected by the reference member, to the laser light scanning section and reaches the distance measurement light receiving section. The distance measuring section measures the distance to the reference member based on the light receiving position of the second distance measurement light in the distance measurement light receiving section. The measurement result obtained by the distance measuring section is corrected by comparing with the reference distance stored in the reference distance storing section.

Here, since the reference member is provided in advance, it is not necessary to separately prepare a member equivalent to the reference member. In this way, it is possible to save labor in calibration and even improve the calibration accuracy. In addition, the reference member is arranged such that the optical path length of the correction optical path related to the reference member is a predetermined reference distance. The reference distance is stored in advance by the reference distance storing section. This is also effective in saving labor in calibrating the distance measuring sensor.

Moreover, according to the configuration, since the second distance measurement light is irradiated via the laser light scanning section, it is possible to calibrate in consideration of an influence of an error caused by at least one of the first and the second scanners. As a result, the calibration accuracy can be improved.

According to a second aspect of the invention, the reference member may be arranged such that the correction optical path is formed when both the first scanner and the second scanner are in a specific rotation posture, and the first scanner and the second scanner are arranged in this order between the distance measurement light emitting section and the reference member in the correction optical path.

According to this configuration, it is possible to calibrate taking into consideration an influence of an error caused by both of the firs and the second scanners. This is effective in improving the calibration accuracy.

According to a third aspect of the invention, the laser processing apparatus may include a reflection mirror which is arranged between the second scanner and the reference member in the correction optical path and directs the second distance measurement light scanned by the second scanner to the reference member.

According to this configuration, by providing the reflection mirror between the second scanner and the reference member, the correction optical path can be bent as necessary. As a result, it is possible to increase a degree of freedom of layout in the housing.

According to a fourth aspect of the invention, the specific rotation posture formed by at least one of the first scanner and the second scanner is a rotation posture outside a scanning range of the laser light by the laser light scanning section on the surface of the workpiece.

When the specific rotation posture includes a posture used during laser processing (a rotation posture within the scanning range of the laser light), the area that can be scanned by the first and the second scanners would be limited.

On the other hand, according to the configuration, the specific rotation posture is a rotation posture outside the scanning range of the laser light, and thus it is possible to secure a wide area that can be scanned by the first and the second scanners.

According to a fifth aspect of the invention, the laser processing apparatus may include a merging mechanism which is provided in the middle of an optical path from the laser light output section to the laser light scanning section in the housing and merges the first distance measurement light or the second distance measurement light emitted from the distance measurement light emitting section with the optical path, and the merging mechanism may guide the first distance measurement light which is reflected by the workpiece to return to the laser light scanning section, or the second distance measurement light which is reflected by the reference member to return to the laser light scanning section, to the distance measurement light receiving section.

According to this configuration, the optical path from the laser light output section to the laser light scanning section and the correction optical path share a section connecting the merging mechanism and the laser light scanning section. This is advantageous in configuring the laser processing apparatus in a compact manner.

A sixth aspect of the invention relates to a laser processing apparatus including an excitation light generating section which generates excitation light, a laser light output section which generates laser light based on the excitation light generated by the excitation light generating section and emits the laser light, a laser light scanning section which includes a first scanner that scans the laser light emitted from the laser light output section in a first direction, and a second scanner that scans the laser light scanned by the first scanner in a second direction substantially orthogonal to the first direction, and irradiates a workpiece with the laser light scanned by the second scanner, and a housing in which at least the laser light output section and the laser light scanning section are provided.

According to the sixth aspect of the invention, the laser processing apparatus includes a distance measurement light emitting section which is provided in the housing and emits a first distance measurement light for measuring a distance from the laser processing apparatus to a surface of the workpiece, or a second distance measurement light for correcting a measurement result thereof, a dividing mechanism which is provided in the housing and guides at least a part of the first distance measurement light to the laser light scanning section when the first distance measurement light is emitted from the distance measurement light emitting section, and guides at least a part of the second distance measurement light to a part other than the laser light scanning section when the second distance measurement light is emitted from the distance measurement light emitting section, a reference member which, in a state in which at least one of the first scanner and the second scanner is in a specific rotation posture, is arranged at a position which is the other end of a correction optical path formed via the dividing mechanism with the distance measurement light emitting section as one end of the correction optical path, and is arranged such that an optical path length of the correction optical path is a predetermined reference distance, a distance measurement light receiving section which is provided in the housing and receives any one of the first distance measurement light reflected by the workpiece and the second distance measurement light reflected by the reference member via the dividing mechanism, a distance measuring section which measures a distance from the laser processing apparatus to the surface of the workpiece by a triangulation method based on a light receiving position of the first distance measurement light in the distance measurement light receiving section, and measures a distance to the reference member by the triangulation method based on a light receiving position of the second distance measurement light in the distance measurement light receiving section, a reference distance storing section which stores the reference distance in advance, and a distance correcting section which, when the distance to the reference member has been measured by using the correction optical path, compares the measurement result with the reference distance stored in the reference distance storing section to correct the measurement result obtained by the distance measuring section.

According to this configuration, the distance measurement light emitting section emits the first distance measurement light when the distance from the laser processing apparatus to the surface of the workpiece is measured. The first distance measurement light emitted from the distance measurement light emitting section is irradiated onto the workpiece via the merging mechanism and the laser light scanning section. The first distance measurement light irradiated onto the workpiece returns, after being reflected by the workpiece, to the laser light scanning section and the merging mechanism in this order and reaches the distance measurement light receiving section. The distance measuring section measures the distance to the surface of the workpiece based on the light receiving position of the first distance measurement light in the distance measurement light receiving section.

When the measurement result obtained by the distance measuring section is corrected, the distance measurement light emitting section emits the second distance measurement light. In this case, the correction optical path connecting the distance measurement light emitting section and the reference member is formed via the merging mechanism by making at least one of the first scanner and the second scanner in a specific rotation posture. The correction optical path is an optical path that takes the distance measurement light emitting section as one end and the reference member as the other end, and the correction optical path passes through the merging mechanism on the way between the distance measurement light emitting section and the reference member. Therefore, the second distance measurement light emitted from the distance measurement light emitting section is irradiated onto the reference member via the merging mechanism. The second distance measurement light irradiated onto the reference member returns, after being reflected by the reference member, to the merging mechanism and reaches the distance measurement light receiving section. The distance measuring section measures the distance to the reference member based on the light receiving position of the second distance measurement light in the distance measurement light receiving section. The measurement result obtained by the distance measuring section is corrected by comparing with the reference distance stored in the reference distance storing section.

Here, since the reference member is provided in the housing in advance, it is not necessary to separately prepare a member equivalent to the reference member. In this way, it is possible to save labor in calibration and even improve the calibration accuracy. In addition, the reference member is arranged such that the optical path length of the correction optical path related to the reference member is a predetermined reference distance. The reference distance is stored in advance by the reference distance storing section. This is also effective in saving labor in calibrating the distance measuring sensor.

Moreover, according to the configuration, since the second distance measurement light is irradiated without going through the laser light scanning section, it is possible to perform calibration regardless of a state of a galvano scanner, etc., included in the laser light scanning section. This makes it possible to execute calibration without adjusting the posture of the galvano scanner.

According to a seventh aspect of the invention, the dividing mechanism may have a movable mirror which reflects light emitted from the distance measurement light emitting section, and the movable mirror may be retracted from an optical path connecting the distance measurement light emitting section and the laser light scanning section when the first distance measurement light is emitted from the distance measurement light emitting section, and may be inserted into the optical path connecting the distance measurement light emitting section and the laser light scanning section when the second distance measurement light is emitted from the distance measurement light emitting section.

According to an eighth aspect of the invention, the dividing mechanism may have a beam splitter which transmits a part of light emitted from the distance measurement light emitting section and reflects the other part, and the beam splitter may be arranged to guide a part of light emitted from the distance measurement light emitting section to the laser light scanning section and guide the other part to the reference member.

According to a ninth aspect of the invention, a wavelength of the first distance measurement light may be different from a wavelength of the second distance measurement light, the dividing mechanism may have a dichroic mirror which transmits one of the first distance measurement light and the second distance measurement light and reflects the other, and the dichroic mirror may be arranged to guide the first distance measurement light to the laser light scanning section and guide the second distance measurement light to the reference member.

According to a tenth aspect of the invention, the laser processing apparatus may include a merging mechanism which is provided in the middle of an optical path from the laser light output section to the laser light scanning section in the housing and merges the first distance measurement light or the second distance measurement light emitted from the distance measurement light emitting section with the optical path, the merging mechanism may be configured to guide the first distance measurement light which is reflected by the workpiece to return to the laser light scanning section, or the second distance measurement light which is reflected by the reference member to return to the laser light scanning section, to the distance measurement light receiving section, and the dividing mechanism may be provided in the middle of an optical path connecting the distance measurement light emitting section and the merging mechanism.

According to this configuration, the optical path from the laser light output section to the laser light scanning section and the correction optical path share a section connecting the merging mechanism and the laser light scanning section.

This is advantageous in configuring the laser processing apparatus in a compact manner.

According to an eleventh aspect of the invention, there may be a plurality of reference members, and the plurality of reference members may be arranged such that the reference distances are different from each other.

According to this configuration, it is possible to perform calibration with high accuracy by executing correction using a plurality of reference members. As a result, calibration accuracy can be improved.

As described above, according to the laser processing apparatus, the calibration accuracy can be improved.

DESCRIPTION OF EMBODIMENTS

Embodiments of the invention will be described below with reference to the drawings. The following description is merely illustrative.

That is, in the present specification, a laser marker as an example of a laser processing apparatus will be described. However, the technology disclosed herein can also be applied to general laser application devices regardless of names of the laser processing apparatus and the laser marker.

In the specification, printing processing will be described as a representative example of processing. However, it is not limited to printing processing, and can be used in any processing that uses laser light, such as image marking.

<Overall configuration>

Figure 1:
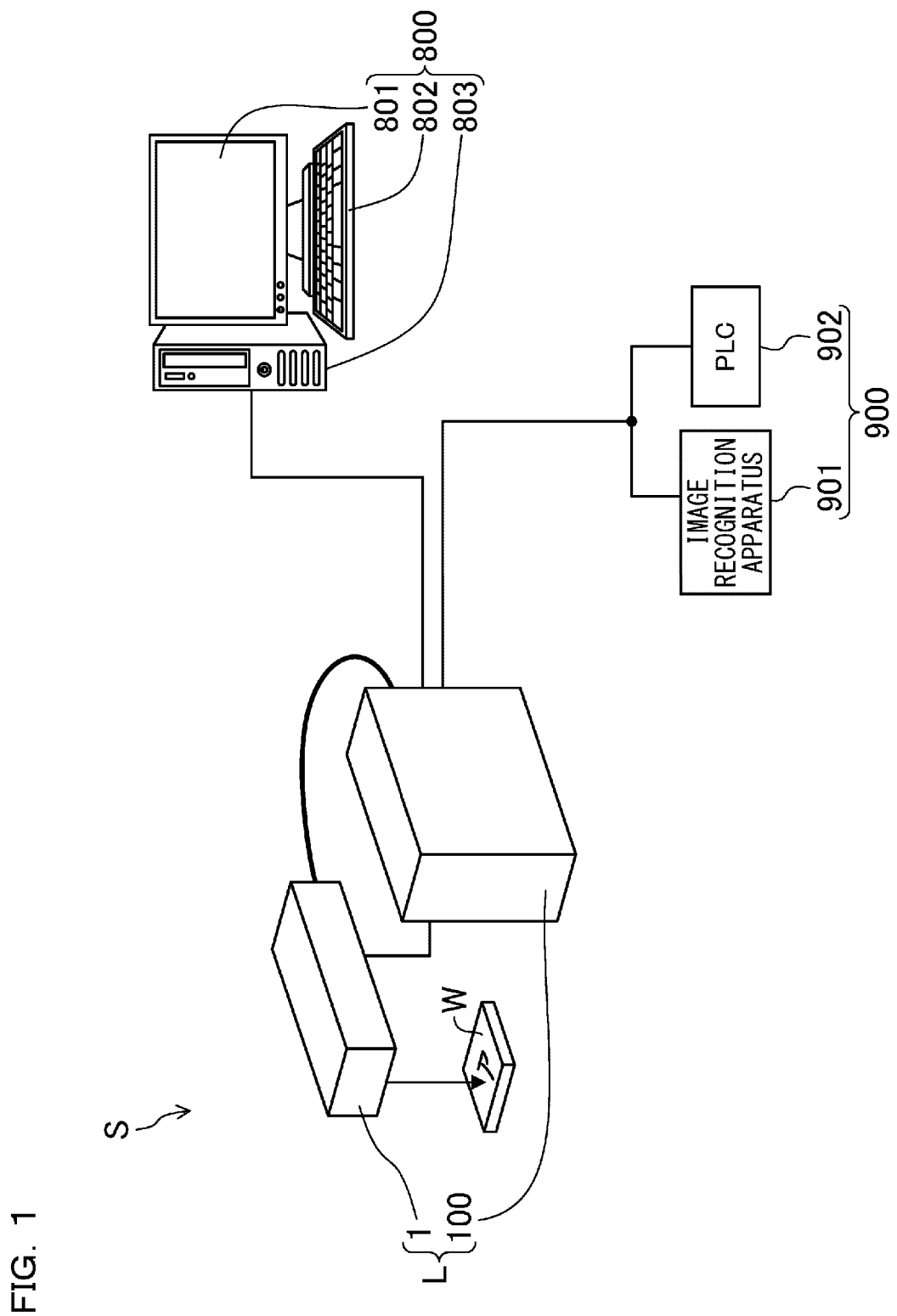
FIG. 1 is a diagram illustrating an overall configuration of a laser processing system.
Figure 2:
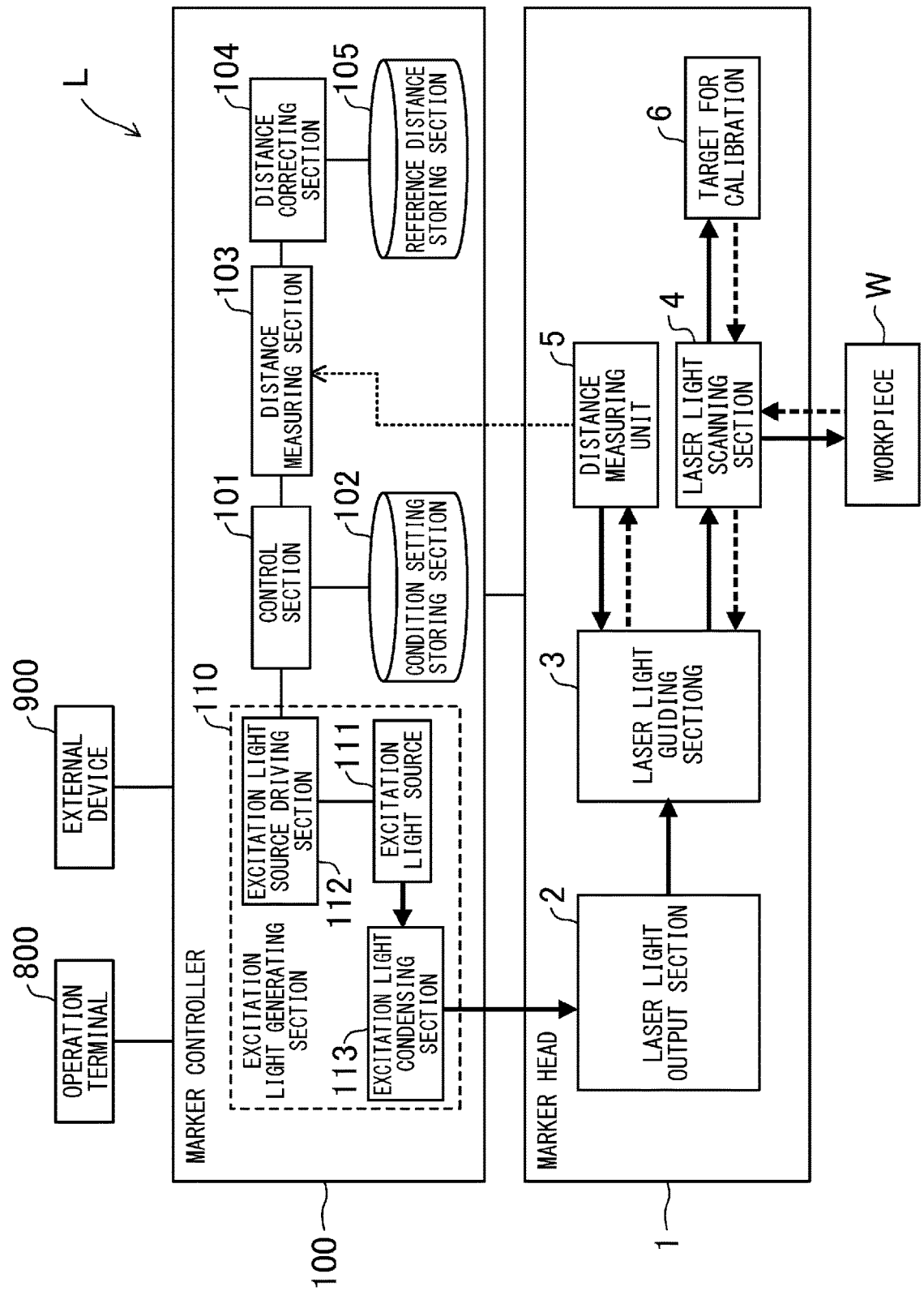
FIG. 2 is a block diagram illustrating a schematic configuration of a laser processing apparatus.

FIG. 1 is a diagram illustrating an overall configuration of a laser processing system S, and FIG. 2 is a diagram illustrating a schematic configuration of a laser processing apparatus L in the laser processing system S. The laser processing system S illustrated in FIG. 1 includes the laser processing apparatus L, and an operation terminal 800 and an external device 900 connected to the laser processing apparatus L.

The laser processing apparatus L illustrated in FIG. 1 and FIG. 2 irradiates a workpiece W as a processing target with laser light emitted from a marker head 1, and performs processing by performing a three-dimensional scanning on the surface of the workpiece W. Here, the "three-dimensional scanning" refers to a concept that generically refers to a combination of a two-dimensional operation (i.e., "two-dimensional scanning") of scanning an irradiation destination of laser light on the surface of the workpiece W, and a one-dimensional operation of adjusting a focal position of the laser light.

In particular, the laser processing apparatus L according to the present embodiment can emit laser light having a wavelength near 1064 nm as laser light for processing the workpiece W. The wavelength corresponds to a near-infrared (NIR) wavelength region. Therefore, in the following description, the laser light for processing the workpiece W may be referred to as "near-infrared laser light" to be distinguished from other laser light. Of course, laser light having other wavelengths may also be used for processing the workpiece W.

The laser processing apparatus L according to the embodiment can measure a distance to the workpiece W via a distance measuring unit 5 incorporated in the marker head 1 and can adjust a focal position using a measurement result thereof. In order to calibrate the measurement result, a target for calibration 6 is also incorporated in the marker head 1 in the laser processing apparatus L.

As shown in FIG. 1 and FIG. 2, the laser processing apparatus L includes the marker head 1 for emitting laser light and a marker controller 100 for controlling the marker head 1.

The marker head 1 and the marker controller 100 are separated from each other in the embodiment, and are electrically connected via an electrical wiring and optically coupled via an optical fiber cable.

More generally, one of the marker head 1 and the marker controller 100 can be incorporated into the other to be integrated together. In this case, an optical fiber cable or the like can be omitted as appropriate.

The operation terminal 800 includes, for example, a central processing unit (CPU) and a memory, and is connected to the marker controller 100. The operation terminal 800 sets various processing conditions such as printing setting, and also functions as a terminal for showing information related to laser processing to a user. The operation terminal 800 includes a display section 801 for displaying information to the user, an operating section 802 which receives an operation input from the user, and a storing device 803 for storing various kinds of information.

Specifically, the display section 801 is configured by, for example, a liquid crystal display or an organic EL panel. The display section 801 displays an operation status and a processing condition, etc., of the laser processing apparatus L as information related to laser processing. The operating section 802 is configured by, for example, a keyboard and/or a pointing device. Here, the pointing device includes a mouse and/or a joystick, etc. The operating section 802 is configured to receive an operation input from the user, and is used to operate the marker head 1 via the marker controller 100.

The operation terminal 800 configured as described above can set processing conditions in laser processing based on an operation input from the user. The processing conditions include, for example, a content (marking pattern) of a character string, etc., to be printed on the workpiece W, an output required for laser light (target output), and scanning speed of laser light on the workpiece W.

Further, the processing conditions according to the embodiment also include conditions and parameters (also referred to as "distance measurement conditions") related to the aforementioned distance measuring unit 5. Such distance measurement conditions include, for example, data and the like associating a signal indicating a detection result obtained by the distance measuring unit 5 with a distance to the surface of the workpiece W.

The processing conditions set by the operation terminal 800 are output to the marker controller 100 and stored in a condition setting storing section 102 thereof. The storing device 803 in the operation terminal 800 may store the processing conditions as necessary.

The operation terminal 800 can be incorporated into the marker controller 100 to be integrated together, for example. In this case, a name such as a control unit is used instead of the "operation terminal". However, at least in the embodiment, the operation terminal 800 and the marker controller 100 are separated from each other.

The external device 900 is connected to the marker controller 100 of the laser processing apparatus L as necessary. In the example shown in FIG. 1, an image recognition apparatus 901 and a programmable logic controller (PLC) 902 are provided as the external device 900.

Specifically, the image recognition apparatus 901 determines, for example, a type and a position of the workpiece W conveyed on a line. An image sensor, for example, can be used as the image recognition apparatus 901. The PLC 902 is used to control the laser processing system S according to a predetermined sequence.

In addition to the devices and apparatus described above, the laser processing apparatus L can also be connected to an apparatus for performing an operation and a control, a computer for performing various other kinds of processing, a storing apparatus, a peripheral device, etc. The connection in this case maybe, for example, a serial connection such as IEEE 1394, RS-232, RS-422 and USB, or a parallel connection. Alternatively, an electrical, magnetic, or optical connection can be adopted through a network such as 10BASE-T, 100BASE-TX, and 1000BASE-T. In addition to a wired connection, the connection may be a wireless LAN such as IEEE 802, or a wireless connection using radio waves such as Bluetooth (registered trademark), infrared rays, optical communication, etc. Moreover, as a storing medium used for a storing apparatus for exchanging data and storing various settings and the like, for example, various kinds of memory cards, magnetic disks, magneto-optical disks, semiconductor memories, and hard disks can be used.

Hereinafter, description will be made in order regarding a description relating to a hardware configuration of each of the marker controller 100 and the marker head 1, and a configuration relating to a control of the marker head 1 by the marker controller 100.

<Marker Controller 100>

As shown in FIG. 2, the marker controller 100 includes a condition setting storing section 102 which stores the aforementioned processing conditions, a control section 101 which controls the marker head 1 based on the processing conditions stored therein, and an excitation light generating section 110 which generates laser excitation light (excitation light).

(Condition Setting Storing Section 102)

The condition setting storing section 102 is configured to store a processing condition set via the operation terminal 800, and to output the stored processing condition to the control section 101 as necessary.

Specifically, the condition setting storing section 102 is configured using a volatile memory, a non-volatile memory, a hard disk drive (HDD), etc., and can temporarily or continuously store information indicating a processing condition. When the operation terminal 800 is incorporated into the marker controller 100, the storing device 803 can be configured to also serve as the condition setting storing section 102.

(Control Section 101)

The control section 101 executes printing processing and the like of the workpiece W by controlling at least the excitation light generating section 110 in the marker controller 100, and the laser light output section 2, the laser light guiding section 3, the laser light scanning section 4 and the distance measuring unit 5 in the marker head 1 based on the processing conditions stored in the condition setting storing section 102.

Specifically, the control section 101 includes a CPU, a memory, and an input/output bus, and generates a control signal based on a signal indicating information input via the operation terminal 800 and a signal indicating a processing condition read from the condition setting storing section 102. By outputting the control signal thus generated to each part of the laser processing apparatus L, the control section 101 controls printing processing on the workpiece W, measurement of a distance to the workpiece W, and calibration of the distance measuring unit 5 using the target for calibration 6.

For example, when starting processing of the workpiece W, the control section 101 reads a target output stored in the condition setting storing section 102 and outputs a control signal generated based on the target output to an excitation light source driving section 112 to control generation of laser excitation light.

(Excitation Light Generating Section 110)

The excitation light generating section 110 includes an excitation light source 111 which generates laser light corresponding to a drive current, the excitation light source driving section 112 which provides a drive current to the excitation light source 111, and an excitation light condensing section 113 which is optically coupled to the excitation light source 111. The excitation light source 111 and the excitation light condensing section 113 are fixed in an excitation casing which is not shown in the drawings. Although details are omitted, the excitation casing is made with a metal such as copper having excellent thermal conductivity, and can efficiently dissipate heat from the excitation light source 111.

Each part of the excitation light generating section 110 will be described below in order.

The excitation light source driving section 112 provides a drive current to the excitation light source 111 based on a control signal output from the control section 101. Although details are omitted, the excitation light source driving section 112 determines a drive current based on a target output determined by the control section 101, and provides a drive current thus determined to the excitation light source 111.

The excitation light source 111 oscillates laser light corresponding to the drive current while the drive current is provided from the excitation light source driving section 112. For example, the excitation light source 111 includes a laser diode (LD), etc., and an LD array or an LD bar in which a plurality of LD elements are arranged in a straight line can be used. When an LD array or an LD bar is used as the excitation light source 111, the laser light oscillated from each element is output in a line shape and enters the excitation light condensing section 113.

The excitation light condensing section 113 condenses laser light output from the excitation light source 111 and outputs the same as laser excitation light (excitation light). For example, the excitation light condensing section 113 includes a focusing lens, etc., and has an incident surface on which the laser light is incident, and an emission surface from which the laser excitation light is output. The excitation light condensing section 113 is optically coupled to the marker head 1 via the aforementioned optical fiber cable. Therefore, the laser excitation light output from the excitation light condensing section 113 is guided to the marker head 1 via the optical fiber cable.

The excitation light generating section 110 may be an LD unit or an LD module in which the excitation light source driving section 112, the excitation light source 111, and the excitation light condensing section 113 are incorporated in advance. In addition, the excitation light emitted from the excitation light generating section 110 (to be specific, the laser excitation light output from the excitation light condensing section 113) can be non-polarized, and this eliminates the need to consider a change in polarization state, which is advantageous in design. In particular, with regard to a configuration around the excitation light source 111, it is preferable that a mechanism which makes the output light non-polarized is provided in an LD unit itself that outputs light obtained from each of LD arrays in which tens of LD elements are arranged by bundling the light using an optical fiber.

(Other Components)

The marker controller 100 also includes a distance measuring section 103 which measures a distance to the workpiece W via the distance measuring unit 5, a distance correcting section 104 which calibrates the distance measuring unit 5 using the target for calibration 6, and a reference distance storing section 105 in which data relating to calibration by the distance correcting section 104 is stored.

The distance measuring section 103 is electrically connected to the distance measuring unit 5, and is capable of receiving a signal related to a measurement result obtained by the distance measuring unit 5 (a signal indicating at least a light receiving position of distance measurement light in a distance measurement light receiving section 5B). In addition, the distance correcting section 104 is electrically connected to the distance measuring section 103 and the reference distance storing section 105. The distance correcting section 104 appropriately reads data stored in the reference distance storing section 105, and is configured to be capable of transmitting and receiving a signal to and from the distance measuring section 103.

The distance measuring section 103, the distance correcting section 104, and the reference distance storing section 105 may be configured by the control section 101. In addition, anyone element of the distance measuring section 103, the distance correcting section 104, and the reference distance storing section 105 may also serve as the other element of them. For example, the control section 101 may function as the distance measuring section 103, and the distance measuring section 103 may function as the distance correcting section 104.

Furthermore, the reference distance storing section 105 may also be used as the condition setting storing section 102, or may be provided as a storing device separate from the marker controller 100 as in the operation terminal 800.

Specific functions of the distance measuring section 103, the distance correcting section 104, and the reference distance storing section 105 will be described later.

<Marker Head 1>

As described above, the laser excitation light generated by the excitation light generating section 110 is guided to the marker head 1 via the optical fiber cable. The marker head 1 includes the laser light output section 2 which amplifies, generates, and outputs laser light based on the laser excitation light, the laser light scanning section 4 which irradiates the surface of the workpiece W with the laser light output from the laser light output section 2 to perform a two-dimensional scanning, the laser light guiding section 3 which forms an optical path from the laser light output section 2 to the laser light scanning section 4, the distance measuring unit 5 for measuring a distance to the surface of the workpiece W based on distance measurement light projected and received via the laser light scanning section 4, and the target for calibration 6 for constituting a measurement result obtained by the distance measuring unit 5.

Here, the laser light guiding section 3 according to the embodiment does not only form an optical path, but also combines a plurality of members such as a Z scanner (focus adjusting section) 33 which adjusts a focal position of the laser light, and a guide light source (guide light emitting section) 35 which emits guide light.

Although details will be described later, the laser light guiding section 3 further includes an upstream side merging mechanism 31 which merges near-infrared laser light output from the laser light output section 2 and guide light emitted from a guide light source 36, and a downstream side merging mechanism 35 which merges laser light guided to the laser light scanning section 4 and the distance measurement light projected from the distance measuring unit 5.

Figure 3A:
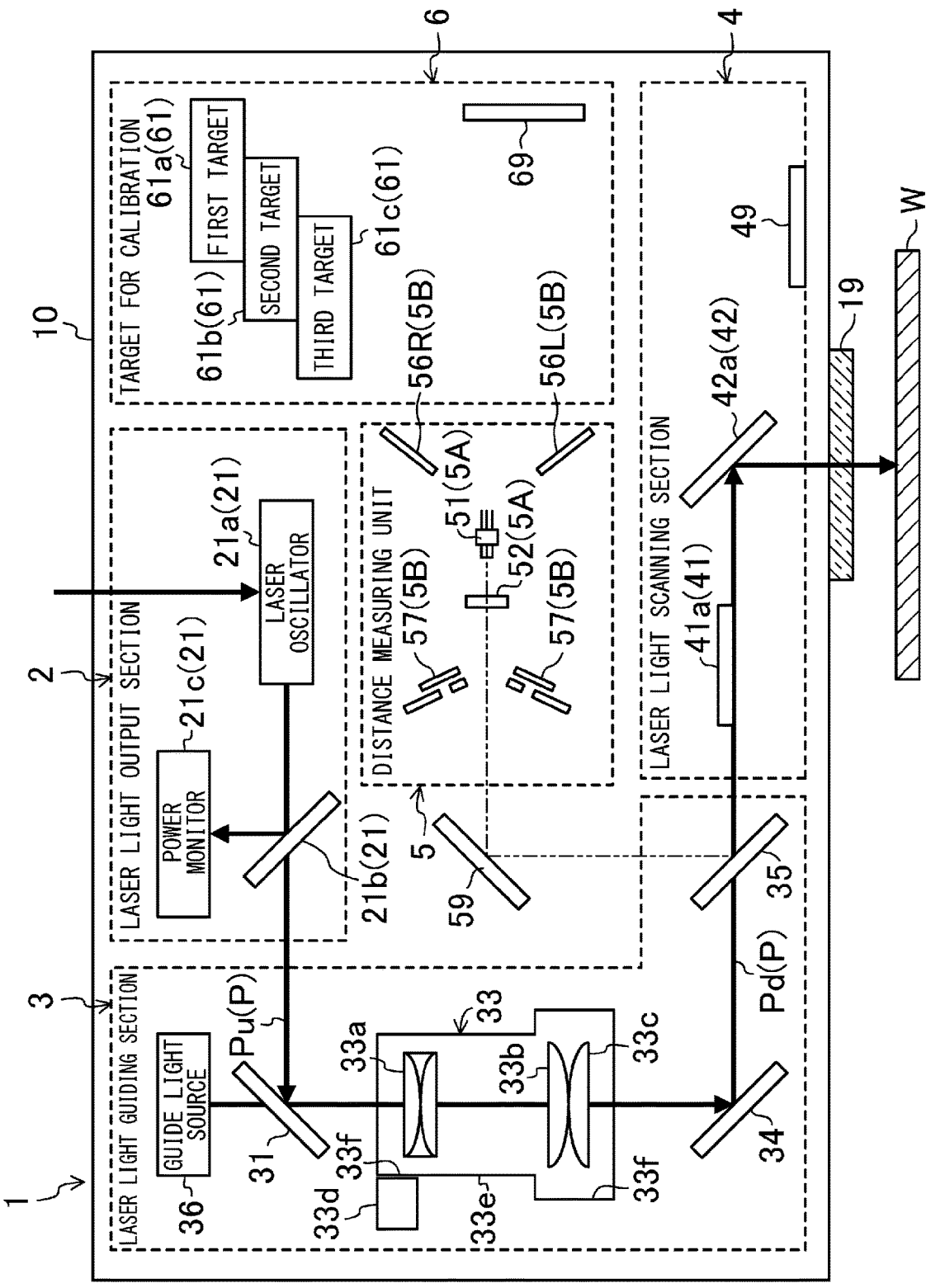
FIG. 3A is a block diagram illustrating a schematic configuration of a marker head.
Figure 3B:
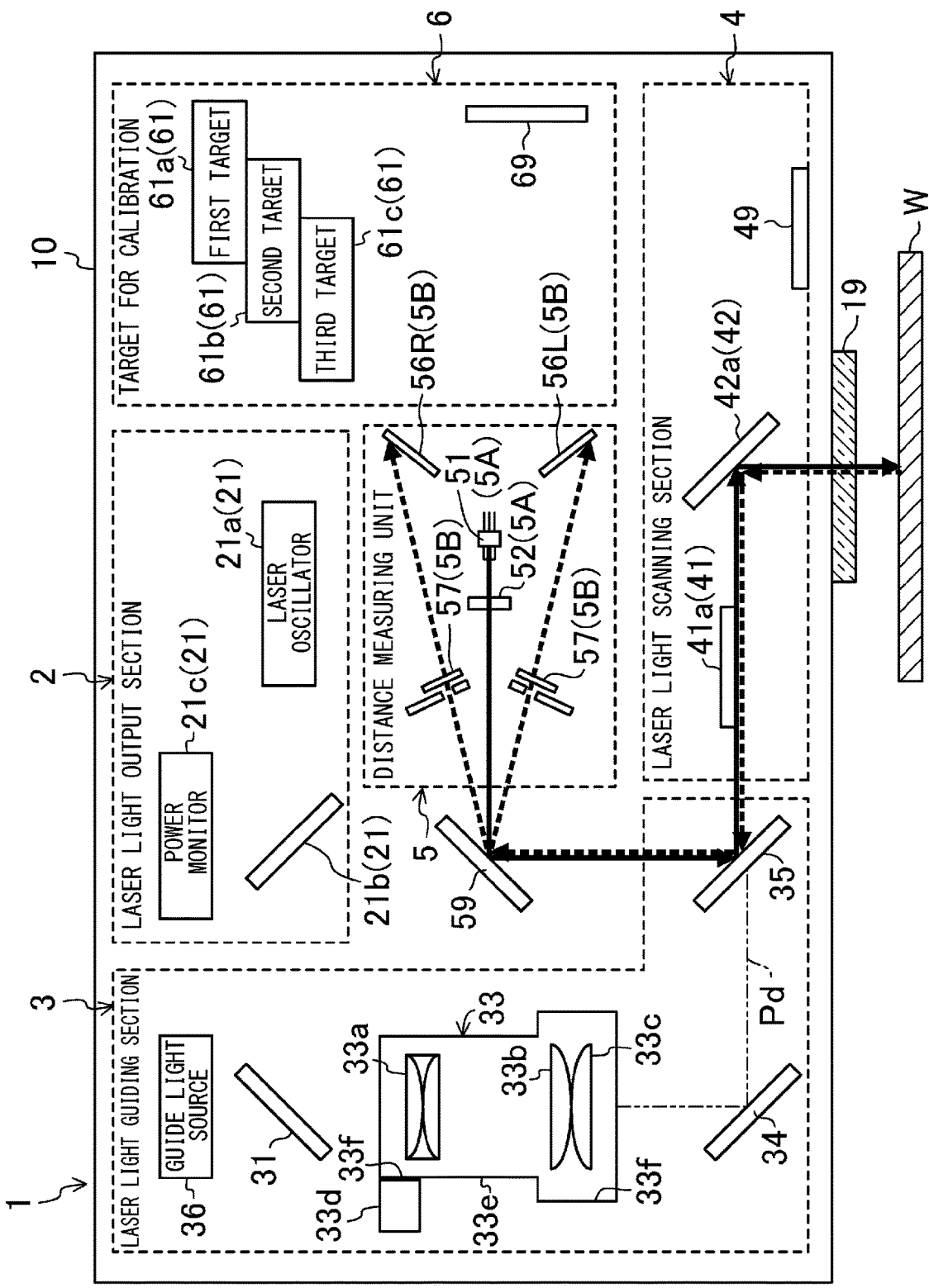
FIG. 3B is a block diagram illustrating a schematic configuration of a marker head.
Figure 3C:
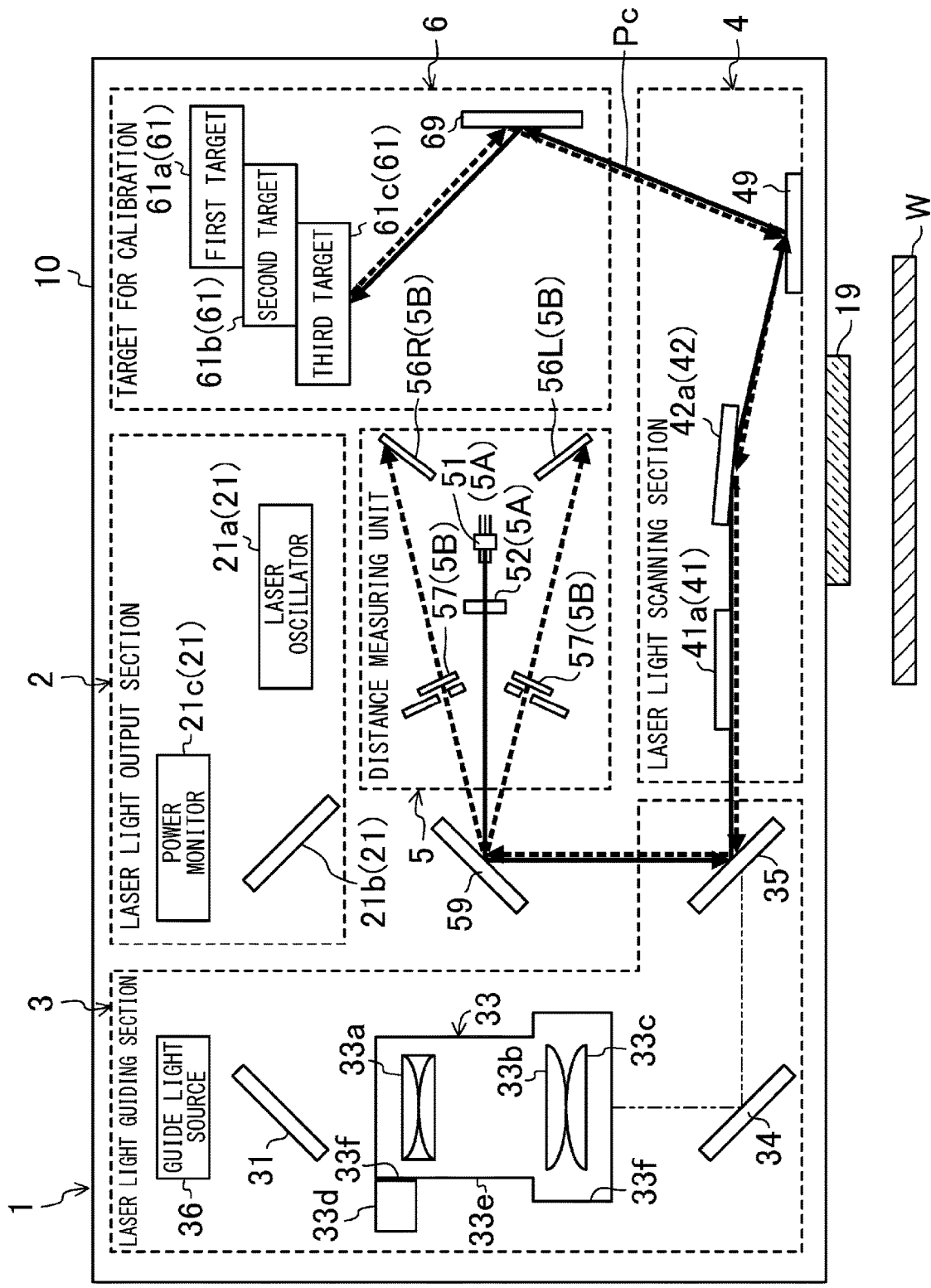
FIG. 3C is a block diagram illustrating a schematic configuration of a marker head.
Figure 4:
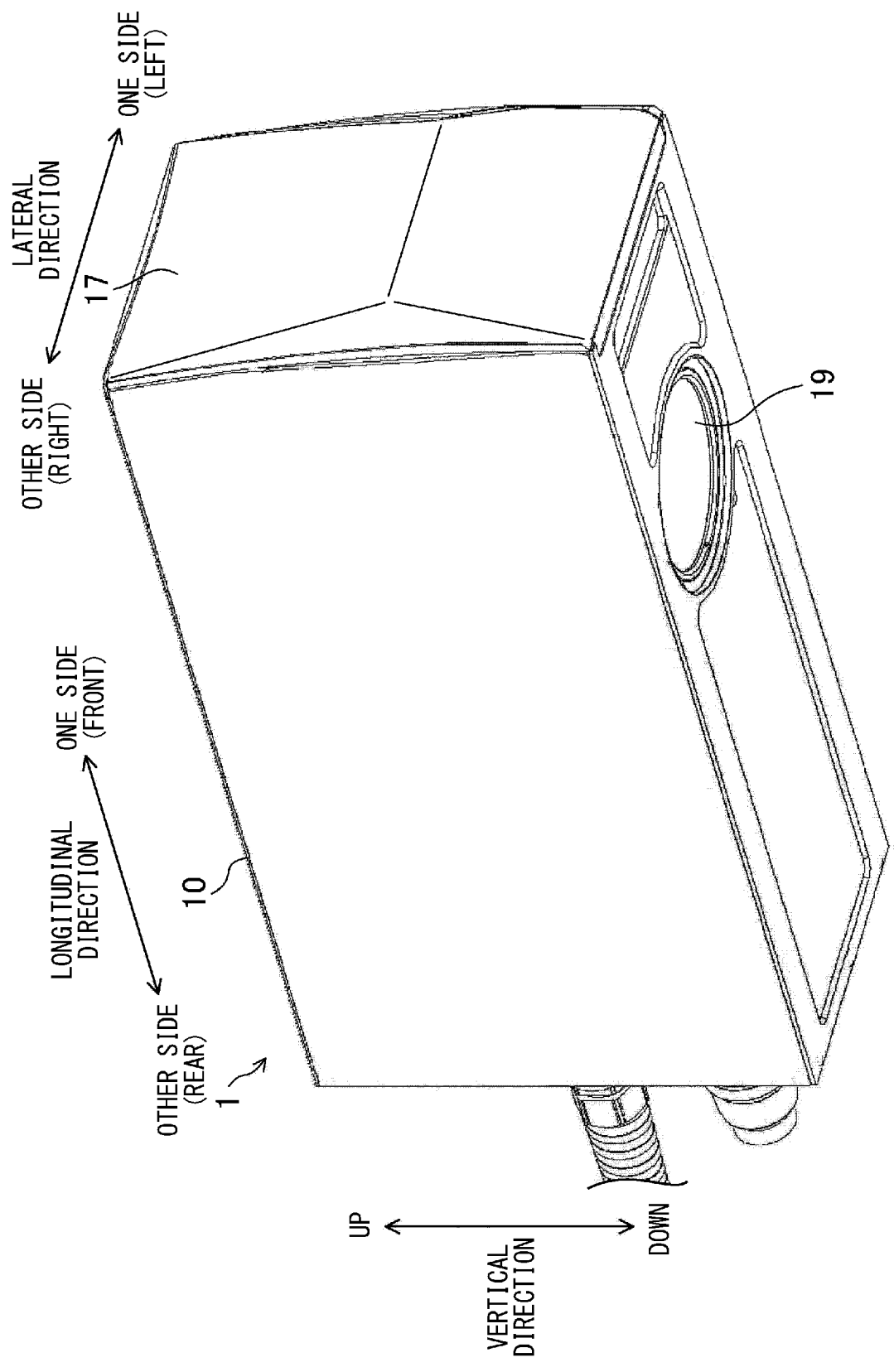
FIG. 4 is a perspective view illustrating an appearance of a marker head.

FIGS. 3A to 3C are block diagrams illustrating schematic configurations of the marker head 1, and FIG. 4 is a perspective view illustrating an appearance of the marker head 1. In FIG. 3A to FIG. 3C, FIG. 3A illustrates a case where the workpiece W is processed using near-infrared laser light, FIG. 3B illustrates a case where a distance to the surface of the workpiece W is measured using the distance measuring unit 5, and FIG. 3C illustrates a case where the distance measuring unit 5 is calibrated using the target for calibration 6.

As illustrated in FIG. 3A to FIG. 4, the marker head 1 includes a housing 10 in which at least the laser light output section 2, the laser light guiding section 3, the laser light scanning section 4, and the distance measuring unit 5 are provided. The housing 10 has a substantially rectangular outer shape as shown in FIG. 4. A lower surface of the housing 10 is partitioned by a plate-shaped bottomplate 10*a*. The bottomplate 10*a* is provided with an emission window portion 19 for emitting laser light from the marker head 1 to the outside of the marker head 1. The emission window portion 19 is configured by fitting a plate-shaped member capable of transmitting near-infrared laser light, guide light, and distance measurement light into a through hole that penetrates the bottom plate 10*a* in a thickness direction of the plate.

Figure 5:
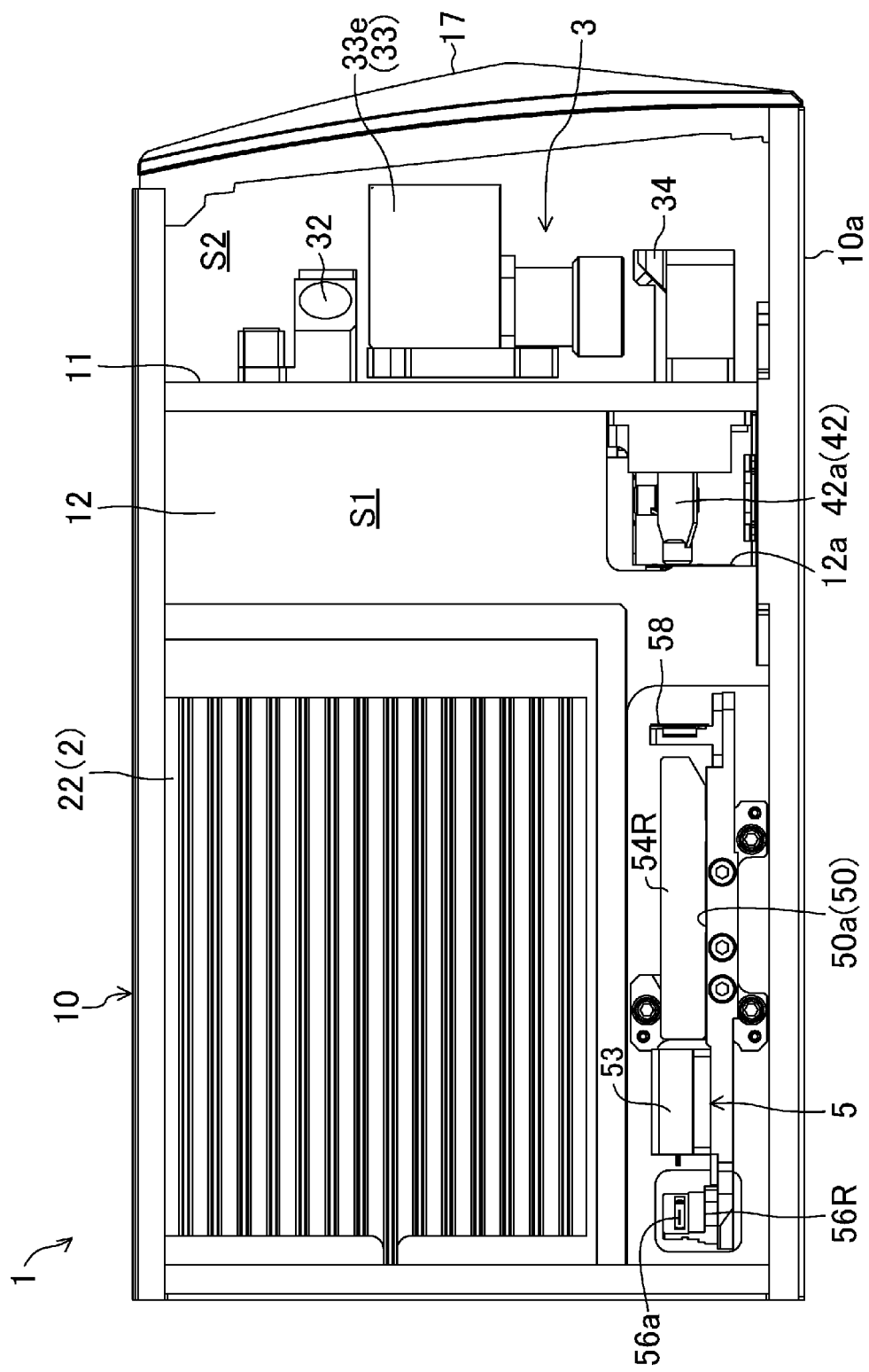
FIG. 5 is a side view illustrating an internal structure of a marker head.
Figure 6:
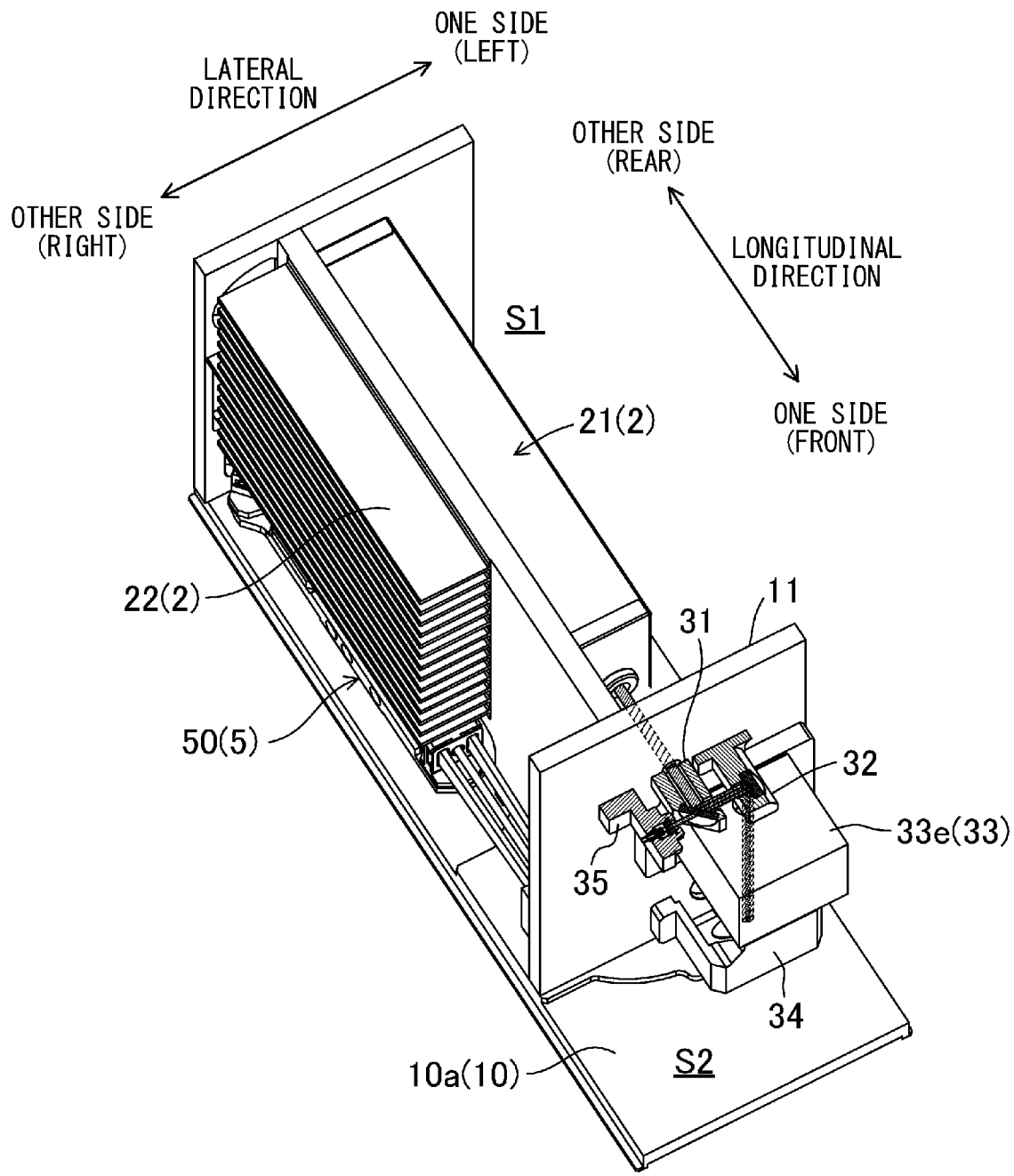
FIG. 6 is a perspective view illustrating an internal structure of a marker head.

FIG. 5 is a side view illustrating an internal structure of the marker head 1, and FIG. 6 is a perspective view illustrating the internal structure of the marker head 1. In the following description, the "longitudinal direction of the housing 10" refers to the left-right direction in FIG. 5, and the right side of FIG. 5 is referred to as "one side in the longitudinal direction" while the left side of FIG. 5 is referred to as "the other side in the longitudinal direction". Similarly, the "lateral direction of the housing 10" refers to a direction perpendicular to the paper surface of FIG. 5, and the rear side of the paper surface of FIG. 5 is referred to as "one side in the lateral direction" while the front side of the paper surface of FIG. 5 is referred to as "the other side in the lateral direction".

In other drawings, a direction corresponding to the longitudinal direction in FIG. 5 may be referred to as the "longitudinal direction of the housing 10" in cases. Similarly, a direction corresponding to the lateral direction in FIG. 5 may be referred to as the "lateral direction of the housing 10" in cases. In the following description, there are cases where the longitudinal direction of the housing 10 is simply referred to as "front-rear direction, and the lateral direction of the housing 10 is simply referred to as "left-right direction".

Further, the "vertical direction" in the following description is equal to the vertical direction on the paper surface in FIG. 5. In other drawings, a direction corresponding to this may be referred to as the "vertical direction" in cases.

As illustrated in FIG. 5 to FIG. 6, a partition portion 11 is provided inside the housing 10. The internal space of the housing 10 is partitioned by the partition portion 11 into one side and the other side in the longitudinal direction.

Specifically, the partition portion 11 is formed in a flat plate shape extending in a direction perpendicular to the longitudinal direction of the housing 10. Further, the partition portion 11 is arranged closer to one side in the longitudinal direction (front side in FIG. 4 to FIG. 6) in the longitudinal direction of the housing 10 than a central portion of the housing 10 in the same direction.

As a result, a space partitioned on one side in the longitudinal direction in the housing 10 has a shorter dimension in the longitudinal direction than a space partitioned on the other side in the longitudinal direction (rear side in FIG. 4 to FIG. 6). Hereinafter, the space partitioned on the other side in the longitudinal direction in the housing 10 is referred to as a first space S1, while the space partitioned on one side in the longitudinal direction is referred to as a second space S2.

In the embodiment, the laser light output section 2, apart of components in the laser light guiding section 3, the laser light scanning section 4, and the distance measuring unit 5 are arranged in the first space S1. Main components in the laser light guiding section 3 are arranged in the second space S2.

To be specific, the first space S1 is partitioned by a substantially flat base plate 12 into a space on one side in the lateral direction (left side in FIG. 6) and a space on the other side in the lateral direction (right side in FIG. 6). Components included in the laser light output section 2 are mainly arranged in the former space.

To be more specific, among the components included in the laser light output section 2, an optical component 21 which is required to be sealed as airtightly as possible, such as an optical lens and an optical crystal, is arranged in an accommodating space surrounded by the base plate 12 and the like in the space on one side in the lateral direction in the first space S1.

On the other hand, among the components included in the laser light output section 2, a component which is not necessarily required to be sealed, such as an electrical wiring and a heat sink 22, is arranged, for example, as shown in FIG. 6, on an opposite side (the other side in the lateral direction in the first space S1) to the optical component 21 with the base plate 12 sandwiched.

Figure 8:
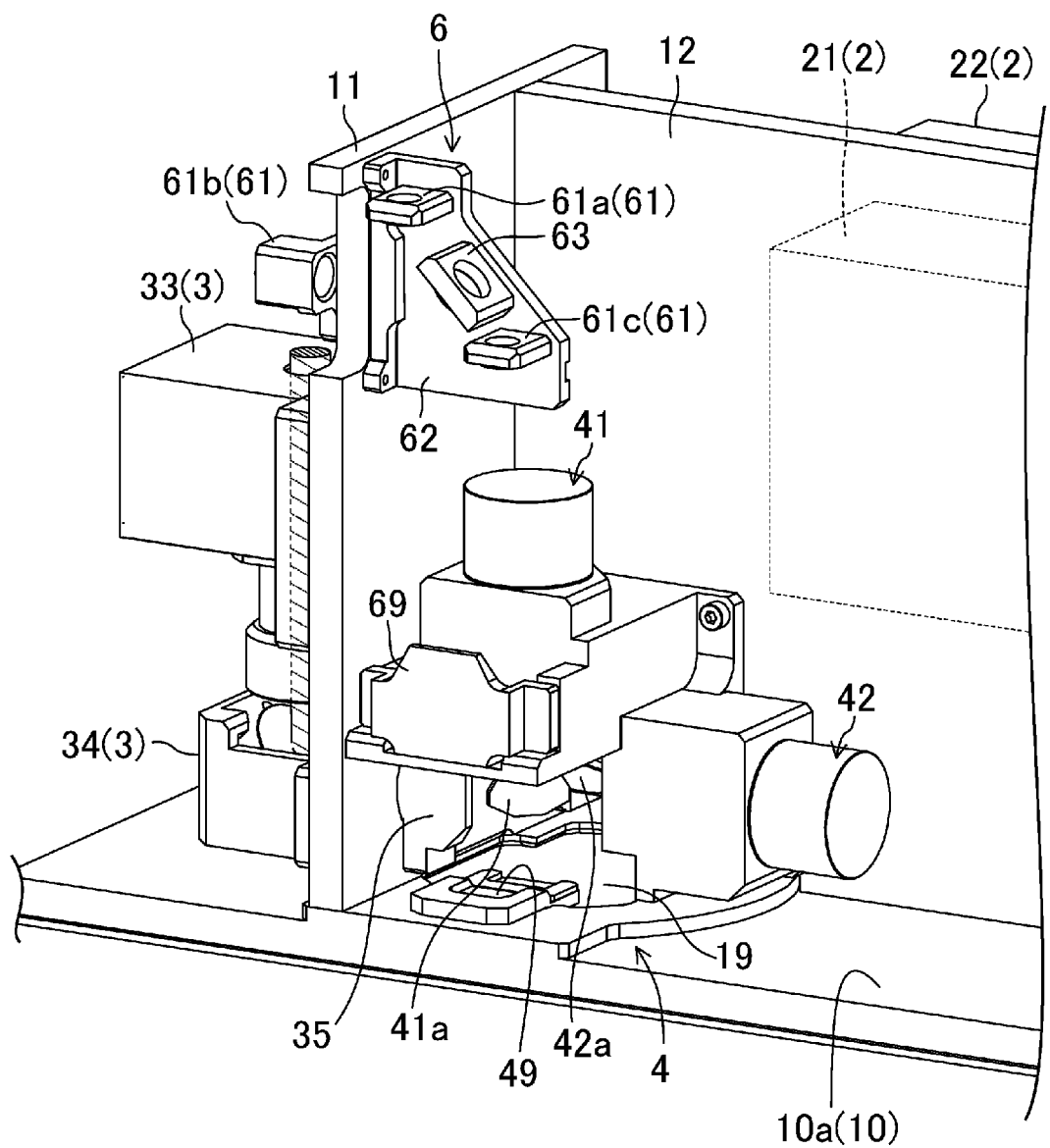
FIG. 8 is a perspective view illustrating a configuration of a laser light scanning section and a reference member.
Figure 12:
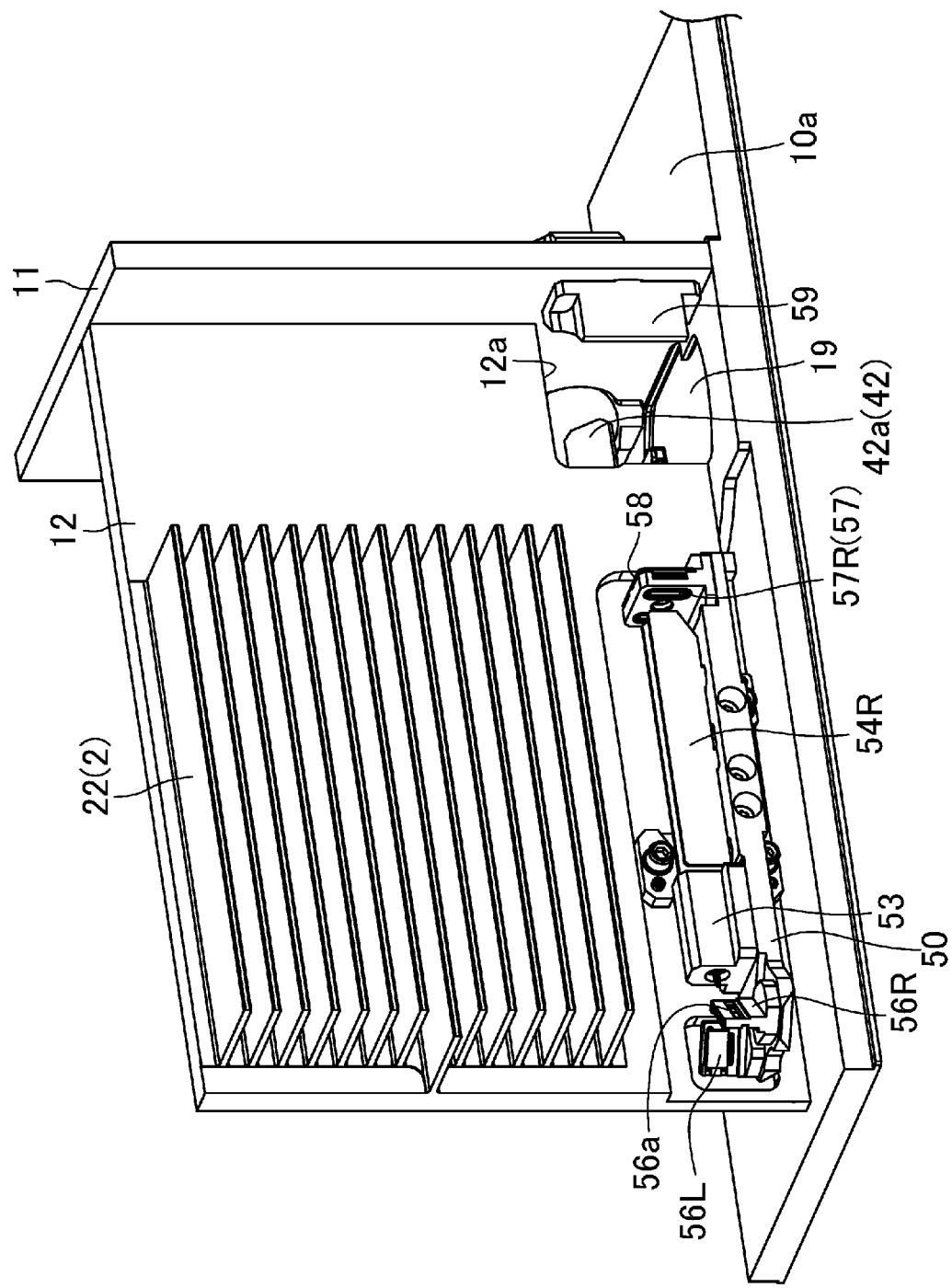
FIG. 12 is a perspective view illustrating a layout of the distance measuring unit.

Further, as illustrated in FIG. 8 and FIG. 12 which will be described later, the laser light scanning section 4 can be arranged on one side in the lateral direction with the base plate 12 sandwiched, in the same manner as the optical component 21 in the laser light output section 2 (see also FIG. 10 and the like). Specifically, the laser light scanning section 4 according to the embodiment is arranged along an inner bottom surface of the housing 10 in the vertical direction while adjoining the aforementioned partition portion 11 in the longitudinal direction.

Figure 9:
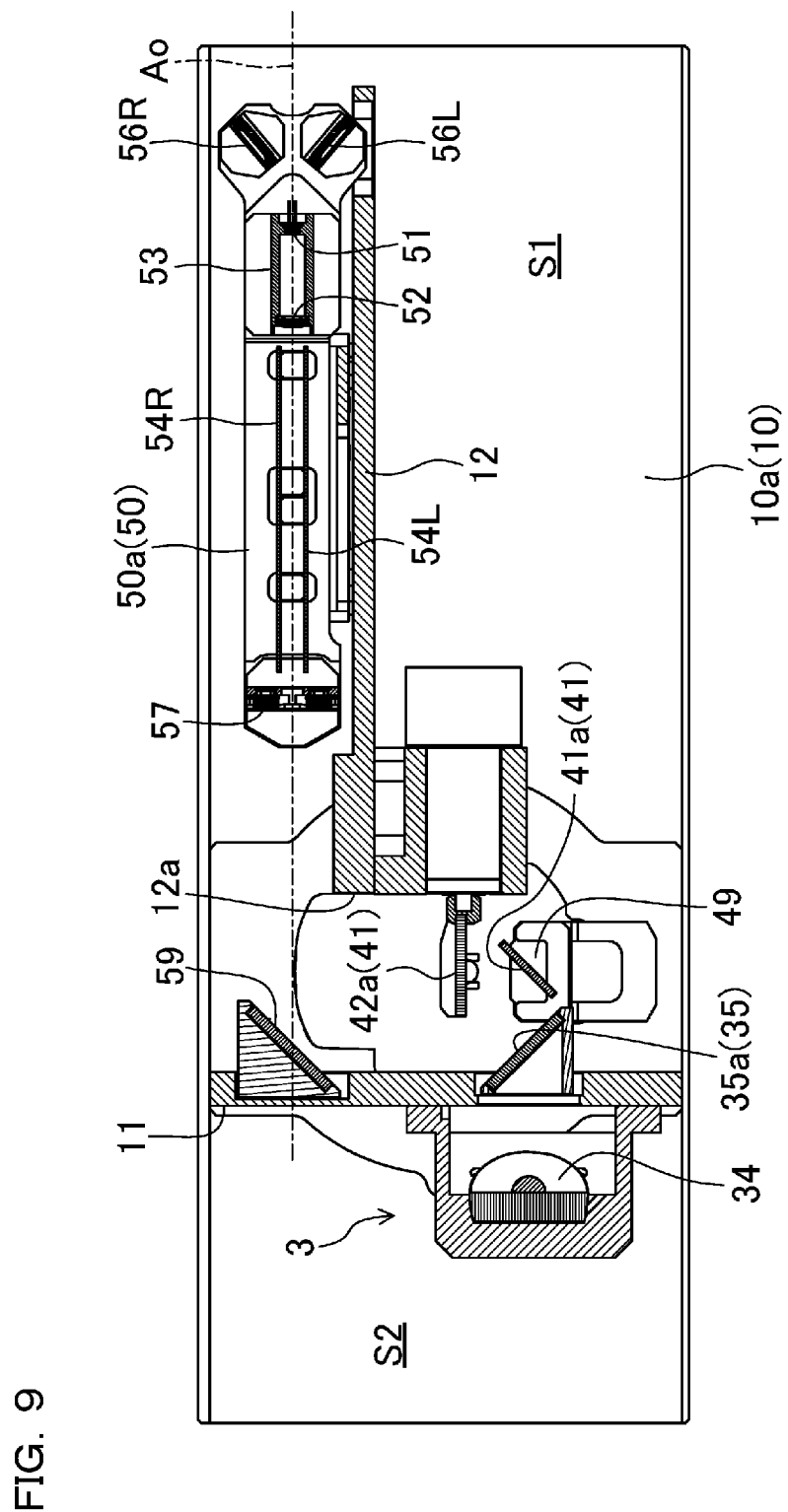
FIG. 9 is a sectional view illustrating a configuration of a laser light guiding section, a laser light scanning section, and a distance measuring unit.

In addition, as shown in FIG. 6 and FIG. 9 for example, the distance measuring unit 5 is arranged in a space on the other side in the lateral direction in the first space S1 in the same manner as the heat sink 22 in the laser light output section 2. Specifically, the distance measuring unit 5 according to the embodiment is arranged, as shown in FIG. 12 for example, below the heat sink 22, and is fastened to the base plate 12 from a side instead of to the aforementioned bottom plate 10*a*.

In addition, the components included in the laser light guiding section 3 are mainly arranged in the second space S2. In the embodiment, most of the components included in the laser light guiding section 3 are accommodated in a space surrounded by the partition portion 11 and a cover member 17 which partitions a front surface of the housing 10.

Among the components included in the laser light guiding section 3, the downstream side merging mechanism 35 is arranged in a part near the partition portion 11 in the first space S1. That is, in the embodiment, the downstream side merging mechanism 35 is positioned near a boundary between the first space S1 and the second space S2.

As described above, the downstream side merging mechanism 35 is configured to merge the laser light guided from the laser light guiding section 3 to the laser light scanning section 4 and the distance measurement light projected from the distance measuring unit 5. However, while the laser light scanning section 4 is arranged in the space on one side in the lateral direction, the distance measuring unit 5 is arranged in the space on the other side in the lateral direction with the base plate 12 sandwiched. Therefore, as shown in FIG. 5, a through hole 12a which penetrates the base plate 12 in the thickness direction of plate is formed in the base plate 12 (see also FIG. 12). Through the through hole 12a, the laser light guiding section 3, the laser light scanning section 4, and the distance measuring unit 5 are optically coupled.

Further, the aforementioned optical fiber cable is connected to a rear surface of the housing 10. The optical fiber cable is connected to the laser light output section 2 arranged in the first space S1.

Hereinafter, configurations of the laser light output section 2, the laser light guiding section 3, the laser light scanning section 4, and the distance measuring unit 5 will be described in order.

(Laser Light Output Section 2)

The laser light output section 2 is configured to generate near-infrared laser light for printing processing based on the laser excitation light generated by the excitation light generating section 110 and output the near-infrared laser light to the laser light guiding section 3.

Specifically, the laser light output section 2 includes a laser oscillator 21a which generates laser light having a predetermined wavelength based on the laser excitation light, amplifies the laser light, and emits near-infrared laser light, a beam sampler 21b for separating a part of the near-infrared laser light oscillated by the laser oscillator 21a, and a power monitor 21c on which the near-infrared laser light separated by the beam sampler 21b is incident.

Although details are omitted, the laser oscillator 21a according to the embodiment includes a laser medium which performs stimulated emission corresponding to laser excitation light to emit laser light, a Q switch for pulse oscillation of laser light emitted from the laser medium, and a mirror which resonates the laser light to which pulse oscillation has been performed by the Q switch.

Particularly in the embodiment, a rod-shaped $Nd:YVO_4$ (yttrium vanadate) is used as the laser medium. As a result, the laser oscillator 21a can emit laser light (the aforementioned near-infrared laser light) having a wavelength near 1064 nm. However, the invention is not limited to this example, and, for example, YAG, YLF, $GdVO_4$ and the like in which a rare earth element is doped can also be used as other laser media. Various kinds of solid laser media can be used according to the use of the laser processing apparatus L.

In addition, a wavelength conversion element can be combined with a solid laser medium to convert the wavelength of the output laser light into any wavelength. Further, a so-called fiber laser using a fiber as an oscillator instead of a bulk as a solid laser medium may be used.

Moreover, the laser oscillator 21a may be configured by combining a solid laser medium such as $Nd:YVO_4$ with a fiber. In that case, it is possible to emit a laser with a short pulse width to suppress thermal damage to the workpiece W as in the case of using a solid laser medium, and it is also possible to achieve a higher output and faster printing processing as in the case of using a fiber.

The power monitor 21c detects an output of near-infrared laser light. The power monitor 21c is electrically connected to the marker controller 100, and can output a detection signal thereof to the control section 101, etc.

(Laser Light Guiding Section 3)

The laser light guiding section 3 forms an optical path P which guides near-infrared light emitted from the laser light output section 2 to the laser light scanning section 4. The laser light guiding section 3 includes, in addition to a first bend mirror 32 and a second bend mirror 34 for forming the optical path P, the Z scanner (focus adjusting section) 33 and the guide light source (guide light emitting section) 36, etc. All of these components are provided inside the housing 10 (mainly in the second space S2).

Figure 7:
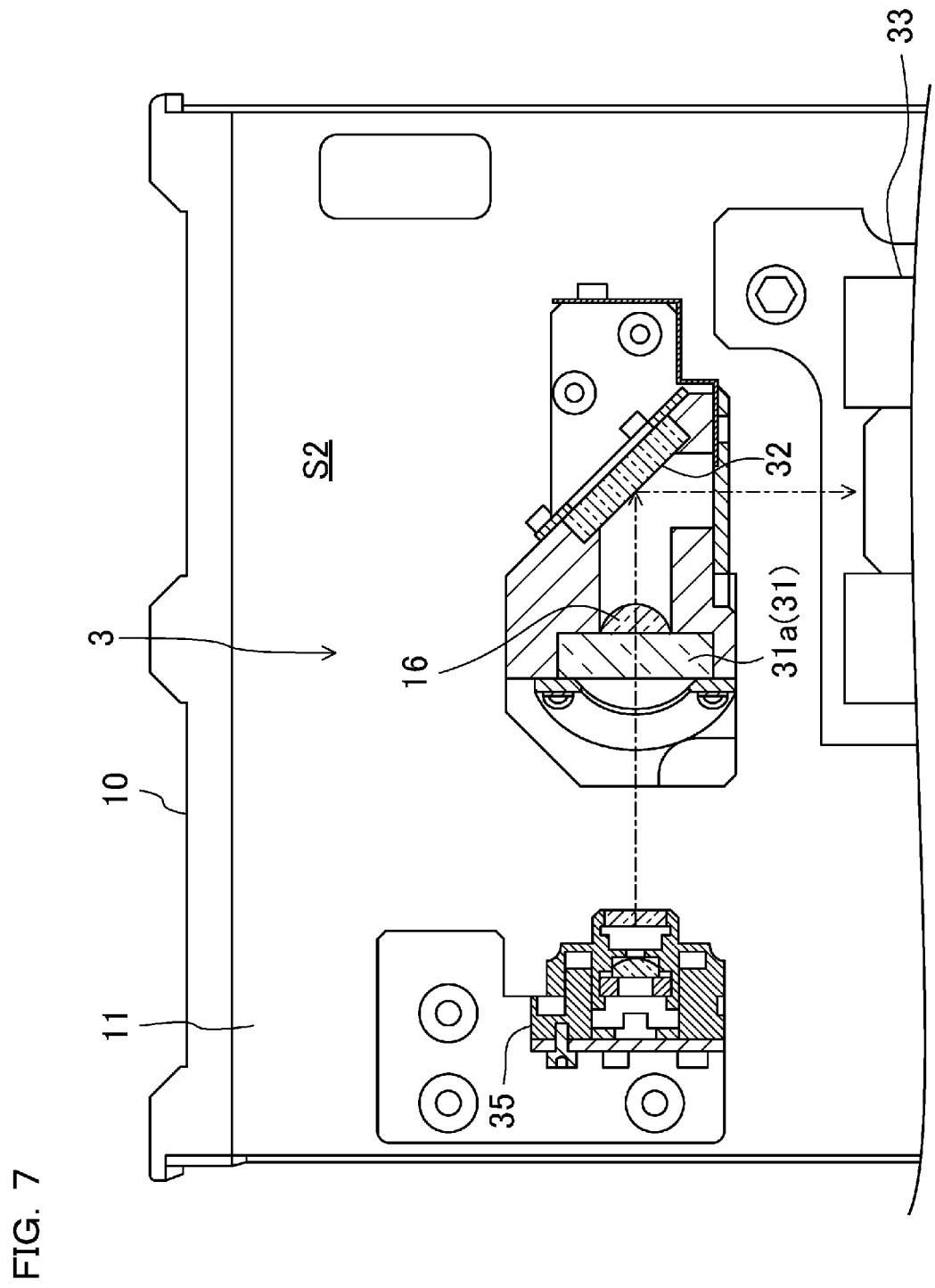
FIG. 7 is a diagram illustrating a configuration around a guide light emitting section in a laser light guiding section.

FIG. 7 is a diagram illustrating a configuration around the guide light source 36 in the laser light guiding section 3, and FIG. 8 is a perspective view illustrating a configuration of the laser light scanning section 4 and the target for calibration 6. Further, FIG. 9 is a sectional view illustrating a configuration of the laser light guiding section 3, the laser light scanning section 4, and the distance measuring unit 5, FIG. 10 is a sectional view illustrating an optical path connecting the laser light guiding section 3, the laser light scanning section 4, and the distance measuring unit 5, and FIG. 11 is a perspective view illustrating an optical path connecting the laser light guiding section 3, the laser light scanning section 4, and the distance measuring unit 5.

As shown in FIG. 6 and FIG. 7, the laser light guiding section 3 is optically coupled with the laser light output section 2 via an output window portion 16 provided above the partition portion 11 (specifically, slightly above a central portion in the vertical direction of the housing 10). In this way, the near-infrared laser light output from the laser light output section 2 is incident on the laser light guiding section 3 through the output window portion 16.

The near-infrared laser light incident through the output window portion 16 is reflected by the first bend mirror 32 and the second bend mirror 34 in this order and passes through the laser light guiding section 3. The Z scanner 33 which adjusts the focal position of the near-infrared laser light reflected by the first bend mirror 32 is arranged between the first bend mirror 32 and the second bend mirror 34. The near-infrared laser light that passes through the Z scanner 33 and is reflected by the second bend mirror 34 enters the laser light scanning section 4.

The optical path P formed by the laser light guiding section 3 can be divided into two with the Z scanner 33, which is a focus adjusting section, as a boundary. To be specific, the optical path P formed by the laser light guiding section 3 can be divided into an upstream side optical path Pu which is from the laser light output section 2 to the Z scanner 33, and a downstream side optical path Pd which is from the Z scanner 33 to the laser light scanning section 4.

To be more specific, the upstream side optical path Pu is provided inside the housing 10, and is from the output window portion 16 in the laser light output section 2 to the Z scanner 33 passing through the aforementioned upstream side merging mechanism 31 and the first bend mirror 32 in this order.

The downstream side optical path Pd is provided inside the housing 10, and is from the Z scanner 33 to a first scanner 41 in the laser light scanning section 4 passing through the second bend mirror 34 and the aforementioned downstream side merging mechanism 35 in this order.

As described above, in the housing 10, the upstream side merging mechanism 31 is provided in the middle of the upstream side optical path Pu, and the downstream side merging mechanism 35 is provided in the middle of the downstream side optical path Pd.

A configuration related to the laser light guiding section 3 will be described below in order.

—Guide Light Source 36—

The guide light source 36 is provided in the second space S2 inside the housing 10 and emits guide light for projecting a predetermined processing pattern on the surface of the workpiece W. The wavelength of the guide light is set so as to be within a visible light range. As an example, the guide light source 36 according to the embodiment emits red laser light having a wavelength near 655 nm as guide light. Therefore, when the guide light is emitted from the marker head 1, the user can visually recognize the guide light.

In the embodiment, the wavelength of the guide light is set to be different from at least the wavelength of the near-infrared laser light. Further, as will be described later, a distance measurement light emitting section 5A in the distance measuring unit 5 emits distance measurement light having a wavelength different from those of the guide light and the near-infrared laser light. Therefore, the distance measurement light, the guide light, and the laser light have different wavelengths from one another.

Specifically, the guide light source 36 is arranged at substantially the same height as the output window portion 16 and the upstream side merging mechanism 31 in the second space S2, and can emit a visible light laser (guide light) towards an inner side in the lateral direction of the housing 10. The guide light source 36 is further in a posture such that an optical axis of the guide light emitted from the guide light source 36 and the upstream side merging mechanism 31 intersect.

Here, "substantially the same height" refers to that, when viewed from the bottom plate 10a forming the lower surface of the housing 10, the height positions are substantially equal. In other descriptions, it also refers to a height viewed from the bottom plate 10a.

Therefore, for example, when the guide light is emitted from the guide light source 36 so that the user can visually recognize the processing pattern using the near-infrared laser light, the guide light reaches the upstream side merging mechanism 31. The upstream side merging mechanism 31 has a dichroic mirror 31a as an optical component. As will be described later, the dichroic mirror 31a reflects near-infrared laser light while transmitting guide light. As a result, the guide light transmitted through the dichroic mirror 31a and the near-infrared laser light reflected by the dichroic mirror 31a merge and become coaxial.

The guide light source 36 according to the embodiment is configured to emit guide light based on a control signal output from the control section 101.

—Upstream Side Merging Mechanism 31—

The upstream side merging mechanism 31 merges the guide light emitted from the guide light source 36 which is a guide light emitting section with the upstream side optical path Pu. By providing the upstream side merging mechanism 31, the guide light emitted from the guide light source 36 and near-infrared laser light in the upstream side optical path Pu can be made coaxial.

As described above, the wavelength of the guide light is set to be different from at least the wavelength of the near-infrared laser light. Therefore, the upstream side merging mechanism 31 can be configured using, for example, a dichroic mirror.

Specifically, the upstream side merging mechanism 31 according to the embodiment has the dichroic mirror 31a which transmits one of the near-infrared laser light and the guide light while reflecting the other. To be more specific, as illustrated in FIG. 7, etc., the dichroic mirror 31a is fixed in a posture in which a mirror surface on one side of the dichroic mirror 31a faces the output window portion 16 and the mirror surface on the other side faces the guide light source 36. Therefore, the near-infrared laser light is incident on the mirror surface on one side of the dichroic mirror 31a, while the guide light is incident on the mirror surface on the other side of the dichroic mirror 31a.

The dichroic mirror 31a according to the embodiment can reflect the laser light while transmitting the guide light. As a result, the guide light can be made to merge with the upstream side optical path Pu and can be made coaxial with the near-infrared laser light. The near-infrared laser light and the guide light that are thus made coaxial reach the first bend mirror 32 as shown in FIG. 7.

—First Bend Mirror 32—

The first bend mirror 32 is provided in the middle of the upstream side optical path Pu, and is arranged such that the optical path Pu is bent and directed downward. Specifically, the first bend mirror 32 is arranged at substantially the same height as the dichroic mirror 31a in the upstream side merging mechanism 31, and can reflect the near-infrared laser light and the guide light that have been made coaxial by the upstream side merging mechanism 31.

The near-infrared laser light and the guide light reflected by the first bend mirror 32 propagate downward and pass through the Z scanner 33 to reach the second bend mirror 34.

—Z Scanner 33—

The Z scanner 33 as a focus adjusting section is arranged between the first bend mirror 32 and the second bend mirror 34, and can adjust the focal position of the near-infrared laser light emitted from the laser light output section 2.

To be specific, as shown in FIG. 3A to FIG. 3C, the Z scanner 33 according to the embodiment includes an input lens 33a which transmits near-infrared laser light emitted from the laser light output section 2, a collimating lens 33b which passes the near-infrared laser light that has passed through the input lens 33a, an output lens 33c which passes the near-infrared laser light that has passed through the input lens 33a and the collimating lens 33b, a lens driving section 33d which moves the input lens 33a, and a casing 33e which accommodates the input lens 33a, the collimating lens 33b, and the output lens 33c.

The input lens 33a is a plano-concave lens, and the collimating lens 33b and the output lens 33c are plano-convex lenses. The input lens 33a, the collimating lens 33b, and the output lens 33c are arranged so that their optical axes are coaxial with each other.

Further, in the Z scanner 33, the lens driving section 33d moves the input lens 33a along an optical axis. In this way, a relative distance between the input lens 33a and the output lens 33c can be changed while keeping the optical axes of the input lens 33a, the collimating lens 33b, and the output lens 33c coaxial with respect to the near-infrared laser light passing through the Z scanner 33. As a result, the focal position of the near-infrared laser light irradiated onto the workpiece W changes.

Hereinafter, each part included in the Z scanner 33 will be described more specifically.

The casing 33e has a substantially cylindrical shape. As shown in FIG. 3A to FIG. 3C, openings 33f for passing the near-infrared laser light are formed at both end portions of the casing 33e. The input lens 33a, the collimating lens 33b, and the output lens 33c are arranged in this order in the vertical direction inside the casing 33e.

Among the input lens 33a, the collimating lens 33b, and the output lens 33c, the collimating lens 33b and the output lens 33c are fixed inside the casing 33e. The input lens 33a is provided to be movable in the vertical direction. The lens driving section 33d has a motor, for example, and moves the input lens 33a in the vertical direction. In this way, the relative distance between the input lens 33a and the output lens 33c is changed.

For example, assume that the distance between the input lens 33a and the output lens 33c is adjusted to be relatively short by the lens driving section 33d. In this case, a condensing angle of the near-infrared laser light passing through the output lens 33c becomes relatively small, and thus the focal position of the near-infrared laser light moves away from the emission window portion 19 of the marker head 1.

On the other hand, assume that the distance between the input lens 33a and the output lens 33c is adjusted to be relatively long by the lens driving section 33d. In this case, the condensing angle of the near-infrared laser light passing through the output lens 33c becomes relatively large, and thus the focal position of the near-infrared laser light approaches the emission window portion 19 of the marker head 1.

In the Z scanner 33, among the input lens 33a, the collimating lens 33b, and the output lens 33c, the input lens 33a may be fixed inside the casing 33e while the collimating lens 33b and the output lens 33c may be movable in the vertical direction. Alternatively, all of the input lens 33a, the collimating lens 33b, and the output lens 33c may be movable in the vertical direction.

As a result, the Z scanner 33 as a focus adjusting section functions as a section for scanning the near-infrared laser light in the vertical direction.

As described above, the near-infrared laser light passing through the Z scanner 33 is made coaxial with the guide light emitted from the guide light source 36. Therefore, by operating the Z scanner 33, it is possible to adjust not only the focal position of the near-infrared laser light but also the focal position of the guide light.

The Z scanner 33 according to the embodiment, in particular, the lens driving section 33d in the Z scanner 33, is configured to operate based on a control signal output from the control section 101.

—Second Bend Mirror 34—

The second bend mirror 34 is provided in the middle of the downstream side optical path Pd, and is arranged such that the optical path Pd is bent and directed rearward. Specifically, the second bend mirror 34 is arranged at substantially the same height as a dichroic mirror 35a in the downstream side merging mechanism 35, and can reflect the near-infrared laser light and the guide light that have passed through the Z scanner 33.

The near-infrared laser light and the guide light reflected by the second bend mirror 34 propagate rearward and pass through the downstream side merging mechanism 35 to reach the laser light scanning section (to be specific, the first scanner 41).

—Downstream Side Merging Mechanism 35—

The downstream side merging mechanism 35 guides distance measurement light emitted from the distance measurement light emitting section 5A in the distance measuring unit 5 to the workpiece W via the laser light scanning section 4 by merging the distance measurement light with the aforementioned downstream side optical path Pd. In addition, the downstream side merging mechanism 35 guides the distance measurement light reflected by the workpiece W and returning in the order of the laser light scanning section 4 and the downstream side optical path Pd to the distance measurement light receiving section 5B in the distance measuring unit 5.

By providing the downstream side merging mechanism 35, the distance measurement light emitted from the distance measurement light emitting section 5A and the near-infrared laser light and the guide light in the downstream side optical path Pd can be made coaxial. At the same time, by providing the downstream side merging mechanism 35, among the distance measurement light emitted from the marker head 1 and reflected by the workpiece W, distance measurement light incident on the marker head 1 can be guided to the distance measurement light receiving section 5B.

As described above, the wavelength of the distance measurement light is set to be different from the wavelength of the near-infrared laser light and the wavelength of the guide light. Therefore, similar to the upstream side merging mechanism 31, the downstream side merging mechanism 35 can be configured using, for example, a dichroic mirror.

Specifically, the downstream side merging mechanism 35 according to the embodiment has the dichroic mirror 35a which transmits one of the distance measurement light and the guide light while reflecting the other. To be more specific, the dichroic mirror 35a is arranged at substantially the same height as the second bend mirror 34 and behind the second bend mirror 34, and is arranged on the left side in the lateral direction of the housing 10 with respect to the through hole 12a.

Further, as shown in FIG. 9, etc., the dichroic mirror 35a is fixed in a posture in which a mirror surface on one side of the dichroic mirror 35a faces the second bend mirror 34 and the mirror surface on the other side faces the through hole 12a of the base plate 12. Therefore, the near-infrared laser light and the guide light are incident on the mirror surface on one side of the dichroic mirror 35a, while the distance measurement light is incident on the mirror surface on the other side of the dichroic mirror 35a via the through hole 12a.

The dichroic mirror 35a according to the embodiment can reflect the distance measurement light while transmitting the near-infrared laser light and the guide light. In this way, for example, when the distance measurement light emitted from the distance measuring unit 5 is incident on the dichroic mirror 35a, the distance measurement light can be merged with the downstream side optical path Pd and can be made coaxial with the near-infrared laser light and the guide light. The near-infrared laser light, the guide light, and the distance measurement light that are thus made coaxial reach the first scanner 41 as shown in FIG. 3A to FIG. 3C.

On the other hand, the distance measurement light reflected by the workpiece W returns to the laser light scanning section 4 to reach the downstream side optical path Pd. The distance measurement light that has returned to the downstream side optical path Pd is reflected by the dichroic mirror 35a in the downstream side merging mechanism 35 and reaches the distance measuring unit 5 via the through hole 12a.

Figure 10:
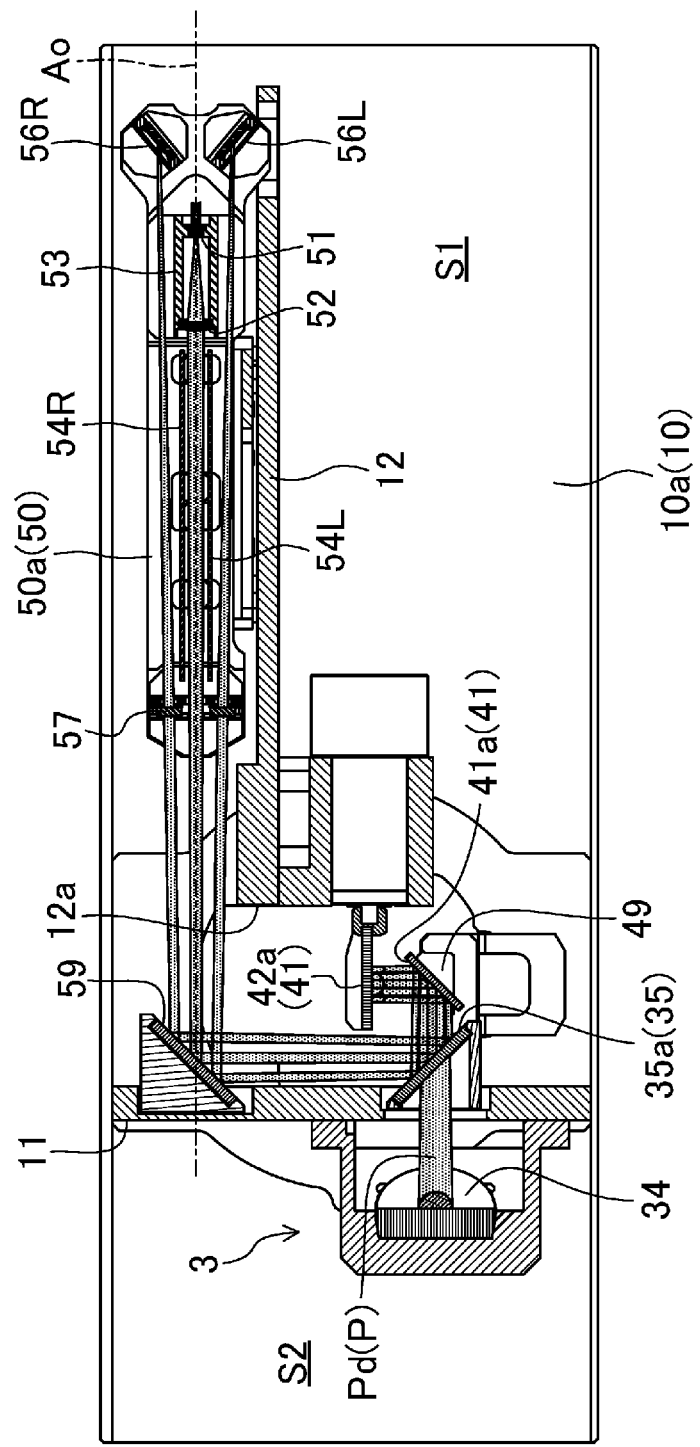
FIG. 10 is a sectional view illustrating an optical path connecting the laser light guiding section, the laser light scanning section, and the distance measuring unit.
Figure 11:
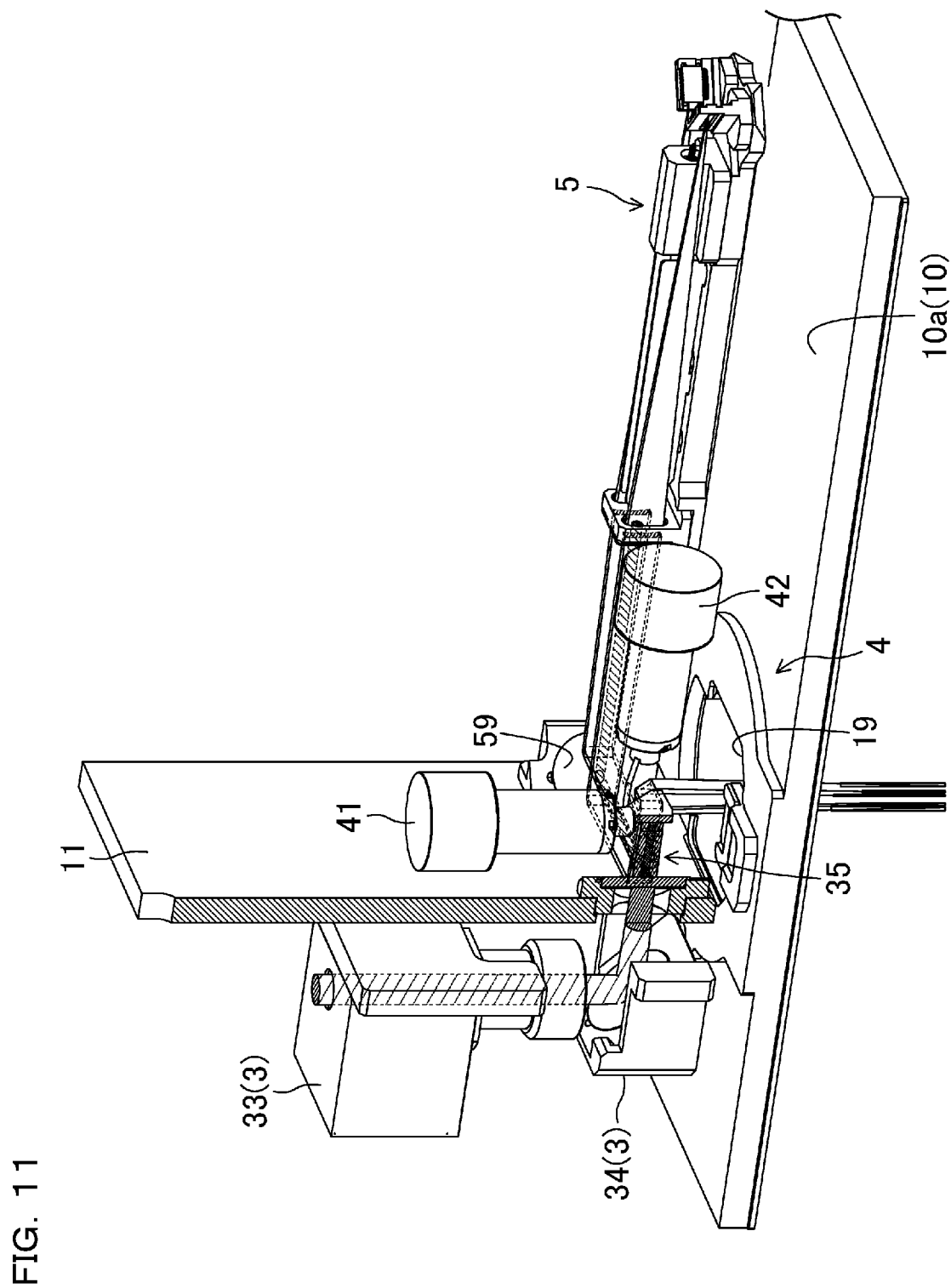
FIG. 11 is a perspective view illustrating an optical path connecting the laser light guiding section, the laser light scanning section, and the distance measuring unit.

The distance measurement light incident on the dichroic mirror 35a from the distance measuring unit 5 and the distance measurement light reflected by the dichroic mirror 35a and incident on the distance measuring unit 5 both propagate along the left-right direction (the lateral direction of the housing 10) when the housing 10 is viewed in a plan view, as shown in FIG. 10, etc.

(Laser Light Scanning Section 4)

As shown in FIG. 3A, the laser light scanning section 4 is configured to irradiate the workpiece W with the laser light (near-infrared laser light) emitted from the laser light output section 2 and guided by the laser light guiding section 3 and to perform a two-dimensional scanning on the surface of the workpiece W.

In the example shown in FIG. 8, the laser light scanning section 4 is configured as a so-called biaxial galvano scanner. That is, the laser light scanning section 4 includes the first scanner 41 for scanning the near-infrared laser light incident from the laser light guiding section 3 in a first direction, and a second scanner 42 for scanning the near-infrared laser light scanned by the first scanner 41 in a second direction.

Here, the second direction refers to a direction substantially orthogonal to the first direction. Therefore, the second scanner 42 can scan the near-infrared laser light in a direction substantially orthogonal to the first scanner 41. In the embodiment, the first direction is equivalent to the front-rear direction (the longitudinal direction of the housing 10), and the second direction is equivalent to the left-right direction (the lateral direction of the housing 10).

The first scanner 41 has a first mirror 41a at its tip. The first mirror 41a is arranged at substantially the same height as the second bend mirror 34 and the dichroic mirror 35a and behind the dichroic mirror 35a. Therefore, as shown in FIG. 9, the second bend mirror 34, the dichroic mirror 35a, and the first mirror 41a are arranged in a line along the front-rear direction (the longitudinal direction of the housing 10).

The first mirror 41a is further rotationally driven by a motor (not shown) built in the first scanner 41. The motor can rotate the first mirror 41a around a rotation axis extending in the vertical direction. By adjusting a rotation posture of the first mirror 41a, a reflection angle of the near-infrared laser light by the first mirror 41a can be adjusted.

Similarly, the second scanner 42 has a second mirror 42a at its tip. The second mirror 42a is arranged at substantially the same height as the first mirror 41a in the first scanner 41 and on the right side of the first mirror 41a. Therefore, as shown in FIG. 9, the first mirror 41a and the second mirror 42a are arranged along the left-right direction (the lateral direction of the housing 10).

The second mirror 42a is further rotationally driven by a motor (not shown) built in the second scanner 42. The motor can rotate the second mirror 42a around a rotation axis extending in the front-rear direction. By adjusting a rotation posture of the second mirror 42a, a reflection angle of the near-infrared laser light by the second mirror 42a can be adjusted.

Therefore, when the near-infrared laser light is incident on the laser light scanning section 4 from the downstream side merging mechanism 35, the near-infrared laser light is reflected by the first mirror 41a in the first scanner 41 and the second mirror 42a in the second scanner 42 in this order, and is emitted to the outside of the marker head 1 from the emission window portion 19.

In that case, it is possible to scan the near-infrared laser light in the first direction on the surface of the workpiece W by operating the motor of the first scanner 41 to adjust the rotation posture of the first mirror 41a. At the same time, it is possible to scan the near-infrared laser light in the second direction on the surface of the workpiece W by operating the motor of the second scanner 42 to adjust the rotation posture of the second mirror 42a.

Further, as described above, not only the near-infrared laser light but also the guide light which has passed through the dichroic mirror 35a of the downstream side merging mechanism 35, or the distance measurement light reflected by the dichroic mirror 35a, are incident on the laser light scanning section 4. The laser light scanning section 4 according to the embodiment can perform a two-dimensional scanning of the thus incident guide light or the distance measurement light by operating the first scanner 41 and the second scanner 42 respectively.

Rotation postures that the first mirror 41a and the second mirror 42a can take are basically set within a range where, when the near-infrared laser light is reflected by the second mirror 42a, the reflected light passes through the emission window portion 19, that is, within a scanning range of the laser light by the laser light scanning section 4.

In the marker head 1 according to the embodiment, a correction optical path Pc is formed by setting at least one of the first scanner 41 and the second scanner 42 in a specific rotation posture (see FIG. 3C) at the time of correction of a measurement result obtained by the distance measuring unit 5 (calibration of the distance measuring unit 5).

The correction optical path Pc is an optical path in which a reference member 61 in the target for calibration 6, and the distance measurement light emitting section 5A and the distance measurement light receiving section 5B in the distance measuring unit 5 are connected via the laser light scanning section 4.

As will be described later, the reference member 61 is provided inside the housing 10, and thus the correction optical path Pc is also formed inside the housing 10. As a result, the correction optical path Pc does not pass through the emission window portion 19. Therefore, the aforementioned "specific rotation posture" may also be defined as, among rotation postures formed by at least one of the first scanner 41 and the second scanner 42, a rotation posture outside the scanning range of the laser light by the laser light scanning section 4 on the surface of the workpiece W, or a rotation posture that is not used when scanning the laser light on the surface of the workpiece W.

In addition, the "specific rotation posture" can be a plurality of types of rotation postures. For example, when a plurality of reference members 61 are provided, it is possible to set "specific rotation postures" corresponding to each of the reference members 61.

(Distance Measuring Unit 5)

As shown in FIG. 3B, the distance measuring unit 5 projects distance measurement light via the laser light scanning section 4 and irradiates the surface of the workpiece W with the distance measurement light. The distance measuring unit 5 further receives the distance measurement light reflected by the surface of the workpiece W via the laser light scanning section 4.

Figure 13:
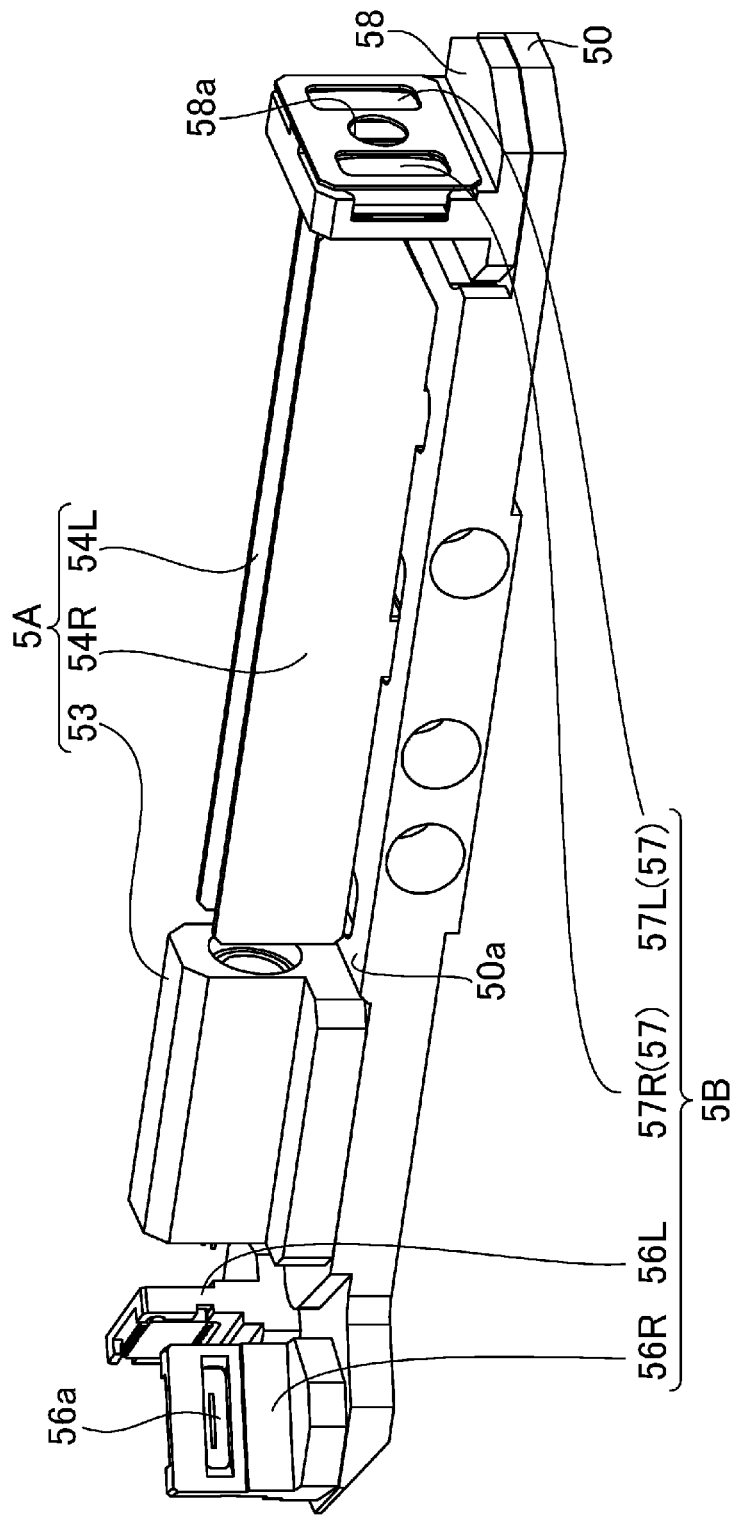
FIG. 13 is a perspective view illustrating a configuration of the distance measuring unit.
Figure 14:
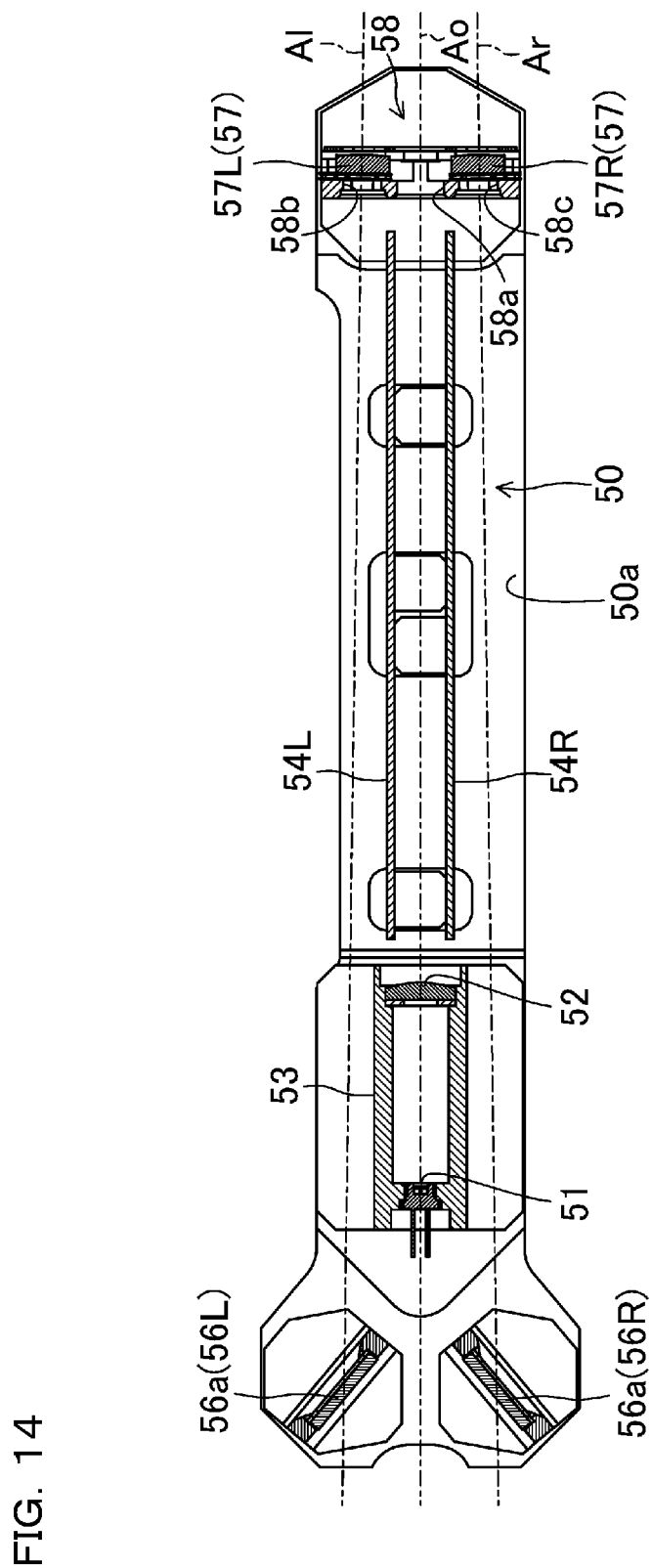
FIG. 14 is a sectional view illustrating the configuration of the distance measuring unit.

FIG. 12 is a perspective view illustrating a layout of the distance measuring unit 5. FIG. 13 is a perspective view illustrating a configuration of the distance measuring unit 5, and FIG. 14 is a sectional view illustrating the configuration of the distance measuring unit 5.

Figure 16A:
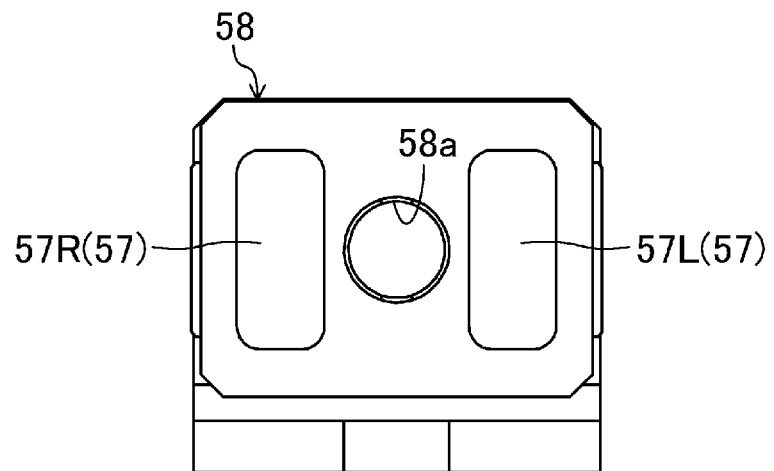
FIG. 16A is a front view illustrating a configuration around a light receiving lens.
Figure 16B:
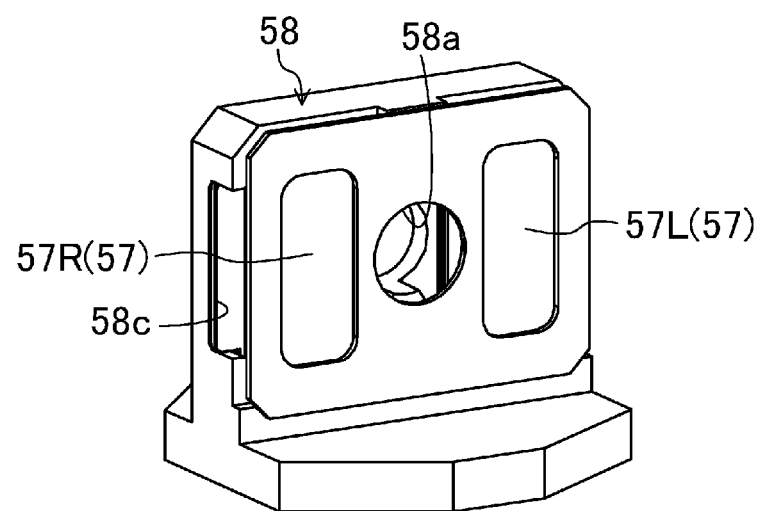
FIG. 16B is a perspective view illustrating the configuration around the light receiving lens.
Figure 17A:
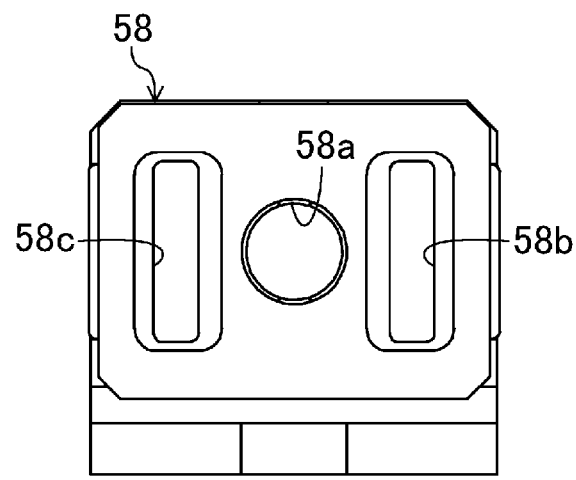
FIG. 17A is a diagram corresponding to FIG. 16A where the light receiving lens is omitted.
Figure 17B:
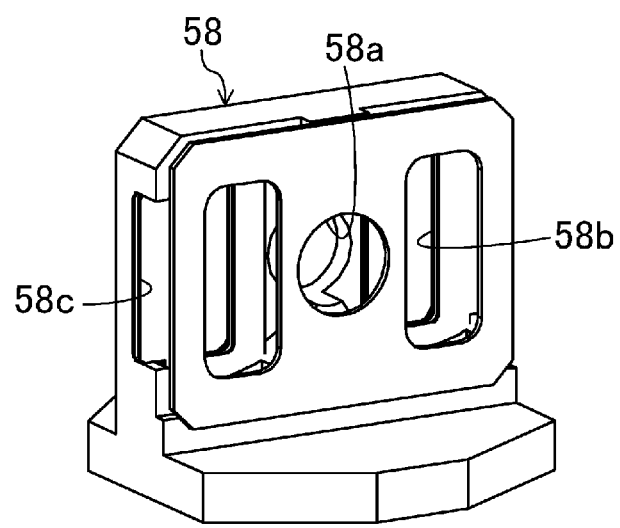
FIG. 17B is a diagram corresponding to FIG. 16B where the light receiving lens is omitted.

FIG. 16A is a front view illustrating a configuration around a light receiving lens 57, and FIG. 16B is a perspective view illustrating the configuration around the light receiving lens 57. FIG. 17A is a diagram corresponding to FIG. 16A where the light receiving lens 57 is omitted, and FIG. 17B is a diagram corresponding to FIG. 16B where the light receiving lens 57 is omitted.

The distance measuring unit 5 is mainly divided into a module for projecting distance measurement light and a module for receiving distance measurement light. Specifically, the distance measuring unit 5 includes the distance measurement light emitting section 5A which is provided in the housing 10 and emits to the laser light scanning section 4 distance measurement light for measuring a distance from the marker head 1 in the laser processing apparatus L to the surface of the workpiece W, and the distance measurement light receiving section 5B which is provided in the housing 10 and receives the distance measurement light emitted from the distance measurement light emitting section 5A and reflected by the workpiece W via the laser light scanning section 4. The distance measuring unit 5 further includes a support base 50 which supports the distance measurement light emitting section 5A and the distance measurement light receiving section 5B from below, and is fixed inside the housing 10 via the support base 50.

As described above, the distance measuring unit 5 is provided in a space on the other side in the lateral direction in the first space S1 and is arranged below the heat sink 22. As shown in FIG. 10, etc., the distance measuring unit 5 emits distance measurement light forward along the longitudinal direction of the housing 10, and receives distance measurement light propagating substantially rearward along the longitudinal direction.

Further, the distance measuring unit 5 is optically coupled with the laser light guiding section 3 via the aforementioned dichroic mirror 35a. However, while the distance measuring unit 5 projects distance measurement light along the longitudinal direction of the housing 10, the dichroic mirror 35a reflects distance measurement light propagating along the lateral direction instead of the longitudinal direction of the housing 10.

Therefore, a third bend mirror 59 is provided inside the housing 10 so as to form an optical path connecting the distance measuring unit 5 and the dichroic mirror 35a. As shown in FIG. 9 to FIG. 10, etc., in the space on the other side in the lateral direction in the first space S1, the third bend mirror 59 is arranged on the right side of the dichroic mirror 35a and the through hole 12a and in front of the distance measuring unit 5.

The third bend mirror 59 is arranged at substantially the same height as the dichroic mirror 35a in the downstream side merging mechanism 35, and the distance measurement light emitting section 5A and the distance measurement light receiving section 5B in the distance measuring unit 5. Further, the third bend mirror 59 is fixed in a posture in which the mirror surface on one side faces the through hole 12a and the dichroic mirror 35a, and the distance measurement light emitting section 5A and the distance measurement light receiving section 5B.

Therefore, the distance measurement light incident on the third bend mirror 59 from the distance measurement light emitting section 5A is reflected by the third bend mirror 59 and incident on the dichroic mirror 35a via the through hole 12a. On the other hand, the distance measurement light that returns to the laser light scanning section 4 and is reflected by the dichroic mirror 35a is incident on the third bend mirror 59 via the through hole 12a, and is reflected by the third bend mirror 59 to enter the distance measurement light receiving section 5B.

Hereinafter, configuration of each part included in the distance measuring unit 5 will be described in order.

—Support Base 50—

As shown in FIG. 13 to FIG. 14, the support base 50 is formed extending along an optical axis of the distance measurement light emitting section 5A, that is, an optical axis Ao of the distance measurement light emitted from the distance measurement light emitting section 5A, and is provided inside the housing 10. The support base 50 according to the embodiment is made with an integral plate-shaped body and has a rectangular outer shape extending along the optical axis Ao.

As shown in FIG. 12, etc., the support base 50 is arranged in a posture in which the longitudinal direction of the support base 50 is along the longitudinal direction of the housing 10, and is fastened from the side with respect to the base plate 12 instead of the bottom plate 10a of the housing 10. Therefore, as shown in FIG. 5, the support base 50 is fixed in a state of being spaced from the bottom plate 10a without contacting the bottom plate 10a.

Various members can be attached to an upper surface 50a of the support base 50. Specifically, a pair of light receiving elements 56L and 56R included in the distance measurement light receiving section 5B is provided on one side in the longitudinal direction of the support base 50, that is, at apart corresponding to the rear side of the housing 10. On the other hand, a light receiving lens 57 included in the distance measurement light receiving section 5B is provided together with the pair of light receiving elements 56L and 56R on the other side in the longitudinal direction of the support base 50, that is, at apart corresponding to the front side of the housing 10. Among the members included in the distance measurement light receiving section 5B, at least the pair of light receiving elements 56L and 56R, and the light receiving lens 57 can both be fixed on the support base 50.

The distance measurement light emitting section 5A is fixed to the upper surface of the support base 50 between the pair of light receiving elements 56L and 56R, and the light receiving lens 57. As shown in FIG. 14, the distance measurement light emitting section 5A according to the embodiment is formed by modularizing a distance measurement light source 51 which emits distance measurement light, and a light projecting lens 52 which condenses the distance measurement light emitted from the distance measurement light source 51. Among the members included in the distance measurement light emitting section 5A, at least the distance measurement light source 51 and the light projecting lens 52 can both be fixed on the support base 50.

—Distance Measurement Light Emitting Section 5A—

The distance measurement light emitting section 5A is provided inside the housing 10, and is configured to emit distance measurement light for measuring the distance from the marker head 1 in the laser processing apparatus L to the surface of the workpiece W.

Specifically, the distance measurement light emitting section 5A includes the aforementioned distance measurement light source 51 and the light projecting lens 52, a casing 53 accommodating the distance measurement light source 51 and the light projecting lens 52, and a pair of guide plates 54L and 54R that guides the distance measurement light condensed by the light projecting lens 52. The distance measurement light source 51, the light projecting lens 52, and the guide plates 54L and 54R are arranged in this order in the rear side of the housing 10, and the arrangement direction thereof is substantially equivalent to the longitudinal direction of the housing 10.

The casing 53 is formed in a cylindrical shape extending along the longitudinal direction of the housing 10 and the support base 50, and the distance measurement light source 51 is attached to one side in the longitudinal direction, that is, one end portion corresponding to the rear side of the housing 10, while the light projecting lens 52 is attached to the other end portion corresponding to the front side of the housing 10. The space between the distance measurement light source 51 and the light projecting lens 52 is sealed in a substantially airtight manner.

The distance measurement light source 51 emits distance measurement light towards the front side of the housing 10 according to a control signal input from the control section 101. To be specific, the distance measurement light source 51 can emit laser light in the visible light range as the distance measurement light. In particular, the distance measurement light source 51 according to the embodiment emits red laser light having a wavelength near 690 nm as the distance measurement light.

The distance measurement light source 51 is further fixed in a posture in which the optical axis Ao of the red laser light emitted as the distance measurement light is along the longitudinal direction of the casing 53. Therefore, the optical axis Ao of the distance measurement light is along the longitudinal direction of the housing 10 and the support base 50, passes through the central portion of the light projecting lens 52 and reaches the outside of the casing 53.

The light projecting lens 52 is positioned between the pair of light receiving elements 56L and 56R, and the light receiving lens 57 in the distance measurement light receiving section 5B in the longitudinal direction of the support base 50. The light projecting lens 52 is in a posture in which the optical axis Ao of the distance measurement light passes through the light projecting lens 52.

The light projecting lens 52 can be, for example, a plano-convex lens, and can be fixed in a posture in which a spherical convex surface faces the outside of the casing 53. The light projecting lens 52 condenses the distance measurement light emitted from the distance measurement light source 51 and emits the distance measurement light to the outside of the casing 53. The distance measurement light emitted to the outside of the casing 53 reaches the guide plates 54L and 54R.

The guide plates 54L and 54R are configured as a pair of members arranged in the lateral direction of the support base 50, and can respectively be a plate-shaped body extending in the longitudinal direction of the support base 50. A space for emitting distance measurement light is defined between the guide plate 54L and the guide plate 54R. The distance measurement light emitted to the outside of the casing 53 passes through the space thus defined and reaches a lens base 58.

The lens base 58 is fixed to the upper surface of the front end portion of the support base 50, and can support the light receiving lens 57 in the distance measurement light receiving section 5B from below. As shown in FIG. 13, the lens base 58 is provided with a through hole 58a which penetrates the lens base 58 in the longitudinal direction of the support base 50, and the through hole 58a can pass the distance measurement light emitted from the distance measurement light source 51.

Therefore, the distance measurement light emitted from the distance measurement light source 51 passes through a space inside the casing 53, a central portion of the light projecting lens 52, the space between the guide plate 54 L and the guide plate 54R, and the through hole 58a of the lens base 58, and is output to the outside of the distance measuring unit 5. The distance measurement light thus output is reflected by the third bend mirror 59, and the dichroic mirror 35a in the downstream side merging mechanism 35, and enters the laser light scanning section 4.

The distance measurement light that has entered the laser light scanning section 4 is reflected by the first mirror 41a of the first scanner 41 and the second mirror 42a of the second scanner 42 in this order, and is emitted from the emission window portion 19 to the outside of the marker head 1.

As described in the description of the laser light scanning section 4, it is possible to scan the distance measurement light in the first direction on the surface of the workpiece W by adjusting the rotation posture of the first mirror 41a of the first scanner 41. At the same time, it is possible to scan the distance measurement light in the second direction on the surface of the workpiece W by operating the motor of the second scanner 42 to adjust the rotation posture of the second mirror 42a.

The distance measurement light thus scanned is reflected on the surface of the workpiece W. A part of the distance measurement light thus reflected (hereinafter also referred to as "reflected light") enters the inside of the marker head 1 via the emission window portion 19. The reflected light that has entered the inside of the marker head 1 returns to the laser light guiding section 3 via the laser light scanning section 4. The reflected light has the same wavelength as the distance measurement light, and thus the reflected light is reflected by the dichroic mirror 35a of the downstream side merging mechanism 35 in the laser light guiding section 3 and enters the distance measuring unit 5 via the through hole 12a and the third bend mirror 59.

—Distance Measurement Light Receiving Section 5B—

The distance measurement light receiving section 5B is provided inside the housing 10, and is configured to receive distance measurement light (equivalent to the aforementioned "reflected light") emitted from the distance measurement light emitting section 5A and reflected by the workpiece W.

Specifically, the distance measurement light receiving section 5B includes the pair of light receiving elements 56L and 56R, and the light receiving lens 57 supported by the aforementioned lens base 58. Each of the pair of light receiving elements 56L and 56R is arranged in the rear end portion of the support base 50, while the light receiving lens 57 and the lens base 58 are respectively arranged in the front end portion of the support base 50. Therefore, the pair of light receiving elements 56L and 56R, the light receiving lens 57, and the lens base 58 are substantially arranged along the longitudinal direction of the housing 10 and the support base 50.

For the pair of light receiving elements 56L and 56R, their respective optical axes Al and Ar are arranged inside the housing so as to sandwich the optical axis Ao of the distance measurement light in the distance measurement light emitting section 5A. Each of the pair of light receiving elements 56L and 56R receives reflected light that has returned to the laser light scanning section 4.

To be specific, the pair of light receiving elements 56L and 56R is arranged in a direction orthogonal to the optical axis Ao of the distance measurement light emitting section 5A. In the embodiment, the arrangement direction of the pair of light receiving elements 56L and 56R is equivalent to the lateral direction, that is, the left-right direction, of the housing 10 and the support base 50. In the lateral direction, the light receiving element 56L is arranged on the left side of the distance measurement light source 51, and the light receiving element 56R is arranged on the right side of the distance measurement light source 51.

Each of the pair of light receiving elements 56L and 56R has a light receiving surface 56a directed obliquely frontward, detects a light receiving position of the reflected light on each light receiving surface 56a, and outputs a signal (detection signal) indicating a detection result thereof. Detection signals output from the light receiving elements 56L and 56R are input to the marker controller 100 and reach the aforementioned distance measuring section 103.

Here, the light receiving element 56L arranged on the left side of the distance measurement light source 51 is fixed in a posture in which the light receiving surface 56a thereof faces obliquely left frontward, and the light receiving element 56R arranged on the right side of the distance measurement light source 51 is fixed in a posture in which the light receiving surface 56a thereof faces obliquely right frontward.

Examples of elements that can be used as each of the light receiving elements 56L and 56R include a CMOS image sensor including a complementary MOS (CMOS), a CCD image sensor including a charge-coupled device (CCD), and a position sensitive detector (PSD), etc.

In the embodiment, each of the light receiving elements 56L and 56R is configured using a CMOS image sensor. In this case, the light receiving elements 56L and 56R can detect not only the light receiving position of the reflected light but also received light amount distribution thereof. That is, when each of the light receiving elements 56L and 56R is configured using a CMOS image sensor, pixels are arranged at least in the left-right direction on each light receiving surface 56a. In this case, each of the light receiving elements 56L and 56R can read and amplify a signal for each pixel and output the signal to the outside. Intensity of the signal in each pixel is determined based on intensity of the reflected light at that spot when the reflected light forms a spot on the light receiving surface 56a.

The pair of light receiving elements 56L and 56R according to the embodiment can detect at least a peak position indicating the light receiving position of the reflected light and the intensity of the reflected light.

Further, the optical path length from the downstream side merging mechanism 35 to each of the light receiving elements 56L and 56R is longer than the optical path length from the downstream side merging mechanism 35 to the distance measurement light emitting section 5A. This can also be understood from the fact that each of the light receiving elements 56L and 56R is arranged behind the distance measurement light emitting section 5A.

As a result, the optical path length of the distance measurement light receiving section 5B becomes longer than the optical path length of the distance measurement light emitting section 5A. The distance from the light receiving lens 57 to each of the light receiving elements 56L and 56R is only increased by a portion that the length of the optical path length of the distance measurement light receiving section 5B is made longer. Therefore, this is advantageous in increasing measurement resolution in the distance measurement light receiving section 5B while preventing increase in size of the housing 10 since the size of the housing 10 is limited.

The light receiving lens 57 is arranged inside the housing 10 such that each of the optical axes Al and Ar of the pair of light receiving elements 56L and 56R passes through the light receiving lens 57. The light receiving lens 57 is further arranged in the middle of an optical path connecting the downstream side merging mechanism 35 and the pair of light receiving elements 56L and 56R, and can condense reflected light that has passed through the downstream side merging mechanism 35 on the respective light receiving surfaces 56a and 56a of the pair of light receiving elements 56L and 56R.

The light receiving lens 57 is also arranged at substantially the same height as the aforementioned third bend mirror 59 and the respective light receiving surfaces 56a of the pair of light receiving elements 56L and 56R in the vertical direction. Therefore, the laser light scanning section 4, the downstream side merging mechanism 35, the light receiving lens 57, and the pair of light receiving elements 56L and 56R are arranged at substantially the same height when viewed from the bottom plate 10a of the housing 10.

The light receiving lens 57 according to the embodiment is configured as a pair of left and right light receiving lenses 57L and 57R, similar to the pair of light receiving elements 56L and 56R. The pair of light receiving lenses 57L and 57R is arranged in a direction orthogonal to the optical axis Ao of the distance measurement light emitting section 5A.

The light receiving lens 57L positioned on the left side in the pair of light receiving lenses 57L and 57R is arranged such that the optical axis Al of the light receiving element 56L positioned on the left side in the pair of light receiving elements 56L and 56R passes through the light receiving lens 57L. Similarly, the light receiving lens 57R positioned on the right side in the pair of light receiving lenses 57L and 57R is arranged such that the optical axis Ar of the light receiving element 56R positioned on the right side in the pair of light receiving elements 56L and 56R passes through the light receiving lens 57R.

Further, as illustrated in FIG. 14, an interval between the light receiving lenses 57L and 57R in the left-right direction is shorter than an interval between the light receiving elements 56L and 56R in the left-right direction.

The pair of light receiving lenses 57L and 57R respectively condenses reflected light that has returned to the laser light scanning section 4 and forms a spot of the reflected light on the light receiving surfaces 56a of the corresponding light receiving elements 56L and 56R. Each of the light receiving elements 56L and 56R outputs a signal indicating a peak position of the spot thus formed to the distance measuring section 103.

To be specific, each of the pair of light receiving lenses 57L and 57R is configured as an I-cut lens (a lens having an I-shaped contour) having a longer dimension in a direction perpendicular (vertical direction) to the arrangement direction than a dimension in the arrangement direction of the pair of light receiving elements 56L and 56R (left-right direction).

By making each of the light receiving lenses 57L and 57R an I-cut lens, the dimension in the vertical direction becomes long, and thus the amount of reflected light can be increased. Moreover, by making each of the light receiving lenses 57L and 57R an I-cut lens, as shown in FIG. 16A for example, a gap can be formed between the light receiving lenses 57L and 57R and a space for providing the aforementioned through hole 58a can be secured. This is advantageous in suppressing interference between the distance measurement light emitted from the distance measurement light emitting section 5A and the reflected light received by the distance measurement light receiving section 5B.

In addition, as illustrated in FIG. 13 to FIG. 14, the distance measurement light source 51 and the light projecting lens 52 in the distance measurement light emitting section 5A are arranged between the pair of light receiving elements 56L, 56R, and the pair of light receiving lenses 57L, 57R in the distance measurement light receiving section 5B in a front-rear direction, and are arranged closer to the pair of light receiving elements 56L and 56R than to the pair of light receiving lenses 57L and 57R in the front-rear direction. This is advantageous in suppressing interference between reflected light that has passed through each of the light receiving lenses 57L and 57R, and the distance measurement light emitting section 5A.

Taking the light receiving lens 57L and the light receiving element 56L positioned on the left side as an example, it is considered to arrange the distance measurement light source 51, the light receiving element 56L, and the light receiving lens 57L to follow Scheimpflug principle in order to image the reflected light on the light receiving surface 56a regardless of the distance to the workpiece W.

Figure 15A:
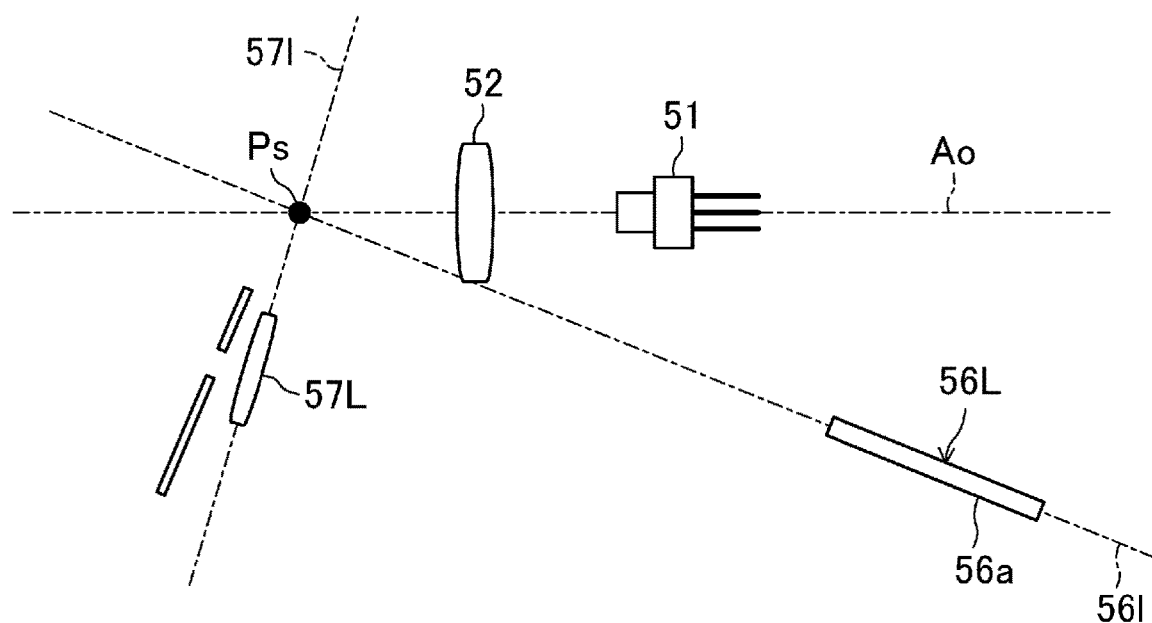
FIG. 15A is a diagram illustrating a layout following Scheimpflug principle.

In a case of a configuration following the Scheimpflug principle (so-called conjugate imaging optical system), as illustrated in FIG. 15A, the light receiving surface 56a of the light receiving element 56L must be inclined so as to make a straight line 561 extending along the light receiving surface 56a of the light receiving element 56L intersect with an intersection Ps of the optical axis Ao of the distance measurement light source 51 and a straight line 571 extending along a main surface of the light receiving lens 57L. This means that the layout of the light receiving element 56L is limited.

As a result of intensive studies, inventors of the present application have found that depending on the configuration of the distance measuring unit 5, the light receiving surface 56a of the light receiving element 56 may be excessively inclined with respect to the main surface 57a of the light receiving lens 57L and a total reflection of reflected light on the light receiving surface 56a may be caused.

Therefore, in the embodiment, the straight line 571 extending along the main surface of the light receiving lens 57L, and the straight line 561 extending along each light receiving surface 56a of the pair of light receiving elements 56L and 56R, particularly the light receiving surface 56a of the light receiving element 56L corresponding to the light receiving lens 57L, are arranged so as not to follow the Scheimpflug principle.

Figure 15B:
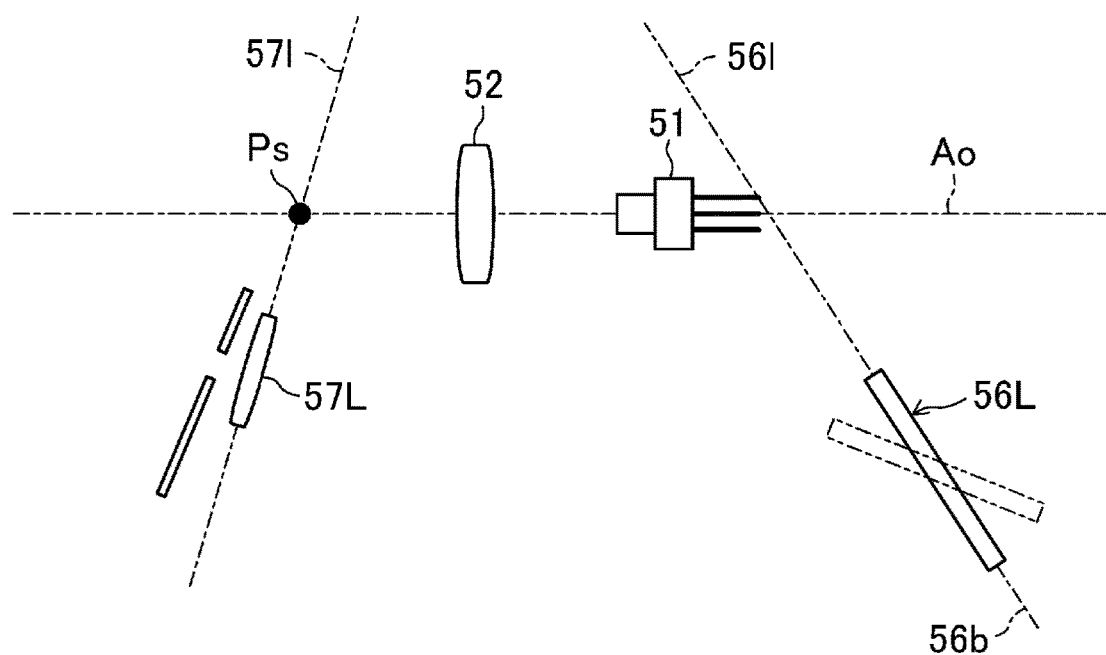
FIG. 15B is a diagram illustrating a layout that does not follow the Scheimpflug principle.

Specifically, as shown in FIG. 15B, the straight line 561 extending along the light receiving surface 56a of the light receiving element 56L is arranged so as not to intersect with the intersection Ps of the optical axis Ao of the distance measurement light source 51 and the straight line 571 extending along the main surface of the light receiving lens 57L. When such an arrangement is adopted, the degree of freedom of the layout of the light receiving element 56L can be increased.

However, when it is arranged so as not to follow the Scheimpflug principle, an optical image (the aforementioned spot) formed on the light receiving surface 56a may not be focused and the optical image may be blurred.

Therefore, in the embodiment, a diaphragm 58b for adjusting light amount incident on the light receiving surface 56a is provided between the light receiving lens 57L and the light receiving surface 56a of the corresponding light receiving element 56L. Specifically, the diaphragm 58b is formed as a slit whose dimension in the vertical direction is longer than the dimension in the left-right direction, which is similar to the outer shape of the light receiving lens 57L. The diaphragm 58b is further formed integrally with the lens base 58 for supporting the light receiving lens 57L, and contributes to compactness around the light receiving lens 57L.

Instead of the diaphragm 58b provided in the lens base 58, or in addition to the diaphragm 58b provided in the lens base 58, a diaphragm may be arranged between the downstream side merging mechanism 35 and the light receiving lens 57L. The diaphragm in this case is preferably arranged in the middle of an optical path connecting the third bend mirror 59 and the light receiving lens 57L. Moreover, the lens base 58 is provided with an opening for allowing distance measurement light to pass through the light receiving lenses 57L and 57R. By narrowing the width of the opening, the opening itself may function as a diaphragm.

The configuration described so far is the same for the light receiving lens 57 and the light receiving element 56R positioned on the right side. That is, the light receiving surface 56a of the light receiving element 56R on the right side is arranged so as not to intersect with the intersection of the optical axis Ao of the distance measurement light source 51 and the main surface of the light receiving lens 57R on the right side. Then, among all parts included in the lens base 58, a diaphragm 58c formed as a slit whose dimension in the vertical direction is longer than the dimension in the left-right direction is provided in a part positioned between the light receiving lens 57R arranged on the right side and the light receiving surface 56a of the corresponding light receiving element 56R.

Further, as is clear from FIG. 9, etc., the pair of light receiving elements 56L and 56R is arranged such that their relative positional relations with the first scanner 41 and the second scanner 42 are different from each other.

An optical path that the reflected light follows inside the marker head 1 is deviated from an optical path that the distance measurement light follows at the time of emission according to the distance to the surface of the workpiece W. The magnitude of the distance at that time is reflected in light receiving positions on the respective light receiving surfaces 56a of the light receiving elements 56L and 56R. Therefore, it is possible to measure the distance to the surface of the workpiece W by detecting the light receiving position (peak position of a spot in the embodiment) on each light receiving surface 56a.

However, for example, as a result of using the marker head 1 for a long time, calibration of the distance measuring unit 5 may be required. For this purpose, it is conceivable to prepare a jig separate from the marker head 1. However, in the marker head 1, as a member equivalent to such a jig, the aforementioned target for calibration 6 is already provided inside the housing 10.

(Target for Calibration 6)

Figure 18:
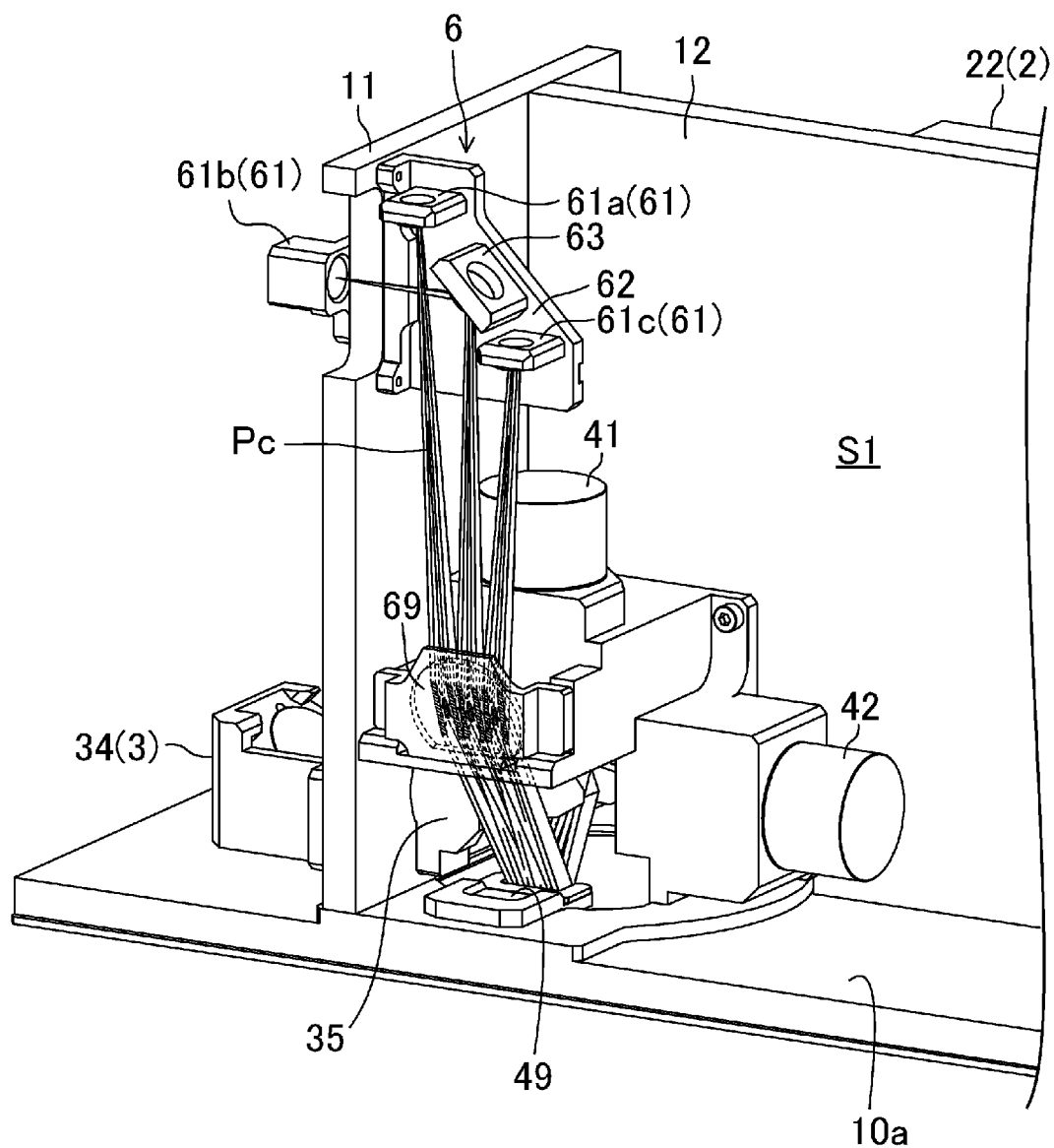
FIG. 18 is a perspective view illustrating an optical path connecting a laser light scanning section and a target for calibration.
Figure 19:
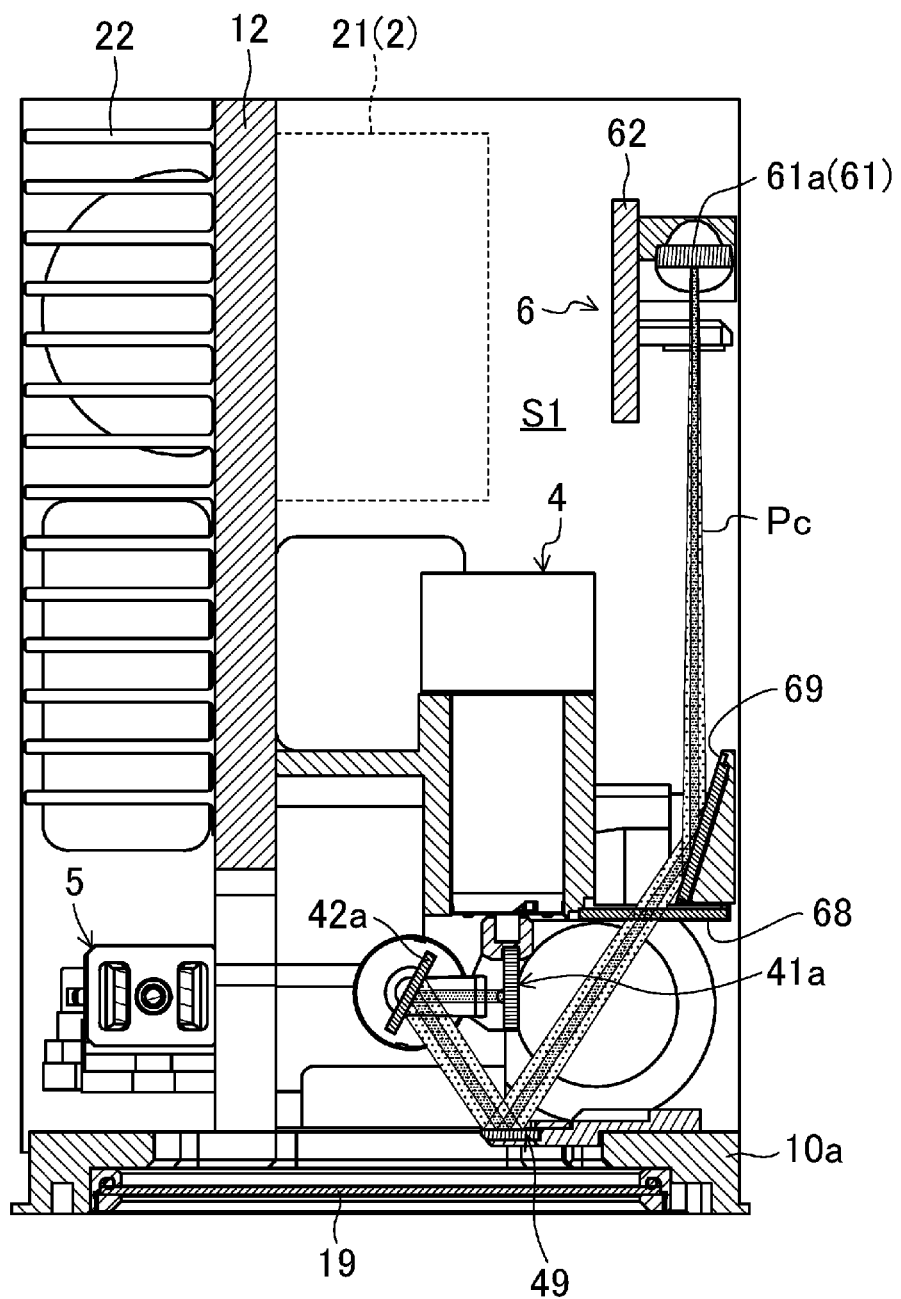
FIG. 19 is a cross-sectional view illustrating the optical path connecting a laser light scanning section and a target for calibration.

FIG. 18 is a perspective view illustrating an optical path connecting the laser light scanning section 4 and the target for calibration 6, and FIG. 19 is a cross-sectional view illustrating the optical path connecting the laser light scanning section 4 and the target for calibration 6.

The target for calibration 6 includes, as main components, a plurality of reference members 61, and a support member 62 which supports each reference member 61. The target for calibration 6 further includes a reflection mirror 63 which is optically coupled to one (a second target 61b) of the plurality of reference members 61.

The calibration by the target for calibration 6 uses distance measurement light emitted from the aforementioned distance measuring unit 5, particularly the distance measurement light emitting section 5A. For example, as shown in FIG. 3C, at the time of calibration, distance measurement light reflected on the surface of each reference member 61 instead of the surface of the workpiece W is received by the distance measurement light receiving section 5B, and the distance measuring unit 5 can be calibrated based on the light receiving position. In this case, the distance measuring unit 5 emits red laser light having a wavelength near 690 nm, which is the same as the case of measuring the distance to the surface of the workpiece W.

However, in order to clearly distinguish the case of distance measurement and the case of calibration, in the following description, distance measurement light for measuring the distance from the laser processing apparatus L to the surface of the workpiece W may be referred to as "first distance measurement light", and distance measurement light for correcting (calibrating) a measurement result thereof may be referred to as "second distance measurement light".

In this way, the distance measurement light receiving section 5B can receive any one of the first distance measurement light (hereinafter also referred to as "first reflected light") reflected by the workpiece W and returning in the order of the laser light scanning section 4 and the downstream side optical path Pd, and the second distance measurement light (hereinafter also referred to as "second reflected light") reflected by each of the reference members 61 and returning in the order of the laser light scanning section 4 and the downstream side optical path Pd via the laser light scanning section 4.

The downstream side merging mechanism 35 can merge the first distance measurement light or the second distance measurement light emitted from the distance measurement light emitting section 5A into the downstream side optical path Pd, and can also guide the first reflected light or the second reflected light to the distance measurement light receiving section 5B.

Here, each reference member 61 is arranged at a position which is the other end of the correction optical path Pc formed via the laser light scanning section 4 with the distance measurement light emitting section 5A as one end of the correction optical path Pc in a state in which at least one of the first scanner 41 and the second scanner 42 is in a specific rotation posture.

To be specific, each reference member 61 is provided inside the housing 10 in the embodiment. When at least one of the first scanner 41 and the second scanner 42 is in a specific rotation posture, the correction optical path Pc connected to the distance measurement light emitting section 5A via the laser light scanning section 4 is formed. The correction optical path Pc is an optical path taking the distance measurement light emitting section 5A as one end and each reference member 61 as the other end, and passes through the laser light scanning section 4 while going back and forth between the distance measurement light emitting section 5A and each reference member 61.

Further, each reference member 61 is arranged such that the optical path length of the aforementioned correction optical path Pc is a predetermined reference distance.

To be specific, each reference member 61 is laid out such that the optical path length of the correction optical path Pc formed by each reference member 61 becomes a known reference distance. Specifically, the reference distance corresponding to each reference member 61 is measured when the marker head 1 is manufactured. The reference distance thus measured is stored in advance by the reference distance storing section 105.

Here, the reference distance may be any length as long as it corresponds to the optical path length of the correction optical path Pc. In this case, the reference distance may be, for example, a length of a section connecting the laser light scanning section 4 and each reference member 61, or, when a fourth bend mirror 49 and a fifth bend mirror 69 are provided between the laser light scanning section 4 and each reference member 61 as will be described later, a length of a section connecting any one of the mirrors and each reference member 61.

The correction optical path Pc formed by each reference member 61 is an optical path formed by connecting the reference member 61 in the target for calibration 6, and the distance measurement light emitting section 5A and the distance measurement light receiving section 5B in the distance measuring unit 5 via the laser light scanning section 4.

Particularly in the embodiment, each reference member 61 is arranged such that the correction optical path Pc is formed when both the first scanner 41 and the second scanner 42 are in the aforementioned specific rotation posture.

The first mirror 41a of the first scanner 41 and the second mirror 42a of the second scanner 42 are arranged in this order between the distance measurement light emitting section 5A and each reference member 61 in the correction optical path Pc.

That is, the second distance measurement light emitted from the distance measurement light emitting section 5A is reflected by the first mirror 41a and the second mirror 42a in this order, and is irradiated onto each reference member 61. Here, the second mirror 42a and each reference member 61 may be directly coupled without using an optical component such as a reflection mirror, or may be indirectly coupled via one or more optical components.

The marker head 1 illustrated in FIG. 18 to FIG. 19 includes a reflection mirror which directs the second distance measurement light scanned by the second scanner 42 to the reference member 61. The reflection mirror is arranged between the second scanner 42 and each reference member 61 in the correction optical path Pc.

To be specific, the marker head 1 according to the embodiment includes the fourth bend mirror 49 and the fifth bend mirror 69 as reflection mirrors in this order from the second scanner 42 towards each reference member 61.

As illustrated in FIG. 19, the fourth bend mirror 49 is arranged substantially below the first mirror 41a in a posture in which the mirror surface of the fourth bend mirror 49 faces upward. To be specific, the fourth bend mirror 49 is attached to the vicinity of the peripheral portion (specifically, outer side of the peripheral portion) of the emission window portion 19, and is arranged at a part near the lower end in the first space S1. The fourth bend mirror 49 is arranged such that the second distance measurement light reflected by the mirror surface of the second mirror 42a is incident on the fourth bend mirror 49 when the second scanner 42 is set to a specific rotation posture. The second distance measurement light reflected by the fourth bend mirror 49 is emitted from the laser light scanning section 4 via calibration window portion 68 and is incident on the fifth bend mirror 69.

The aforementioned specific rotation posture is a posture in which at least the second mirror 42a and the fourth bend mirror 49 are opposed to each other. Since the fourth bend mirror 49 is provided at an outer side of the peripheral portion of the emission window portion 19, a path connecting the second mirror 42a and the fourth bend mirror 49 does not pass through the emission window portion 19. When the path passes through the emission window portion 19, an area that can be scanned by the second scanner would be limited at the time of non-calibration. Therefore, by configuring so as not to pass through the emission window portion 19, a scannable area can be secured as much as possible.

As illustrated in FIG. 18 to FIG. 19, the fifth bend mirror 69 is arranged on the right side of the first scanner 41 in a posture in which the mirror surface of the fifth bend mirror 69 faces obliquely left upward. To be specific, the fifth bend mirror 69 is fixed below the reference member 61, and is arranged such that the second distance measurement light reflected by the fourth bend mirror 49 is incident on the fifth bend mirror 69. The second distance measurement light reflected by the fifth bend mirror 69 enters any one of the plurality of reference members 61 according to the rotation postures of the first scanner 41 and the second scanner 42.

—Support Member 62—

As illustrated in FIG. 9 and FIG. 18, the support member 62 is arranged in a space on the upper side in the first space S1. Specifically, the support member 62 is a substantially plate-shaped member and is fastened from the rear to an upper end of the partition portion 11. Each reference member 61 is provided on a left side surface of the support member 62. As a result, the support member 62 and each reference member 61 are arranged in a part near the upper end in the first space S1 (see also FIG. 19).

As shown in FIG. 19, the correction optical path Pc is reflected in turn by the first mirror 41a and the second mirror 42a and extends obliquely downward, and then returns by the fourth bend mirror 49 provided near the lower end of the first space S1 and extends obliquely upward. By providing such a return, the optical path length of the correction optical path Pc can be extended. Each reference member 61 forming one end of the correction optical path Pc is provided near the upper end in the first space S1. This also contributes to the extension of the optical path length in the correction optical path Pc.

—Reference Member 61—

As illustrated in FIG. 9 and FIG. 18, the plurality of reference members 61 stand on the left side surface of the support member 62, and are arranged in order from the front to the obliquely lower rear. Each reference member 61 may be configured using a material that does not easily generate so-called specular reflected light. For example, each reference member 61 can be configured using a so-called scatterer material, to be specific, ceramic, paper, a material having a painted surface, a mat-treated material, etc.

In the embodiment, each reference member 61 is made with ceramic, and diffuse reflected light as shown in FIG. 10 is easily generated. In this case, an intensity distribution of reflected light received by the light receiving surface 56a substantially matches a normal distribution.

Hereinafter, these reference members 61 may be referred to as a "first target 61a", a "second target 61b", and a "third target 61c" in order from the top (see also FIG. 3A to FIG. 3C).

As illustrated in FIG. 9, the first target 61a, the second target 61b, and the third target 61c are arranged in this order from the top, and are arranged directly above the fifth bend mirror 69 in the vertical direction and at substantially the same position as the fifth bend mirror 69 in the left-right direction. By making the height positions different from one another, the plurality of reference members 61 are arranged such that the distances from the fifth bend mirror 69 to each of the reference members 61, and further the reference distances thereof are different from each other.

The reference distance storing section 105 stores a reference distance d1 corresponding to the first target 61a, a reference distance d2 corresponding to the second target 61b, and a reference distance d3 corresponding to the third target 61c.

As illustrated in FIG. 18, the second distance measurement light may be reflected forward by the reflection mirror 63, and the second target 61b may be laid out in a front space (the second space S2) with the partition portion 11 sandwiched. By laying out the reference members 61 using the second space S2 instead of the first space S1, it is advantageous in widening the difference in the reference distance corresponding to each reference member 61. Widening the difference in the reference distance is effective in improving the calibration accuracy of the distance measuring unit 5.

An optical path that the second reflected light follows inside the marker head 1 is deviated from an optical path that the second distance measurement light follows at the time of emission according to the distance to a selected reference member 61. The magnitude of the distance at that time is reflected in light receiving positions on the respective light receiving surfaces 56a of the light receiving elements 56L and 56R. Therefore, it is possible to measure the distance to the reference member 61 by detecting the light receiving position (peak position of a spot in the embodiment) on each light receiving surface 56a.

In this way, the laser processing apparatus L can basically measure a distance to the surface of the workpiece W or the reference member 61 based on a light receiving position of the reflected light in each light receiving surface 56a of the light receiving elements 56L and 56R no matter whether it is at the time of distance measurement or at the time of calibration. As a distance measuring method, a so-called triangulation method is used.

<Distance Measuring Method>

Figure 20:
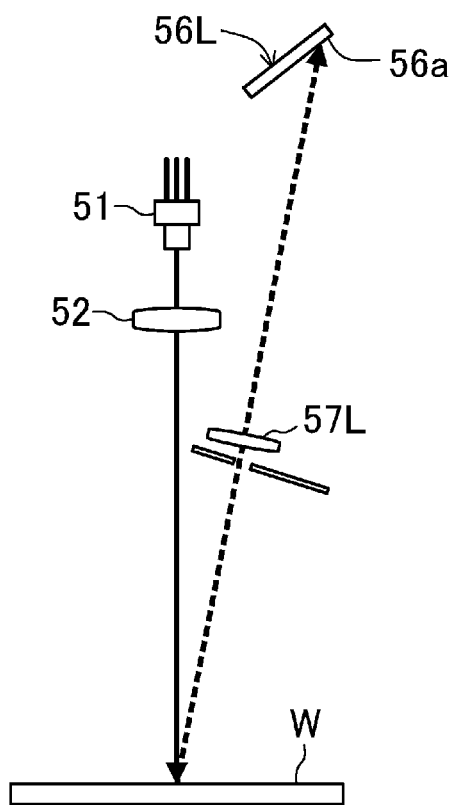
FIG. 20 is a diagram explaining a triangulation method.
Figure 20:
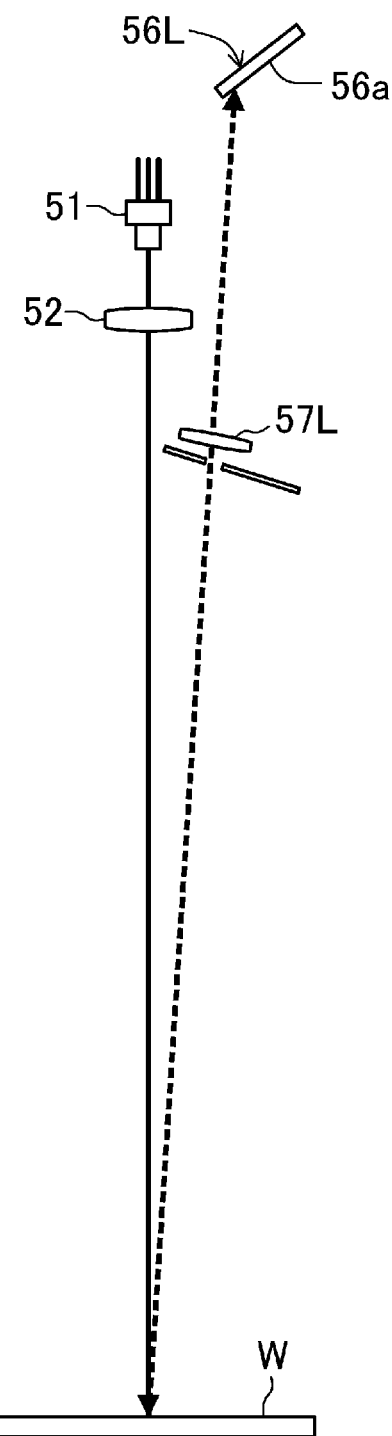

FIG. 20 is a diagram explaining the triangulation method. In FIG. 20, only the distance measuring unit 5 is shown. However, the following description is also applicable to a case where distance measurement light is emitted via the laser light scanning section 4 as described above.

As illustrated in FIG. 20, when distance measurement light is emitted from the distance measurement light source 51 in the distance measurement light emitting section 5A, the distance measurement light is irradiated onto the surface of the workpiece W. When the distance measurement light is reflected by the workpiece W, the reflected light (particularly diffuse reflected light) propagates substantially isotropically if an influence of specular reflection is removed.

The reflected light thus propagating includes a component which enters the light receiving element 56L via the light receiving lens 57L. However, an incident angle to the light receiving element 56L increases or decreases depending on the distance between the marker head 1 and the workpiece W. When the incident angle to the light receiving element 56L increases or decreases, the light receiving positions on the light receiving surface 56a increase or decrease.

In this way, the distance between the marker head 1 and the workpiece W, and the light receiving position on the light receiving surface 56a are associated with each other with a predetermined relation. Therefore, by grasping the relation in advance and storing the same in, for example, the marker controller 100, it is possible to calculate distances from the light receiving position on the light receiving surface 56a to the marker head 1 and to the workpiece W. Such a calculation method is nothing but a method using the so-called triangulation method.

That is, the aforementioned distance measuring section 103 measures the distance from the laser processing apparatus L to the surface of the workpiece W by the triangulation method based on the light receiving position of the distance measurement light in the distance measurement light receiving section 5B.

Specifically, the aforementioned condition setting storing section 102 stores in advance a relation between a light receiving position on the light receiving surface 56a, and a distance between the marker head 1 and the surface of the workpiece W. On the other hand, a signal indicating a light receiving position of distance measurement light in the distance measurement light receiving section 5B, to be specific, a peak position of a spot formed by reflected light on the light receiving surface 56a, is input to the distance measuring section 103.

The distance measuring section 103 measures a distance to the surface of the workpiece W based on the input signal and the relation stored in the condition setting storing section 102. A measurement value thus obtained is input to the control section 101, for example, and is used for control of the Z scanner 33, etc., by the control section 101.

<Processing Procedure of Workpiece W>

Figure 21:
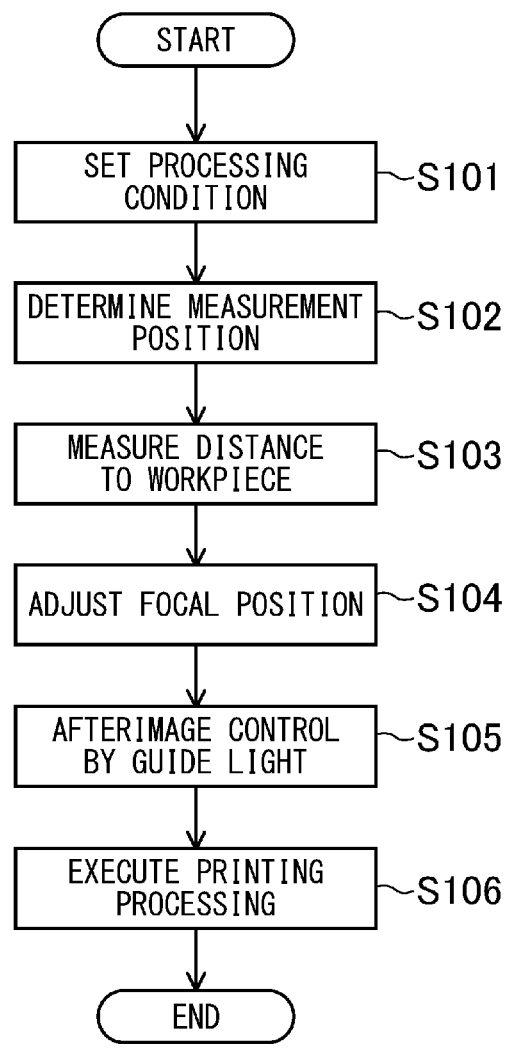
FIG. 21 is a flow chart illustrating a workpiece processing procedure.

Hereinafter, a processing procedure of the workpiece W by the laser processing apparatus L will be described as a usage example of the measurement result obtained by the distance measuring section 103. FIG. 21 is a flow chart illustrating a processing procedure of the workpiece W.

A control process illustrated in FIG. 21 can be executed by the control section 101 which is capable of controlling the excitation light generating section 110, the laser light output section 2, the Z scanner 33, the laser light scanning section 4, the distance measurement light emitting section 5A, and the guide light source 36.

First, in step S101, a processing condition in laser processing is set when a user operates the operation terminal 800. The processing condition set in step S101 includes, for example, a content (marking pattern) of a character string, etc., to be printed on the surface of the workpiece W, and a layout of such a character string, etc.

In subsequent step S102, the control section 101 determines a plurality of positions (hereinafter also referred to as "measurement position") where a distance from the marker head 1 is to be measured on the surface of the workpiece W based on the processing condition set in step S101.

In subsequent step S103, the control section 101 measures the distance from the laser processing apparatus L to the surface of the workpiece W via the distance measuring section 103 by controlling the distance measurement light emitting section 5A.

Specifically, in step S103, the control section 101 causes the distance measurement light emitting section 5A to emit distance measurement light and causes the distance measurement light receiving section 5B to receive reflected light with respect to each measurement position determined in step S102. Then, a signal indicating a light receiving position of the reflected light in the distance measurement light receiving section 5B is input to the distance measuring section 103, and the distance measuring section 103 measures the distance to the surface of the workpiece W. The distance measuring section 103 inputs a signal indicating the distance thus measured to the control section 101.

In subsequent step S104, the control section 101 determines a control parameter of the Z scanner 33 based on a measurement result in step S103, that is, a distance measurement value at each measurement position, such that focal positions match the respective measurement values.

Specifically, in step S104, the control section 101 determines a control parameter of the lens driving section 33d at each measurement position, that is, a relative distance between the input lens 33a and the output lens 33c at each measurement position.

In subsequent step S105, the control section 101 adjusts a focal position at each measurement position via the Z scanner 33, and after adjusting the focal position by the Z scanner 33, irradiates the surface of the workpiece W with guide light via the guide light source 36. At the same time, the control section 101 controls the laser light scanning section 4 to trace a marking pattern with guide light emitted from the guide light source 36.

The upstream side merging mechanism 31 which merges the guide light with the near-infrared laser light is provided on the upstream side of the Z scanner 33. Therefore, by adjusting the focal position by the Z scanner 33, it is possible to adjust not only the focal position of the near-infrared laser light but also the focal position of the guide light.

Further, the tracing of the marking pattern by the guide light is repeatedly performed by appropriately controlling the laser light scanning section 4. In this way, the marking pattern is continuously displayed on the surface of the workpiece W due to afterimage effect of a human eye. At this time, in order to make the continuous display by the afterimage effect effective, it is conceivable to set a scanning speed of the guide light to be equal to or higher than a minimum speed at which the afterimage phenomenon occurs. On the other hand, depending on conditions such as a material of the workpiece W and an output of the near-infrared laser light, a scanning speed of the near-infrared laser light may be excessively slow during printing processing. In response to this, the scanning speed of the guide light is set to a speed higher than the scanning speed of the near-infrared laser light, that is, a speed equal to or higher than the minimum speed at which the afterimage phenomenon occurs.

In subsequent step S106, the control section 101 completes setting related to the marking pattern, and executes printing processing based on the setting. Instead of the step S106, the setting related to the marking pattern may be transferred to the condition setting storing section 102 or the operation terminal 800 and stored.

<Calibration Method of Distance Measuring Unit 5>

Figure 22:
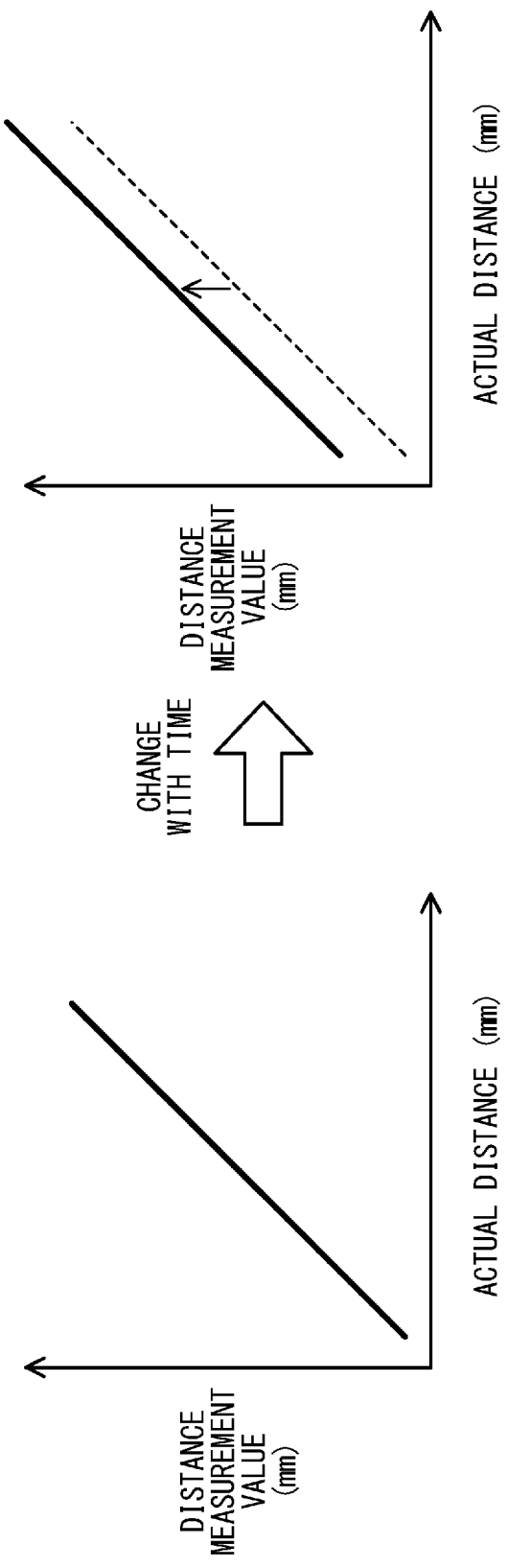
FIG. 22 is a diagram explaining change with time of the distance measuring unit.
Figure 23:
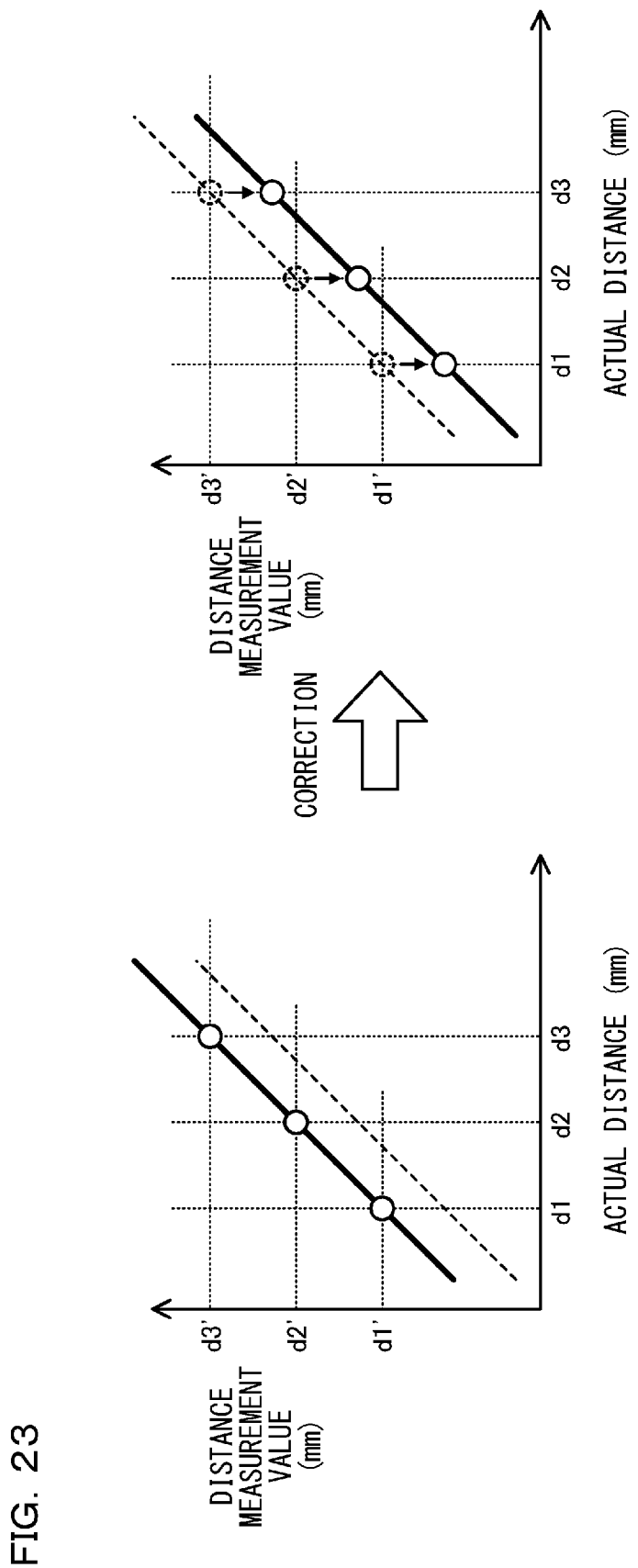
FIG. 23 is a diagram explaining a calibration method of the distance measuring unit.

Next, a calibration method of the distance measuring unit 5 using the target for calibration 6 will be described as an application example of a measurement result obtained by the distance measuring section 103. FIG. 22 is a diagram explaining change with time of the distance measuring unit 5, and FIG. 23 is a diagram explaining a calibration method of the distance measuring unit 5.

As described above, the condition setting storing section 102 stores in advance a relation between a light receiving position on the light receiving surface 56a and a distance between the marker head 1 and the surface of the workpiece W.

As shown in the left diagram in FIG. 22, for example, in an initial stage immediately after manufacturing, a distance measurement value obtained by the distance measuring unit 5 matches an actual distance (distance measurement value is equal to actual distance).

However, for example, when the position of the light receiving surface 56a changes back and forth or left and right due to circumstances such as a change with time, the relation between the "actual distance" to the surface of the workpiece W and the light receiving position of the reflected light changes. In this case, when the relation stored in the condition setting storing section 102 is used as it is, as shown in the right diagram in FIG. 22, a deviation occurs between the distance measurement value and the actual distance (distance measurement value is not equal to actual distance).

In order to calibrate such a deviation, the target for calibration 6 is provided inside the housing 10. The distance correcting section 104 calibrates the aforementioned deviation by correcting the measurement value using the target for calibration 6.

Specifically, the distance correcting section 104 according to the embodiment compares, when a distance to the reference members 61 has been measured by using the correction optical path Pc connecting the distance measurement light emitting section 5A and each reference member 61, the measurement result with the reference distance stored in the reference distance storing section 105 to correct the measurement result obtained by the distance measuring section 103.

To be specific, the distance correcting section 104 performs a correction on the measurement result obtained using the correction optical path Pc such that the measurement result matches the reference distance stored in the reference distance storing section 105.

To be more specific, the distance correcting section 104 can correct the measurement result obtained by the distance measuring section 103 by changing a content stored in the condition setting storing section 102. Instead of this, or in addition to this, the distance correcting section 104 can correct the measurement result obtained by the distance measuring section 103 by adjusting a gain of a signal read from each pixel arranged on the light receiving surface 56a for each pixel.

The target for calibration 6 according to the embodiment includes, as the reference members 61, the first target 61a, the second target 61b, and the third target 61c. In this case, the measurement result obtained by the distance measuring section 103 can be corrected by selecting any one of the first target 61a, the second target 61b, and the third target 61c, or the measurement result obtained by the distance measuring section 103 can be corrected by selecting two or more of the first target 61a, the second target 61b, and the third target 61c.

In particular, the distance correcting section 104 according to the embodiment can correct the measurement result obtained by the distance measuring section 103 by using the reference distances d1, d2, and d3 respectively related to the first target 61a, the second target 61b, and the third target 61c in combination.

Specifically, as shown in the left diagram in FIG. 23, the distance correcting section 104 measures a distance related to each of the first target 61a, the second target 61b, and the third target 61c. Assume that the measurement value related to the first target 61a is d1', the measurement value related to the second target is d2', and the measurement value related to the third target 61c is d3', these measurement values are expected to match the reference distances respectively (d1' is equal to d1, d2' is equal to d2, and d3' is equal to d3). However, due to circumstances such as a change with time, the measurement values may not match the reference distances (d1' is not equal to d1, d2' is not equal to d2, and d3' is not equal to d3).

Therefore, as shown in the right diagram in FIG. 23, the distance correcting section 104 corrects the distance measurement values related to the reference members 61 so as to match the reference distances corresponding to the first target 61a, the second target 61b, and the third target 61c respectively. As to a specific correction method, as described above, correction can be made by changing a content stored in the condition setting storing section 102, or correction can be made by adjusting the gain of a signal read from the light receiving surface 56a for each pixel.

The correction by the distance correcting section 104 may be executed automatically or manually. As a timing for automatic execution, the correction may be executed for each preset period, for example, once a week, or may be executed when a temperature change equal to or more than a predetermined value occurs inside the housing 10. In addition to these timings, or, instead of these timings, for example, the correction may be executed when a difference between a measurement result obtained from the light receiving element 56L and a measurement result obtained from the light receiving element 56R is equal to or more than a predetermined value. Alternatively, the correction may be executed when the marker head 1 is activated, or the correction may be executed every time printing processing by the near-infrared laser is performed. Measurement data may be sequentially stored in the marker controller 100, and correction may be executed when a moving average thereof deviates by a predetermined value or more.

These execution timings are stored in the condition setting storing section 102, and can be selected and/or changed via the operation terminal 800. Even when the correction by the distance correcting section 104 is manually executed, it can be executed via the operation terminal 800.

Figure 24:
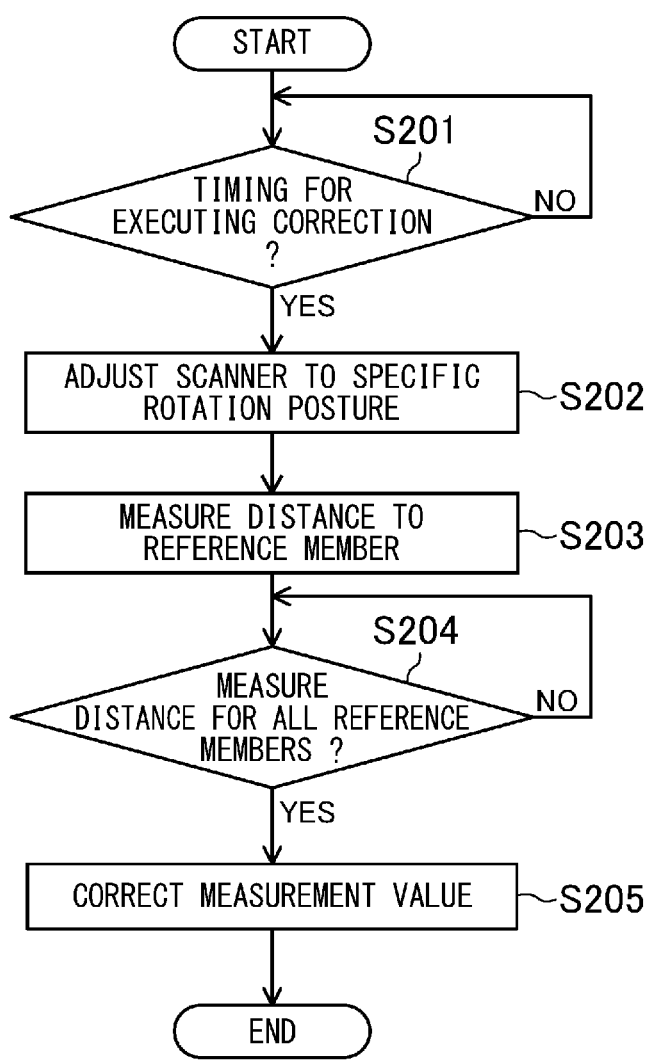
FIG. 24 is a flow chart illustrating a calibration procedure of the distance measuring unit.

A specific example of a calibration procedure will be described below. FIG. 24 is a flow chart illustrating a calibration procedure of the distance measuring unit 5. The control process illustrated in FIG. 24 is executed by the distance correcting section 104 in the marker controller 100.

First, in step S201, the distance correcting section 104 determines whether it is the timing to execute correction. When the determination is YES (for example, when it is determined that a temperature change equal to or more than a predetermined value has occurred inside the housing 10), the process proceeds to step S202. When the determination is NO, the process returns to the determination in step S201.

In subsequent step S202, the distance correcting section 104 controls the laser light scanning section 4 via the control section 101 to set the first scanner 41 and the second scanner 42 respectively to specific rotation postures.

Specifically, the distance correcting section 104 determines the reference member 61 which will be used for distance measurement from the plurality of reference members 61, and changes the postures of the first mirror 41a and the second mirror 42a such that the reference member 61 and the laser light scanning section 4 are optically connected.

In subsequent step S203, the distance correcting section 104 controls the distance measuring unit 5 via the control section 101 to measure a distance to the reference member 61 determined in step S202.

In subsequent step S204, the distance correcting section 104 determines whether the distance has been measured for all of the plurality of reference members 61. When the determination is NO, the process returns to step S202 and a distance related to another reference member 61 is measured. When the determination in step S204 is YES, the process proceeds to step S205.

In subsequent step S205, the distance correcting section 104 executes calibration of the distance measuring unit 5 based on the distance measurement value obtained in step S203, and the reference distance stored in the reference distance storing section 105. The calibration is executed by correcting such that the distance measurement value related to each reference member 61 matches the reference distance determined for each reference member 61.

When calibrating using only one of the plurality of reference members 61, the determination in step S204 can be omitted.

<Calibration Using Target for Calibration 6>

According to the embodiment, when measuring the distance from the laser processing apparatus L, in particular, the marker head 1 to the surface of the workpiece W, the distance measurement light emitting section 5A emits the first distance measurement light. The first distance measurement light emitted from the distance measurement light emitting section 5A passes through the downstream side merging mechanism 35 and the laser light scanning section 4 in this order and is irradiated onto the workpiece W as shown in FIG. 3B. As shown in FIG. 3B, the first distance measurement light irradiated onto the workpiece W returns, after being reflected by the workpiece W, to the laser light scanning section 4 and the downstream side merging mechanism 35 in this order and reaches the distance measurement light receiving section 5B. Then, as shown in FIG. 18, the distance measuring section 103 measures the distance to the surface of the workpiece W based on the light receiving position of the distance measurement light in the distance measurement light receiving section 5B.

When correcting a measurement result obtained by the distance measuring section 103, the distance measurement light emitting section 5A emits the second distance measurement light. In this case, as shown in FIG. 18, etc., the correction optical path Pc connecting the distance measurement light emitting section 5A and the reference member 61 is formed via the laser light scanning section 4 by setting at least one of the first scanner 41 and the second scanner 42 to a specific rotation posture. Therefore, the second distance measurement light emitted from the distance measurement light emitting section 5A is irradiated onto the reference member 61 via the laser light scanning section 4. The second distance measurement light irradiated onto the reference member 61 returns, after being reflected by the reference member 61, to the laser light scanning section 4 and reaches the distance measurement light receiving section 5B. The distance measuring section 103 measures the distance to the reference member 61 based on the light receiving position of the second distance measurement light in the distance measurement light receiving section 5B. The measurement result obtained by the distance measuring section 103 is corrected by a comparison with the reference distance stored in the reference distance storing section 105.

Here, as shown in FIG. 3A, etc., the reference member 61 is provided in the housing 10 in advance, and thus it is not necessary to separately prepare a member equivalent to the reference member 61. As a result, it is possible to save labor in calibration. In addition, the reference member 61 is arranged such that the optical path length of the correction optical path Pc related to the reference member 61 is a predetermined reference distance. The reference distance is stored in advance by the reference distance storing section 105. This is also effective in saving the labor in calibrating the distance measuring unit 5.

Moreover, since the reference member 61 is provided inside the housing 10 as described above, it is possible to block disturbance light incident from the outside and to keep the surface of the reference member 61 in a good state. As a result, the calibration accuracy can be improved.

Further, as shown in FIG. 3C, etc., since the second distance measurement light is irradiated via the laser light scanning section 4, it is possible to calibrate in consideration of an influence of an error caused by at least one of the first and the second scanners 41 and 42. This is also effective in improving the calibration accuracy.

Furthermore, as shown in FIG. 3C, etc., according to the configuration, the correction optical path Pc can be bent as necessary by providing the fourth bend mirror 49 and the fifth bend mirror 69 as reflection mirrors between the second scanner 42 and the reference member 61. In this way, it is possible to increase the degree of freedom of layout in the housing 10.

In addition, when the specific rotation posture includes a posture used during laser processing (a rotation posture within the scanning range of the laser light), the area that can be scanned by the first and the second scanners 41 and 42 would be limited.

On the other hand, according to the embodiment, the specific rotation posture is a rotation posture outside the scanning range of the laser light, and thus it is possible to secure a wide area that can be scanned by the first and the second scanners 41 and 42.

Further, according to the configuration, the optical path P formed by the laser light guiding section 3 and the correction optical path Pc share a section connecting the downstream side merging mechanism 35 and the laser light scanning section 4. This is advantageous in configuring the laser processing apparatus L, particularly the marker head 1, in a compact manner.

In addition, as shown in FIG. 23, by executing calibration using the plurality of reference members 61, it is possible to calibrate with a high accuracy. As a result, the calibration accuracy can be improved.

<Variation Related to Target for Calibration 6>

In the aforementioned embodiment, not only the first distance measurement light for measuring the distance to the workpiece W but also the second distance measurement light for correcting the measurement result is configured to pass through the laser light scanning section 4. However, it is not limited to this configuration.

Figure 25:
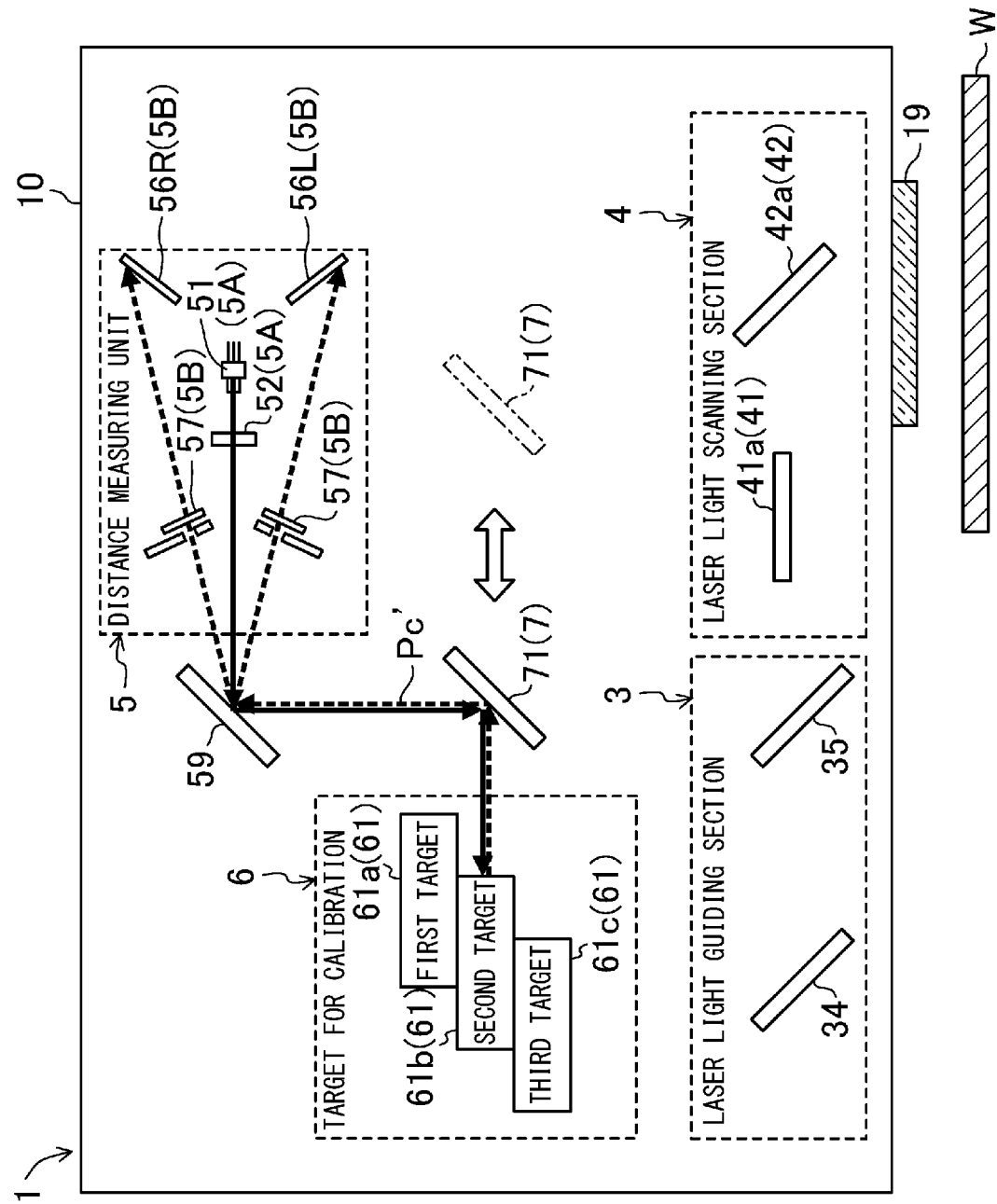
FIG. 25 is a diagram showing a first variation related to calibration.
Figure 26:
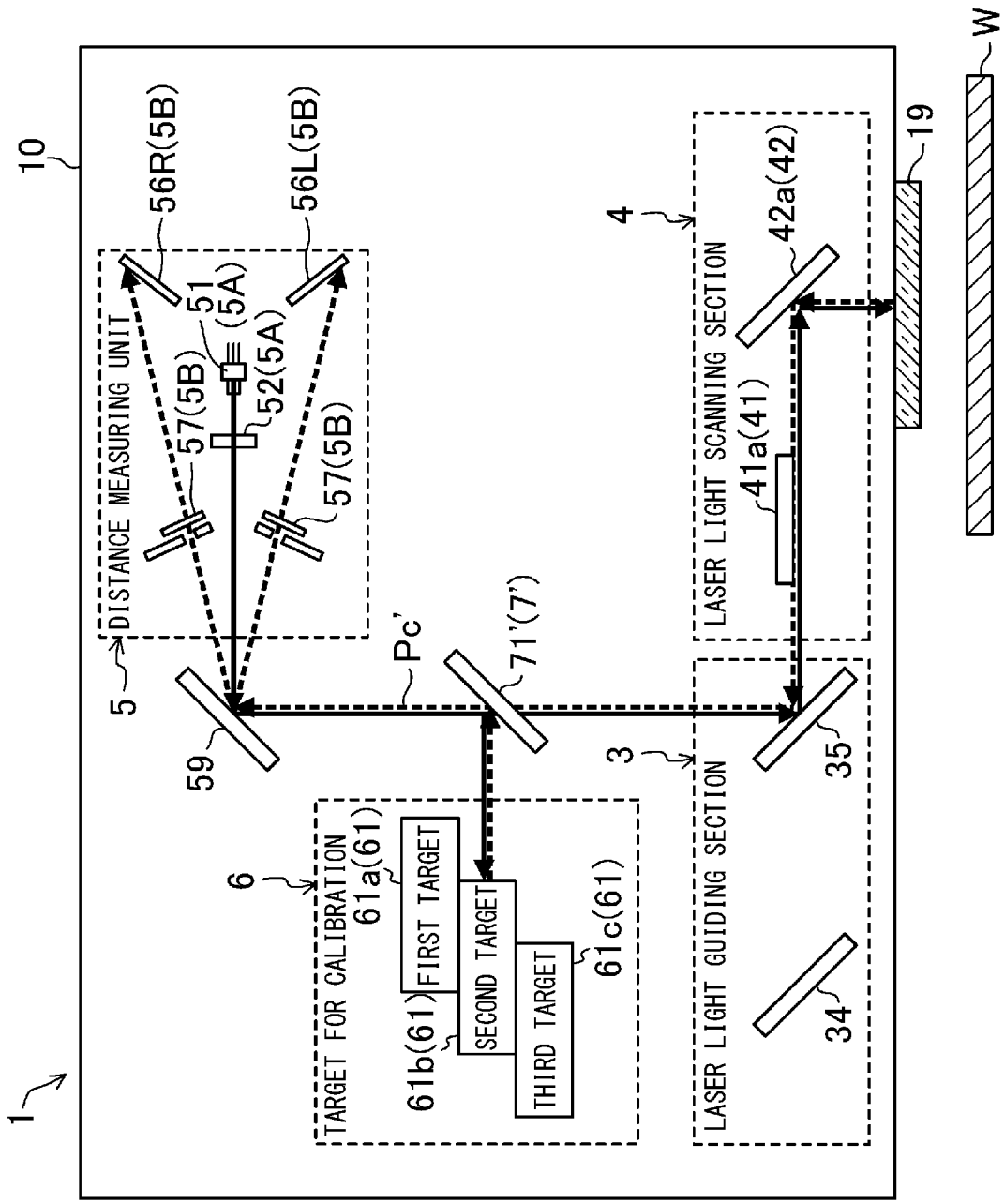
FIG. 26 is a diagram showing a second variation related to calibration.
Figure 27:
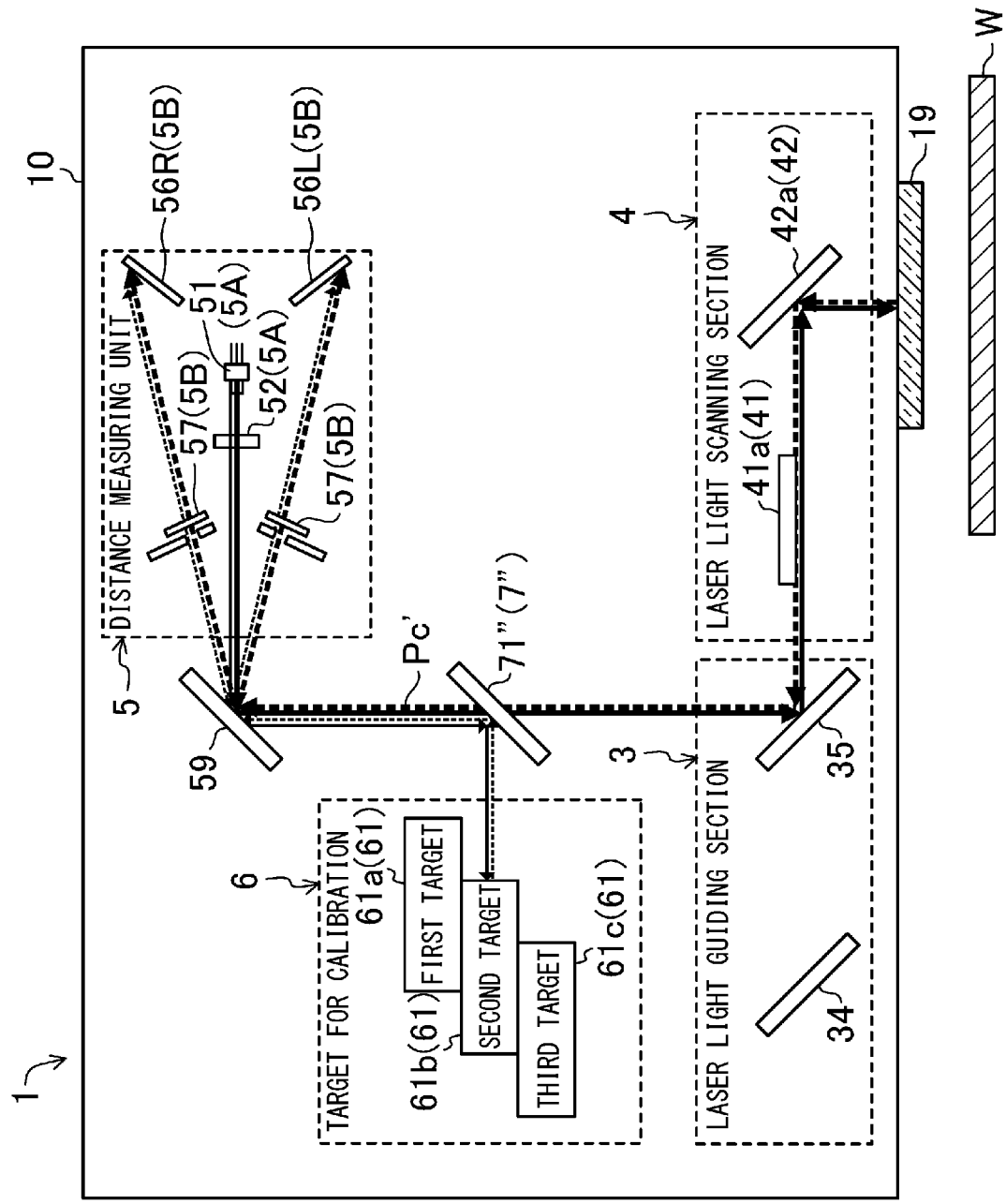
FIG. 27 is a diagram showing a third variation related to calibration.

For example, the optical path connecting the downstream side merging mechanism 35 and the distance measuring unit 5 may be divided and the target for calibration 6 may be arranged at the divided destination. FIG. 25 to FIG. 27 are diagrams showing variations in which such an arrangement is used.

Each of these variations includes the marker controller 100 configured in the same manner as the laser processing apparatus L illustrated in FIG. 2. FIG. 25 to FIG. 27 show only a part of the marker head 1 included in the laser processing apparatus L that is different from the configurations illustrated in FIG. 3A to FIG. 3C. Hereinafter, description will be made in order from a first variation illustrated in FIG. 25.

(First Variation)

The marker head 1 according to the first variation includes the laser light output section 2, the laser light scanning section 4, and the housing 10 which are configured in the same manner as in the aforementioned embodiment, and the distance measurement light emitting section 5A which emits the first distance measurement light or the second distance measurement light.

Unlike the marker head 1 according to the aforementioned embodiment, the marker head 1 according to the first variation includes a dividing mechanism 7 provided in a section connecting the downstream side merging mechanism 35 and the third bend mirror 59.

The dividing mechanism 7 is provided in the housing 10 and guides at least a part of the first distance measurement light to the laser light scanning section 4 when the first distance measurement light is emitted from the distance measurement light emitting section 5A. On the other hand, when the second distance measurement light is emitted from the distance measurement light emitting section 5A, the dividing mechanism 7 guides at least a part of the second distance measurement light to a part other than the laser light scanning section 4.

By providing the dividing mechanism 7, the first distance measurement light or the second distance measurement light propagating in the section connecting the distance measurement light emitting section 5A and the laser light scanning section 4 can be divided.

The reference member 61 included in the target for calibration 6 is arranged at a dividing destination formed by the dividing mechanism 7. The reference member 61 in the first variation is connected to the distance measurement emitting section 5A via the dividing mechanism 7 instead of being optically coupled to the distance measurement light emitting section 5A via the laser light scanning section 4, which is different from the aforementioned embodiment. The other configurations are the same as in the aforementioned embodiment.

That is, the reference member 61 according to the first variation is provided inside the housing 10 as in the aforementioned embodiment. Further, the reference member 61 illustrated in FIG. 25 is arranged at a position which is the other end of a correction optical path Pc' formed via the dividing mechanism 7 with the distance measurement light emitting section 5A as one end of the correction optical path Pc' in a state in which at least one of the first scanner 41 and the second scanner 42 is in a specific rotation posture. The reference member 61 is also arranged such that an optical path length of the correction optical path Pc' is a predetermined reference distance.

The distance measurement light receiving section 5B according to the first variation is provided in the housing 10 as in the aforementioned embodiment. The distance measurement light receiving section 5B receives any one of the first distance measurement light reflected by the workpiece W and the second distance measurement light reflected by the reference member 61 via the dividing mechanism 7.

As a result, the distance measurement light receiving section 5B according to the first variation can receive the reflected light propagating via the dividing mechanism 7 instead of the laser light scanning section 4.

The configurations of the distance measuring section 103, the reference distance storing section 105, and the distance correcting section 104 are the same as those in the aforementioned embodiment.

That is, the distance measuring section 103 can measure a distance from the laser processing apparatus L to the surface of the workpiece W by the triangulation method based on a light receiving position of the first distance measurement light in the distance measurement light receiving section 5B, and can also measure a distance to the reference member 61 by the triangulation method based on a light receiving position of the second distance measurement light in the distance measurement light receiving section 5B.

The reference distance storing section 105 stores a known reference distance in advance. The distance correcting section 104 compares, when the distance to the reference member 61 has been measured by using the correction optical path Pc', the measurement result with the reference distance stored in the aforementioned reference distance storing section 105 to correct the measurement result obtained by the distance measuring section 103.

Similar to the aforementioned embodiment, since the reference member 61 is provided in the housing 10 in advance, it is not necessary to separately prepare a member equivalent to the reference member 61. In this way, it is possible to save labor in calibration and even improve the calibration accuracy. In addition, the reference member 61 is arranged such that the optical path length of the correction optical path Pc' related to the reference member 61 is a predetermined reference distance. The reference distance is stored in advance by the reference distance storing section 105. This is also effective in saving labor in calibrating the distance measuring unit 5.

Moreover, since the reference member 61 is provided inside the housing 10 as described above, it is possible to block disturbance light incident from the outside and to keep the surface of the reference member 61 in a good state. As a result, the calibration accuracy can be improved.

Further, according to the first variation, since the second distance measurement light is irradiated without going through the laser light scanning section 4, it is possible to perform calibration regardless of a state of a galvano scanner (specifically, the first scanner 41 and the second scanner 42), etc., included in the laser light scanning section 4. This makes it possible to execute calibration without adjusting the posture of the galvano scanner.

However, the first variation is different from the aforementioned embodiment in the presence/absence of the dividing mechanism 7. The dividing mechanism 7 according to the first variation includes a movable mirror 71 which reflects light emitted from the distance measurement light emitting section 5A.

As indicated by chain lines in FIG. 25, the movable mirror 71 is retracted from the optical path connecting the distance measurement light emitting section 5A and the laser light scanning section 4 (specifically, an optical path connecting the third bend mirror 59 and the dichroic mirror 35*a*) when the first distance measurement light is emitted from the distance measurement light emitting section 5A.

On the other hand, as indicated by a solid line in FIG. 25, the movable mirror 71 is inserted into the optical path connecting the distance measurement light emitting section 5A and the laser light scanning section 4 when the second distance measurement light is emitted from the distance measurement light emitting section 5A.

According to the first variation, when the first distance measurement light is emitted from the distance measurement light emitting section 5A, all of the first distance measurement light can be guided to the laser light scanning section 4. On the other hand, when the second distance measurement light is emitted from the distance measurement light emitting section 5A, all of the second distance measurement light can be guided to the target for calibration 6.

That is, according to the first variation, a control process for measuring the distance to the workpiece W using the distance measuring unit 5 and a control process for calibrating the distance measuring unit 5 using the target for calibration 6 can be alternatively used properly.

To be more specific, in a state indicated by the solid line in FIG. 25, the movable mirror 71 is fixed in a posture in which a mirror surface of the movable mirror 71 faces the third bend mirror 59 and the target for calibration 6. The movable mirror 71 thus fixed may be slid by a rail, for example.

(Second Variation)

The second variation is different from the first variation in the configuration of the dividing mechanism.

As shown in FIG. 26, a dividing mechanism 7' according to the second variation has a beam splitter 71' which transmits a part of the light emitted from the distance measurement light emitting section 5A and reflects the other part. The beam splitter 71' is arranged to guide a part of the light emitted from the distance measurement light emitting section 5A to the laser light scanning section 4 and to guide the other part to the reference member 61.

According to the second variation, when the first distance measurement light is emitted from the distance measurement light emitting section 5A, a part of the first distance measurement light can be guided to the laser light scanning section 4 while the other part can be guided to the target for calibration 6. Similarly, when the second distance measurement light is emitted from the distance measurement light emitting section 5A, a part of the second distance measurement light can be guided to the laser light scanning section 4 while the other part can be guided to the target for calibration 6.

In the second variation, the following configuration can be considered in order to alternatively use the control process for measuring the distance to the workpiece W using the distance measuring unit 5 and the control process for calibrating the distance measuring unit 5 using the target for calibration 6.

For example, the first reflected light may be controlled not to enter the downstream side merging mechanism 35 by adjusting the rotation postures of the first scanner 41 and the second scanner 42. Alternatively, a light receiving position assumed when the first reflected light enters the distance measurement light receiving section 5B and a light receiving position assumed when the second reflected light enters the distance measurement light receiving section 5B may be grasped in advance, and the light receiving position corresponding to the first reflected light or the second reflected light may be masked. In that case, when a spot is formed at the light receiving position to be masked, it may be configured such that a detection signal thereof is not input to the distance measuring section 103, or it may be configured such that the distance measuring section 103 ignores the detection signal.

(Third Variation)

The third variation is different from the other variations in the configurations of the dividing mechanism and the distance measurement light emitting section.

Specifically, in the third variation, the wavelength of the first distance measurement light and the wavelength of the second distance measurement light are different. The distance measurement light emitting section 5A according to the third variation can emit the first distance measurement light and the second distance measurement light at the same time (multi-wavelength light projection). Instead of this, the distance measurement light emitting section 5A may alternatively emit one of the first distance measurement light and the second distance measurement light.

A dividing mechanism 7" according to the third variation has a dichroic mirror 71" which transmits one of the first distance measurement light and the second distance measurement light and reflects the other. The dichroic mirror 71" is arranged to guide the first distance measurement light to the laser light scanning section 4 and to guide the second distance measurement light to the reference member 61. The dichroic mirror 71" illustrated in FIG. 27 is configured to transmit the first distance measurement light and to reflect the second distance measurement light.

According to the third variation, when the first distance measurement light is emitted from the distance measurement light emitting section 5A, all of the first distance measurement light can be guided to the laser light scanning section 4. On the other hand, when the second distance measurement light is emitted from the distance measurement light emitting section 5A, all of the second distance measurement light can be guided to the target for calibration 6.

In order to alternatively use the control process for measuring the distance to the workpiece W using the distance measuring unit 5 and the control process for calibrating the distance measuring unit 5 using the target for calibration 6, the same configuration as in the second variation can be used.

<Other Variations>

In the present embodiment, the triangulation method is used as a distance measurement principle for measuring the distance from the marker head 1 to the surface of the workpiece. However, the technology disclosed here is, for example, also applicable to a case of measuring a distance using a TOF (Time of Flight) method. In this case, it is only necessary to measure, based on the distance measurement light received by the distance measurement light receiving section 5B, the time until the distance measurement light is reflected by the workpiece and returns. Based on the time thus measured, it is possible to measure the distance from the marker head 1 to the surface of the workpiece, or to measure the distance to the reference member 61. That is, the distance measuring section 103 has a function of measuring a distance by the TOF method.

Further, in the aforementioned embodiment and the first to third variations, the reference member 61 is provided inside the housing 10. However, the layout of the reference member 61 is not limited thereto. For example, a dummy workpiece which functions as the reference member 61 may be attached to an outer surface of the emission window portion 19. In this case, the reference member 61 is provided outside the housing 10. However, the distance measuring unit 5 can be calibrated in the same manner as in the aforementioned embodiment.

What is claimed is:

1. A laser processing apparatus including
    an excitation light generating section which generates excitation light,
    a laser light output section which generates laser light based on the excitation light generated by the excitation light generating section and emits the laser light,
    a laser light scanning section which includes a first scanner that scans the laser light emitted from the laser light output section in a first direction, and a second scanner that scans the laser light scanned by the first scanner in a second direction substantially orthogonal to the first direction, and irradiates a workpiece with the laser light scanned by the second scanner, and
    a housing in which at least the laser light output section and the laser light scanning section are provided, the housing having a window portion for allowing the laser light to pass through toward an outside of the housing,
    wherein the laser processing apparatus includes
    a distance measurement light emitting section which is provided in the housing and emits to the laser light scanning section a first distance measurement light for measuring a distance from the laser processing apparatus to a surface of the workpiece, and a second distance measurement light for correcting a measurement result thereof,
    a reference member which, is arranged at a position, the position being one end of a correction optical path, the correction optical path formed via the laser light scanning section, the distance measurement light emitting section being arranged at another end of the correction optical path, a distance measurement light receiving section which is provided in the housing and receives any one of the first distance measurement light reflected by the workpiece and the second distance measurement light reflected by the reference member via the laser light scanning section, a distance measuring section which measures a distance from the laser processing apparatus to the surface of the workpiece by a triangulation method based on a light receiving position of the first distance measurement light in the distance measurement light receiving section, and measures a distance to the reference member by the triangulation method based on a light receiving position of the second distance measurement light in the distance measurement light receiving section, a reference distance storing section which stores a reference distance defined by an optical path length of the correction optical path, and a distance correcting section which, when the distance to the reference member has been measured by using the correction optical path, compares the measurement result with the reference distance stored in the reference distance storing section to correct the measurement result obtained by the distance measuring section, wherein the laser processing apparatus includes a control section which controls the laser light scanning section such that the first distance measurement light passes through the window portion when the distance to the surface of the workpiece is measured by using the first distance measurement light, and which controls the laser light scanning section such that the second distance measurement light reaches the reference member when the distance to the reference member is measured by using the second distance measurement light.

2. The laser processing apparatus according to claim 1, wherein the reference member is arranged such that the correction optical path is formed when both the first scanner and the second scanner are in a specific rotation posture, and the first scanner and the second scanner are arranged in this order between the distance measurement light emitting section and the reference member in the correction optical path.

3. The laser processing apparatus according to claim 2, wherein the laser processing apparatus further includes a reflection mirror which is arranged between the second scanner and the reference member in the correction optical path and directs the second distance measurement light scanned by the second scanner to the reference member.

4. The laser processing apparatus according to claim 1, wherein the specific rotation posture formed by at least one of the first scanner and the second scanner is a rotation posture outside a scanning range of the laser light by the laser light scanning section on the surface of the workpiece.

5. The laser processing apparatus according to claim 1, wherein the laser processing apparatus further includes a merging mechanism which is provided in the middle of an optical path from the laser light output section to the laser light scanning section in the housing and merges the first distance measurement light or the second distance measurement light emitted from the distance measurement light emitting section with the optical path, and the merging mechanism guides the first distance measurement light which is reflected by the workpiece to return to the laser light scanning section, or the second distance measurement light which is reflected by the reference member to return to the laser light scanning section, to the distance measurement light receiving section.

6. A laser processing apparatus including an excitation light generating section which generates excitation light, a laser light output section which generates laser light based on the excitation light generated by the excitation light generating section and emits the laser light, a laser light scanning section which includes a first scanner that scans the laser light emitted from the laser light output section in a first direction, and a second scanner that scans the laser light scanned by the first scanner in a second direction substantially orthogonal to the first direction, and irradiates a workpiece with the laser light scanned by the second scanner, and a housing in which at least the laser light output section and the laser light scanning section are provided, wherein the laser processing apparatus includes a distance measurement light emitting section which is provided in the housing and emits a first distance measurement light for measuring a distance from the laser processing apparatus to a surface of the workpiece, or a second distance measurement light for correcting a measurement result thereof, a dividing mechanism which is provided in the housing and guides at least a part of the first distance measurement light to the laser light scanning section when the first distance measurement light is emitted from the distance measurement light emitting section, and guides at least a part of the second distance measurement light to a part other than the laser light scanning section when the second distance measurement light is emitted from the distance measurement light emitting section, a reference member which, in a state in which at least one of the first scanner and the second scanner is in a specific rotation posture, is arranged at a position which is the other end of a correction optical path formed via the dividing mechanism with the distance measurement light emitting section as one end of the correction optical path, and is arranged such that an optical path length of the correction optical path is a predetermined reference distance, a distance measurement light receiving section which is provided in the housing and receives any one of the first distance measurement light reflected by the workpiece and the second distance measurement light reflected by the reference member via the dividing mechanism, a distance measuring section which measures a distance from the laser processing apparatus to the surface of the workpiece by a triangulation method based on a light receiving position of the first distance measurement light in the distance measurement light receiving section, and measures a distance to the reference member by the triangulation method based on a light receiving position of the second distance measurement light in the distance measurement light receiving section, a reference distance storing section which stores the reference distance in advance, and a distance correcting section which, when the distance to the reference member has been measured by using the correction optical path, compares the measurement result with the reference distance stored in the reference distance storing section to correct the measurement result obtained by the distance measuring section.

7. The laser processing apparatus according to claim 6, wherein the dividing mechanism has a movable mirror which reflects light emitted from the distance measurement light emitting section, and the movable mirror is retracted from an optical path connecting the distance measurement light emitting section and the laser light scanning section when the first distance measurement light is emitted from the distance measurement light emitting section, and is inserted into the optical path connecting the distance measurement light emitting section and the laser light scanning section when the second distance measurement light is emitted from the distance measurement light emitting section.

8. The laser processing apparatus according to claim 6, wherein the dividing mechanism has a beam splitter which transmits a part of light emitted from the distance measurement light emitting section and reflects the other part, and the beam splitter is arranged to guide a part of light emitted from the distance measurement light emitting section to the laser light scanning section and guide the other part to the reference member.

9. The laser processing apparatus according to claim 6, wherein a wavelength of the first distance measurement light is different from a wavelength of the second distance measurement light, the dividing mechanism has a dichroic mirror which transmits one of the first distance measurement light and the second distance measurement light and reflects the other, and the dichroic mirror is arranged to guide the first distance measurement light to the laser light scanning section and guide the second distance measurement light to the reference member.

10. The laser processing apparatus according to claim 6, wherein the laser processing apparatus includes a merging mechanism which is provided in the middle of an optical path from the laser light output section to the laser light scanning section in the housing and merges the first distance measurement light or the second distance measurement light emitted from the distance measurement light emitting section with the optical path, the merging mechanism is configured to guide the first distance measurement light which is reflected by the workpiece to return to the laser light scanning section, or the second distance measurement light which is reflected by the reference member to return to the laser light scanning section, to the distance measurement light receiving section, and the dividing mechanism is provided in the middle of an optical path connecting the distance measurement light emitting section and the merging mechanism.

11. The laser processing apparatus according to claim 1, wherein the laser processing apparatus includes a plurality of reference members, and the plurality of reference members are arranged such that the reference distances are different from each other.

* * * * *